US011487997B2

(12) United States Patent
Gou et al.

(10) Patent No.: US 11,487,997 B2
(45) Date of Patent: Nov. 1, 2022

(54) METHOD, SYSTEM, AND COMPUTER PROGRAM PRODUCT FOR LOCAL APPROXIMATION OF A PREDICTIVE MODEL

(71) Applicant: Visa International Service Association, San Francisco, CA (US)

(72) Inventors: Liang Gou, San Jose, CA (US); Junpeng Wang, Columbus, OH (US); Wei Zhang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 565 days.

(21) Appl. No.: 16/593,731

(22) Filed: Oct. 4, 2019

(65) Prior Publication Data

US 2020/0110982 A1 Apr. 9, 2020

Related U.S. Application Data

(60) Provisional application No. 62/741,175, filed on Oct. 4, 2018.

(51) Int. Cl.
*G06K 9/62* (2022.01)
*G06N 3/04* (2006.01)
(Continued)

(52) U.S. Cl.
CPC ......... *G06N 3/0454* (2013.01); *G06F 16/904* (2019.01); *G06F 17/16* (2013.01);
(Continued)

(58) Field of Classification Search
CPC .. G06K 9/6256; G06K 9/6267; G06K 9/6263; G06K 9/6274; G06K 9/6215;
(Continued)

(56) References Cited

U.S. PATENT DOCUMENTS 5,828,774 A * 10/1998 Wang .................. A61B 6/465
345/32
2014/0241618 A1* 8/2014 Simske ................ G06K 9/6262
382/159

(Continued)

OTHER PUBLICATIONS

Bach et al., "On pixel-wise explanations for non-linear classifier decisions by layer-wise relevance propagation", PLoS One, 2015, 46 pages, vol. 10, No. 7, Article No. e0130140.

(Continued)

*Primary Examiner* — Quan M Hua
(74) *Attorney, Agent, or Firm* — The Webb Law Firm

(57) ABSTRACT

A method for local approximation of a predictive model may include receiving unclassified data associated with a plurality of unclassified data items. The unclassified data may be classified based on a first predictive model to generate classified data. A first data item may be selected from the classified data. A plurality of generated data items associated with the first data item may be generated using a generative model. The plurality of generated data items may be classified based on the first predictive model to generate classified generated data. A second predictive model may be trained with the classified generated data. A system and computer program product are also disclosed.

20 Claims, 21 Drawing Sheets

(51) Int. Cl.
  *G06N 3/08* (2006.01)
  *G06F 16/904* (2019.01)
  *G06F 17/18* (2006.01)
  *G06F 17/16* (2006.01)

(52) U.S. Cl.
  CPC ........... *G06F 17/18* (2013.01); *G06K 9/6267* (2013.01); *G06N 3/0472* (2013.01); *G06N 3/08* (2013.01)

(58) Field of Classification Search
  CPC .. G06K 9/6217; G06K 9/6239; G06K 9/6257; G06K 9/6259; G06K 9/6262; G06K 9/6264; G06K 9/6268; G06K 9/6271; G06K 9/6277; G06K 9/6293; G06V 10/25; G06V 10/454; G06V 10/82; G06N 3/0454; G06N 3/08; G06N 3/084; G06N 20/00; G06N 3/0445; G06N 3/0481; G06N 3/04
  See application file for complete search history.

(56) References Cited

U.S. PATENT DOCUMENTS

| | | | | |
|---|---|---|---|---|
| 2017/0213112 | A1* | 7/2017 | Sachs | G06N 3/08 |
| 2018/0129911 | A1* | 5/2018 | Madabhushi | G06N 3/0472 |
| 2019/0034764 | A1* | 1/2019 | Oh | G06V 20/00 |
| 2019/0287515 | A1* | 9/2019 | Li | G10L 15/063 |

OTHER PUBLICATIONS

Chattopadhyay et al., "Grad-CAM++: Generalized Gradient-Based Visual Explanations for Deep Convolutional Networks", arXiv preprint, 2017, 17 pages, article accessed at arXiv: 1710.11063v2.
Cortes et al., "Support-Vector Networks", Machine Learning, 1995, pp. 273-297, vol. 20, No. 3.
Eykholt et al., "Robust Physical-World Attacks on Deep Learning Visual Classification", Proceedings of the 2018 IEEE Conference on Computer Vision and Pattern Recognition, 2018, pp. 1625-1634.
Fong et al., "Interpretable Explanations of Black Boxes by Meaningful Perturbation", Proceedings of the 2017 IEEE International Conference on Computer Vision, 2017, pp. 3429-3437, article accessed at arXiv:1704.03296v3.
Goodfellow et al., "Generative Adversarial Nets", Advances in Neural Information Processing Systems, 2014, pp. 2672-2680.
Harley, "An Interactive Node-Link Visualization of Convolutional Neural Networks", Proceedings of the International Symposium Visual Computing, 2015, pp. 867-877.
He et al., "Deep Residual Learning for Image Recognition", Proceedings of the 2016 IEEE Conference on Computer Vision and Pattern Recognition, 2016, pp. 770-778.
Hinton et al., "Distilling the knowledge in a neural network", arXiv preprint, 2015, 9 pages, article accessed at arXiv:1503.02531v1.
Hou et al., "Deep Feature Consistent Variational Autoencoder", Proceedings of the 2017 IEEE Winter Conference on Applications of Computer Vision, 2017, pp. 1133-1141, article accessed at arXiv:1610.00291v1.
Kahng et al., "ActiVis: Visual Exploration of Industry-Scale Deep Neural Network Models", IEEE Transactions on Visualization and Computer Graphics, 2018, pp. 88-97, vol. 24, No. 1, article accessed at arXiv:1704.01942v2.
Kahng et al., "GAN Lab: Understanding Complex Deep Generative Models using Interactive Visual Experimentation", IEEE Transactions on Visualization and Computer Graphics, 2018, pp. 310-320, vol. 25, No. 1.
Karras et al., "Progressive Growing of GANS for Improved Quality, Stability, and Variation", CoRR, 2017, 26 pages, available at http://arxiv.org/abs/1710.10196v3.
Kingma et al., "Auto-Encoding Variational Bayes", arXiv preprint, 2013, 14 pages, article accessed at arXiv:1312.6114v10.

Koyama et al., "SelPh: Progressive Learning and Support of Manual Photo Color Enhancement", Proceedings of CHI 2016, 2016, pp. 2520-2532.
Krizhevsky, "Learning Multiple Layers of Features from Tiny Images" Citeseer, Technical Report, 2009, 60 pages.
Krizhevsky et al., "ImageNet Classification with Deep Convolutional Neural Networks", Proceedings of Neural Information Processing Systems 25, 2012, pp. 1097-1105.
Lecun et al., "Gradient-Based Learning Applied to Document Recognition", Proceedings of the IEEE, 1998, pp. 2278-2324, vol. 86, No. 11.
Liu et al., "Deep Learning Face Attributes in the Wild", Proceedings of the 2015 International Conference on Computer Vision, 2015, pp. 3730-3738, article accessed at arXiv:1411.7766v3.
Liu et al., "Towards better analysis of deep convolutional neural networks", IEEE Transactions on Visualization and Computer Graphics, 2017, pp. 91-100, vol. 23, No. 1.
Montavon et al., "Explaining nonlinear classification decisions with deep Taylor decomposition", Pattern Recognition, 2017, pp. 211-222, vol. 65, article accessed at arXiv:1604.07043v3.
Montavon et al., "Methods for interpreting and understanding deep neural networks", Digital Signal Processing, 2018, pp. 1-15, vol. 73.
Ribeiro et al., ""Why Should I Trust You?" Explaining the Predictions of Any Classifier", Proceedings of the 22nd ACM SIGKDD International Conference on Knowledge Discovery and Data Mining, 2016, pp. 1135-1144, article accessed at arXiv:1602.04938v3.
Safavian et al., "A Survey of Decision Tree Classifier Methodology", IEEE Transactions on Systems, Man, and Cybernetics, 1991, pp. 660-674, vol. 21, No. 3.
Selvaraju et al., "Grad-CAM: Visual Explanations from Deep Networks via Gradient-based Localization", Proceedings of the 2017 IEEE International Conference on Computer Vision, 2017, pp. 618-626.
Simonyan et al., "Very deep convolutional networks for large-scale image recognition", arXiv preprint, 2014, 14 pages, article accessed at arXiv:1409.1556v6.
Springenberg et al., "Striving for simplicity: The all convolutional net ", arXiv preprint, 2014, 14 pages, article accessed at arXiv:1412.6806v3.
Strobelt et al., "LSTMVis: A Tool for Visual Analysis of Hidden State Dynamics in Recurrent Neural Networks", IEEE Transactions on Visualization and Computer Graphics, 2018, pp. 667-676, vol. 24, No. 1, article accessed at arXiv:1606.07461v2.
Szegedy et al., "Intriguing properties of neural networks", CoRR, 2013, 10 pages, article accessed at arXiv:1312.6199v4.
Van Der Maaten et al., "Visualizing Data using t-SNE", Journal of Machine Learning Research, 2008, pp. 2579-2605, vol. 9, No. 11.
Wang et al., "GANViz: A Visual Analytics Approach to Understand the Adversarial Game", Journal of Latex Class Files, 2015, 12 pages, vol. 14, No. 8.
Wang et al., "DQNViz: A Visual Analytics Approach to Understand Deep Q-Networks (Supplementary Material)", IEEE Transactions on Visualization and Computer Graphics, 2019, pp. 288-298, vol. 25, No. 1.
Wongsuphasawat et al., "Visualizing Dataflow Graphs of Deep Learning Models in TensorFlow", IEEE Transactions on Visualization and Computer Graphics, 2018, pp. 1-12, vol. 24, No. 1.
Xu et al., "Interpreting Deep Classifiers by Visualization of Dark Knowledge", arXiv preprint, 2018, 14 pages, article accessed at arXiv: 1803.04042v1.
Zhang et al., "Manifold: A Model-Agnostic Framework for Interpretation and Diagnosis of Machine Learning Models", IEEE Transactions on Visualization and Computer Graphics, 2019, pp. 364-373, vol. 25, No. 1, article accessed at arXiv:1808.00196v1.
Zhou et al., "Learning Deep Features for Discriminative Localization", Proceedings of the 2016 IEEE Conference on Computer Vision and Pattern Recognition, 2016, pp. 2921-2929.
"A Vae for face translation", Github, 1 page, available at https://github.com/seasonyc/face_vae.
"DFC-VAE", Github, 3 pages, available at https://github.com/yzwxx/vae-celebA, accessed on Aug. 20, 2018.
"Flask microframework", Flask, 9 pages, available at http://flask.pocoo.org/docs/1.0/, accessed on Aug. 22, 2018.

(56) References Cited

OTHER PUBLICATIONS

"Google Quick Draw Game", Google, available at https://quickdraw.withgoogle.com/, accessed on Aug. 8, 2017.
"Understanding NN", Github, 11 pages, retrieved from https://github.com/1202kbs/Understanding-NN.
"vae-ry exciting vae code", Github, 2 pages, available at https://github.com/fastforwardlabs/vae-tf/tree/master, accessed on Jul. 21, 2018.

* cited by examiner

METHOD, SYSTEM, AND COMPUTER PROGRAM PRODUCT FOR LOCAL APPROXIMATION OF A PREDICTIVE MODEL

CROSS REFERENCE TO RELATED APPLICATIONS

The present application claims the benefit of U.S. Provisional Patent Application No. 62/741,175, filed Oct. 4, 2018, the disclosure of which is hereby incorporated by reference in its entirety.

BACKGROUND

1. Field

This disclosed subject matter relates generally to methods, systems, and products for local approximation of a predictive model and, in some particular embodiments, to a method, system, and computer program product for local approximation of a predictive model including a graphical user interface.

2. Technical Considerations

Certain predictive models have been used in various disciplines. For example, such predictive models may demonstrate desirable performance for classification. Exemplary predictive models for classification may include naïve Bayes classifiers, support vector machines (SVMs), decision trees, neural networks (e.g., deep neural networks (DNNs), convolutional neural networks (CNNs), and/or the like) and/or the like.

However, certain predictive models (e.g., neural networks, DNNs, and/or CNNs) may be considered as black-boxes, and the interpretation of the internal working thereof may be challenging e.g., because the data transformation in high-dimensional (HD) space may exceed interpretation capability of humans. Yet, trust of/confidence in a model may be based on the understanding of how the model works, so interpretation of predictive models (e.g., neural networks, DNNs, and/or CNNs) may be desirable (e.g., especially in safety-critical applications, such as, e.g., medical diagnosis, autonomous driving, etc.). For example, a self-driving car's recognizing a stop sign as a speed-limit sign may lead to grave consequences.

For certain image classifiers, attempted techniques for model interpretation may include finding which pixels of an image contribute (e.g., positively and/or negatively) to which classifications (e.g., probabilities thereof). For example, such techniques may include guided back-propagations, layer-wise relevance propagations, or class activation maps. However, such techniques may be limited to neural network (e.g., DNN) classifiers, and such techniques may not be useful for different types of predictive models and/or if the structure of the predictive model (e.g., neural network) is unknown. Certain model-agnostic techniques may treat a predictive model to be interpreted as a black-box and uses various approaches to probe and observe the black-box's behavior, e.g., training a local model using sampled portions of a data instance of interest However, it may be difficult to apply such techniques, and such techniques may have limitations. For example, sampling portions of a data instance of interest in the input space (e.g., high-dimensional space) may be inefficient, e.g., because the combination of dimensions in a high-dimensional input space may be massive. Additionally, the sampled portions drawn directly from the data instance in the input space may lack semantic meanings, which may lead to potential biases when being used to train the local model.

SUMMARY

Accordingly, it is an object of the presently disclosed subject matter to provide methods, systems, and computer program products for local approximation of a predictive model.

According to non-limiting embodiments, provided is a method for local approximation of a predictive model. In some non-limiting embodiments, a method for local approximation of a predictive model may include receiving unclassified data associated with a plurality of unclassified data items. The unclassified data may be classified based on a first predictive model to generate classified data. A first data item may be selected from the classified data. A plurality of generated data items associated with the first data item may be generated using a generative model. The plurality of generated data items may be classified based on the first predictive model to generate classified generated data. A second predictive model may be trained with the classified generated data.

In some non-limiting embodiments, the first predictive model may be trained with at least a portion of the unclassified data before classifying the unclassified data. Additionally or alternatively, classifying the unclassified data may include classifying the unclassified data based on the first predictive model as trained to generate the classified data.

In some non-limiting embodiments, the generative model may be trained with at least a portion of the unclassified data before generating the plurality of generated data items.

In some non-limiting embodiments, the first predictive model may include a teacher model and the second predictive model may include a student model.

In some non-limiting embodiments, the first predictive model may include at least one of a neural network, a deep neural network (DNN), a convolutional neural network (CNN), and/or the like. Additionally or alternatively, the second predictive model may include at least one of a linear regression, a decision tree, a rules-based model, and/or the like. Additionally or alternatively, the generative model may include at least one of a deep generative model or a variational auto-encoder (VAE).

In some non-limiting embodiments, selecting the first data item may include receiving a selection of the first data item from a user via a graphical user interface.

In some non-limiting embodiments, the graphical user interface may include a first view displaying a clustering of the data items of the classified data. Additionally or alternatively, the graphical user interface may include a second view displaying a confusion matrix. Additionally or alternatively, upon selection of at least one data item from the first view, the graphical user interface may further include a third view displaying at least one image associated with the at least one data item.

In some non-limiting embodiments, selecting the first data item may include receiving a selection of a first image of the at least one image associated with the first data item from the third view. Additionally or alternatively, upon receiving the selection of the first image, the graphical user interface may include a fourth view displaying probabilities associated with a plurality of possible classifications based on the first predictive model and the first data item and/or a fifth view displaying dimensions of the generative model based on the first data item.

In some non-limiting embodiments, upon selection of a button associated with the fifth view, generating the plurality of generated data items may include generating the plurality of generated data items by perturbing the first data item based on the dimensions of the generative model. Additionally or alternatively, the graphical user interface may include a sixth view displaying a plurality of second images associated with the plurality of generated data items and/or a seventh view displaying second probabilities associated with the plurality of possible classifications based on the second predictive model and the plurality of generated data items.

According to non-limiting embodiments, provided is a system for local approximation of a predictive model. In some non-limiting embodiments, the system for local approximation of a predictive model may include at least one processor and at least one non-transitory computer-readable medium, which may include instructions to direct the processor(s) to receive unclassified data associated with a plurality of unclassified data items. The unclassified data may be classified based on a first predictive model to generate classified data. A first data item may be selected from the classified data. A plurality of generated data items associated with the first data item may be generated using a generative model. The plurality of generated data items may be classified based on the first predictive model to generate classified generated data. A second predictive model may be trained with the classified generated data.

In some non-limiting embodiments, the first predictive model may be trained with at least a portion of the unclassified data before classifying the unclassified data. Additionally or alternatively, classifying the unclassified data may include classifying the unclassified data based on the first predictive model as trained to generate the classified data.

In some non-limiting embodiments, the generative model may be trained with at least a portion of the unclassified data before generating the plurality of generated data items.

In some non-limiting embodiments, the first predictive model may include a teacher model and the second predictive model may include a student model.

In some non-limiting embodiments, the first predictive model may include at least one of a neural network, a DNN, a CNN, and/or the like. Additionally or alternatively, the second predictive model may include at least one of a linear regression, a decision tree, a rules-based model, and/or the like. Additionally or alternatively, the generative model may include at least one of a deep generative model or a variational auto-encoder (VAE).

In some non-limiting embodiments, selecting the first data item may include receiving a selection of the first data item from a user via a graphical user interface.

In some non-limiting embodiments, the graphical user interface may include a first view displaying a clustering of the data items of the classified data. Additionally or alternatively, the graphical user interface may include a second view displaying a confusion matrix. Additionally or alternatively, upon selection of at least one data item from the first view, the graphical user interface may further include a third view displaying at least one image associated with the at least one data item.

In some non-limiting embodiments, selecting the first data item may include receiving a selection of a first image of the at least one image associated with the first data item from the third view. Additionally or alternatively, upon receiving the selection of the first image, the graphical user interface may include a fourth view displaying probabilities associated with a plurality of possible classifications based on the first predictive model and the first data item and/or a fifth view displaying dimensions of the generative model based on the first data item.

In some non-limiting embodiments, upon selection of a button associated with the fifth view, generating the plurality of generated data items may include generating the plurality of generated data items by perturbing the first data item based on the dimensions of the generative model. Additionally or alternatively, the graphical user interface may include a sixth view displaying a plurality of second images associated with the plurality of generated data items and/or a seventh view displaying second probabilities associated with the plurality of possible classifications based on the second predictive model and the plurality of generated data items.

According to non-limiting embodiments, provided is a computer program product for local approximation of a predictive model. The computer program product may include at least one non-transitory computer-readable medium including one or more instructions that, when executed by at least one processor, cause the at least one processor to receive unclassified data associated with a plurality of unclassified data items. The unclassified data may be classified based on a first predictive model to generate classified data. A first data item may be selected from the classified data. A plurality of generated data items associated with the first data item may be generated using a generative model. The plurality of generated data items may be classified based on the first predictive model to generate classified generated data. A second predictive model may be trained with the classified generated data.

In some non-limiting embodiments, the first predictive model may be trained with at least a portion of the unclassified data before classifying the unclassified data. Additionally or alternatively, classifying the unclassified data may include classifying the unclassified data based on the first predictive model as trained to generate the classified data.

In some non-limiting embodiments, the generative model may be trained with at least a portion of the unclassified data before generating the plurality of generated data items.

In some non-limiting embodiments, the first predictive model may include a teacher model and the second predictive model may include a student model.

In some non-limiting embodiments, the first predictive model may include at least one of a neural network, a DNN, a CNN, and/or the like. Additionally or alternatively, the second predictive model may include at least one of a linear regression, a decision tree, a rules-based model, and/or the like. Additionally or alternatively, the generative model may include at least one of a deep generative model or a variational auto-encoder (VAE).

In some non-limiting embodiments, selecting the first data item may include receiving a selection of the first data item from a user via a graphical user interface.

In some non-limiting embodiments, the graphical user interface may include a first view displaying a clustering of the data items of the classified data. Additionally or alternatively, the graphical user interface may include a second view displaying a confusion matrix. Additionally or alternatively, upon selection of at least one data item from the first view, the graphical user interface may further include a third view displaying at least one image associated with the at least one data item.

In some non-limiting embodiments, selecting the first data item may include receiving a selection of a first image of the at least one image associated with the first data item from the third view. Additionally or alternatively, upon receiving the selection of the first image, the graphical user interface may include a fourth view displaying probabilities associated with a plurality of possible classifications based on the first predictive model and the first data item and/or a fifth view displaying dimensions of the generative model based on the first data item.

In some non-limiting embodiments, upon selection of a button associated with the fifth view, generating the plurality of generated data items may include generating the plurality of generated data items by perturbing the first data item based on the dimensions of the generative model. Additionally or alternatively, the graphical user interface may include a sixth view displaying a plurality of second images associated with the plurality of generated data items and/or a seventh view displaying second probabilities associated with the plurality of possible classifications based on the second predictive model and the plurality of generated data items.

Further embodiments are set forth in the following numbered clauses:

Clause 1: A computer-implemented method, comprising: receiving, with at least one processor, unclassified data associated with a plurality of unclassified data items; classifying, with at least one processor, the unclassified data based on a first predictive model to generate classified data; selecting, with at least one processor, a first data item from the classified data; generating, with at least one processor, a plurality of generated data items associated with the first data item using a generative model; classify, with at least one processor, the plurality of generated data items based on the first predictive model to generate classified generated data; and training, with at least one processor, a second predictive model with the classified generated data.

Clause 2: The method of clause 1, further comprising: training, with at least one processor, the first predictive model with at least a portion of the unclassified data before classifying the unclassified data, wherein classifying the unclassified data comprises classifying, with at least one processor, the unclassified data based on the first predictive model as trained to generate the classified data.

Clause 3: The method of clause 1 or 2, further comprising training, with at least one processor, the generative model with at least a portion of the unclassified data before generating the plurality of generated data items.

Clause 4: The method of any preceding clause, wherein the first predictive model comprises a teacher model and the second predictive model comprises a student model.

Clause 5: The method of any preceding clause, wherein the first predictive model comprises at least one of a neural network, a deep neural network, or a convolutional neural network, wherein the second predictive model comprises at least one of a linear regression, a decision tree, or a rules-based model, and wherein the generative model comprises at least one of a deep generative model or a variational auto-encoder (VAE).

Clause 6: The method of any preceding clause, wherein selecting the first data item comprises receiving, with at least one processor, a selection of the first data item from a user via a graphical user interface.

Clause 7: The method of any preceding clause, wherein the graphical user interface comprises a first view displaying a clustering of the data items of the classified data.

Clause 8: The method of any preceding clause, wherein the graphical user interface further comprises a second view displaying a confusion matrix.

Clause 9: The method of any preceding clause, wherein, upon selection of at least one data item from the first view, the graphical user interface further comprises a third view displaying at least one image associated with the at least one data item.

Clause 10: The method of any preceding clause, wherein selecting the first data item comprises receiving, with at least one processor, a selection of a first image of the at least one image associated with the first data item from the third view, and wherein, upon receiving the selection of the first image, the graphical user interface further comprises a fourth view displaying probabilities associated with a plurality of possible classifications based on the first predictive model and the first data item and a fifth view displaying dimensions of the generative model based on the first data item.

Clause 11: The method of any preceding clause, wherein, upon selection of a button associated with the fifth view, generating the plurality of generated data items comprises generating, with at least one processor, the plurality of generated data items by perturbing the first data item based on the dimensions of the generative model, and wherein the graphical user interface further comprises a sixth view displaying a plurality of second images associated with the plurality of generated data items and a seventh view displaying second probabilities associated with the plurality of possible classifications based on the second predictive model and the plurality of generated data items.

Clause 12: A system, comprising: at least one processor; and at least one non-transitory computer-readable medium comprising instructions to direct the at least one processor to: receive unclassified data associated with a plurality of unclassified data items; classify the unclassified data based on a first predictive model to generate classified data; select a first data item from the classified data; generate a plurality of generated data items associated with the first data item using a generative model; classify the plurality of generated data items based on the first predictive model to generate classified generated data; and train a second predictive model with the classified generated data.

Clause 13: The system of clause 12, wherein the instructions further direct the at least one processor to: train the first predictive model with at least a portion of the unclassified data before classifying the unclassified data, wherein classifying the unclassified data comprises classifying the unclassified data based on the first predictive model as trained to generate the classified data.

Clause 14: The system of clause 12 or 13, wherein the instructions further direct the at least one processor to train the generative model with at least a portion of the unclassified data before generating the plurality of generated data items.

Clause 15: The system of any one of clauses 12-14, wherein the first predictive model comprises a teacher model and the second predictive model comprises a student model.

Clause 16: The system of any one of clauses 12-15, wherein the first predictive model comprises at least one of a neural network, a deep neural network, or a convolutional neural network, wherein the second predictive model comprises at least one of a linear regression, a decision tree, or a rules-based model, and wherein the generative model comprises at least one of a deep generative model or a variational auto-encoder (VAE).

Clause 17: The system of any one of clauses 12-16, wherein selecting the first data item comprises receiving a selection of the first data item from a user via a graphical user interface.

Clause 18: The system of any one of clauses 12-17, wherein the graphical user interface comprises a first view displaying a clustering of the data items of the classified data.

Clause 19: The system of any one of clauses 12-18, wherein the graphical user interface further comprises a second view displaying a confusion matrix.

Clause 20: The system of any one of clauses 12-19, wherein, upon selection of at least one data item from the first view, the graphical user interface further comprises a third view displaying at least one image associated with the at least one data item.

Clause 21: The system of any one of clauses 12-20, wherein selecting the first data item comprises receiving a selection of a first image of the at least one image associated with the first data item from the third view, wherein, upon receiving the selection of the first image, the graphical user interface further comprises a fourth view displaying probabilities associated with a plurality of possible classifications based on the first predictive model and the first data item and a fifth view displaying dimensions of the generative model based on the first data item.

Clause 22: The system of any one of clauses 12-21, wherein, upon selection of a button associated with the fifth view, generating the plurality of generated data items comprises generating the plurality of generated data items by perturbing the first data item based on the dimensions of the generative model, and wherein the graphical user interface further comprises a sixth view displaying a plurality of second images associated with the plurality of generated data items and a seventh view displaying second probabilities associated with the plurality of possible classifications based on the second predictive model and the plurality of generated data items.

Clause 23: A computer program product for local approximation of a predictive model, the computer program product comprising at least one non-transitory computer-readable medium including one or more instructions that, when executed by at least one processor, cause the at least one processor to: receive unclassified data associated with a plurality of unclassified data items; classify the unclassified data based on a first predictive model to generate classified data; select a first data item from the classified data; generate a plurality of generated data items associated with the first data item using a generative model; classify the plurality of generated data items based on the first predictive model to generate classified generated data; and train a second predictive model with the classified generated data.

Clause 24: The computer program product of clause 23, wherein the instructions further cause the at least one processor to: train the first predictive model with at least a portion of the unclassified data before classifying the unclassified data, wherein classifying the unclassified data comprises classifying the unclassified data based on the first predictive model as trained to generate the classified data.

Clause 25: The computer program product of clause 23 or 24, wherein the instructions further cause the at least one processor to train the generative model with at least a portion of the unclassified data before generating the plurality of generated data items.

Clause 26: The computer program product of any one of clauses 23-25, wherein the first predictive model comprises a teacher model and the second predictive model comprises a student model.

Clause 27: The computer program product of any one of clauses 23-26, wherein the first predictive model comprises at least one of a neural network, a deep neural network, or a convolutional neural network, wherein the second predictive model comprises at least one of a linear regression, a decision tree, or a rules-based model, and wherein the generative model comprises at least one of a deep generative model or a variational auto-encoder (VAE).

Clause 28: The computer program product of any one of clauses 23-27, wherein selecting the first data item comprises receiving a selection of the first data item from a user via a graphical user interface.

Clause 29: The computer program product of any one of clauses 23-28, wherein the graphical user interface comprises a first view displaying a clustering of the data items of the classified data.

Clause 30: The computer program product of any one of clauses 23-29, wherein the graphical user interface further comprises a second view displaying a confusion matrix.

Clause 31: The computer program product of any one of clauses 23-30, wherein, upon selection of at least one data item from the first view, the graphical user interface further comprises a third view displaying at least one image associated with the at least one data item.

Clause 32: The computer program product of any one of clauses 23-31, wherein selecting the first data item comprises receiving a selection of a first image of the at least one image associated with the first data item from the third view, wherein, upon receiving the selection of the first image, the graphical user interface further comprises a fourth view displaying probabilities associated with a plurality of possible classifications based on the first predictive model and the first data item and a fifth view displaying dimensions of the generative model based on the first data item.

Clause 33: The computer program product of any one of clauses 23-32, wherein, upon selection of a button associated with the fifth view, generating the plurality of generated data items comprises generating the plurality of generated data items by perturbing the first data item based on the dimensions of the generative model, and wherein the graphical user interface further comprises a sixth view displaying a plurality of second images associated with the plurality of generated data items and a seventh view displaying second probabilities associated with the plurality of possible classifications based on the second predictive model and the plurality of generated data items.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
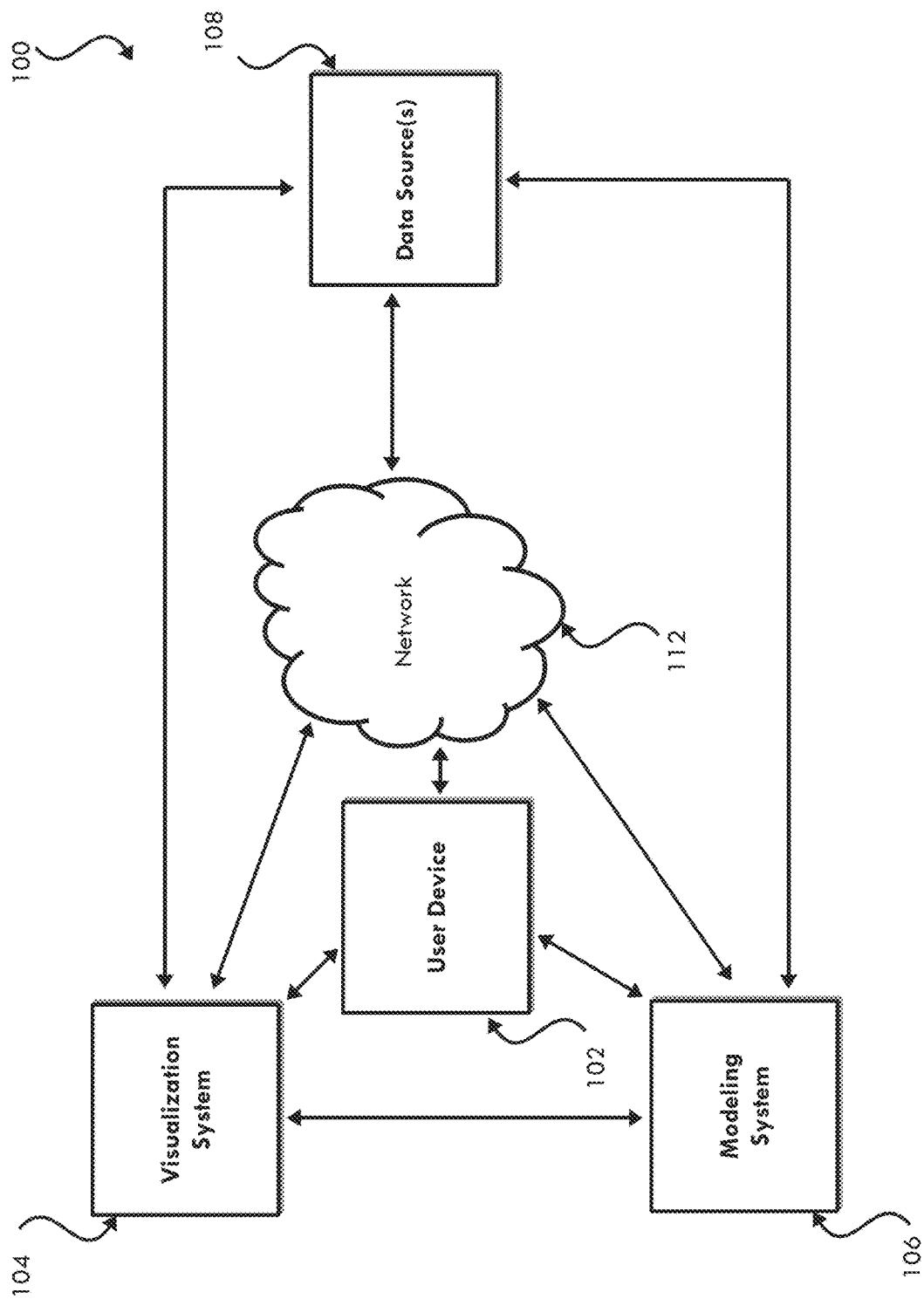
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "payment token" may refer to an identifier that is used as a substitute or replacement identifier for an account identifier, such as a PAN. Payment tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of payment tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a payment token value may be generated such that the recovery of the original PAN or other account identifier from the payment token value may not be computationally derived (e.g., with a one-way hash or other cryptographic function). Further, in some non-limiting embodiments, the payment token format may be configured to allow the entity receiving the payment token to identify it as a payment token and recognize the entity that issued the payment token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "payment token requestor" may refer to an entity that is seeking to implement tokenization according to embodiments of the presently disclosed subject matter. For example, the payment token requestor may initiate a request that a PAN be tokenized by submitting a payment token request message to a payment token service provider. Additionally or alternatively, a payment token requestor may no longer need to store a PAN associated with a payment token once the requestor has received the payment token in response to a payment token request message. In some non-limiting embodiments, the requestor may be an application, a device, a process, or a system that is configured to perform actions associated with payment tokens. For example, a requestor may request registration with a network payment token system, request payment token generation, payment token activation, payment token de-activation, payment token exchange, other payment token lifecycle management related processes, and/or any other payment token related processes. In some non-limiting embodiments, a requestor may interface with a network payment token system through any suitable communication network and/or protocol (e.g., using HTTPS, SOAP, and/or an XML interface among others). For example, a payment token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a payment token requestor may request payment tokens for multiple domains and/or channels. Additionally or alternatively, a payment token requestor may be registered and identified uniquely by the payment token service provider within the tokenization ecosystem. For example, during payment token requestor registration, the payment token service provider may formally process a payment token requestor's application to participate in the payment token service system. In some non-limiting embodiments, the payment token service provider may collect information pertaining to the nature of the requestor and relevant use of payment tokens to validate and formally approve the payment token requestor and establish appropriate domain restriction controls. Additionally or alternatively, successfully registered payment token requestors may be assigned a payment token requestor identifier that may also be entered and maintained within the payment token vault. In some non-limiting embodiments, payment token requestor identifiers may be revoked and/or payment token requestors may be assigned new payment token requestor identifiers. In some non-limiting embodiments, this information may be subject to reporting and audit by the payment token service provider.

As used herein, the term "payment token service provider" may refer to an entity including one or more server computers in a payment token service system that generates, processes, and maintains payment tokens. For example, the payment token service provider may include or be in communication with a payment token vault where the generated payment tokens are stored. Additionally or alternatively, the payment token vault may maintain one-to-one mapping between a payment token and a PAN represented by the payment token. In some non-limiting embodiments, the payment token service provider may have the ability to set aside licensed BINs as payment token BINs to issue payment tokens for the PANs that may be submitted to the payment token service provider. In some non-limiting embodiments, various entities of a tokenization ecosystem may assume the roles of the payment token service provider. For example, payment networks and issuers or their agents may become the payment token service provider by implementing the payment token services according to non-limiting embodiments of the presently disclosed subject matter. Additionally or alternatively, a payment token service provider may provide reports or data output to reporting tools regarding approved, pending, or declined payment token requests, including any assigned payment token requestor ID. The payment token service provider may provide data output related to payment token-based transactions to reporting tools and applications and present the payment token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "payment token vault" may refer to a repository that maintains established payment token-to-PAN mappings. For example, the payment token vault may also maintain other attributes of the payment token requestor that may be determined at the time of registration and/or that may be used by the payment token service provider to apply domain restrictions or other controls during transaction processing. In some non-limiting embodiments, the payment token vault may be a part of a payment token service system. For example, the payment token vault may be provided as a part of the payment token service provider. Additionally or alternatively, the payment token vault may be a remote repository accessible by the payment token service provider. In some non-limiting embodiments, payment token vaults, due to the sensitive nature of the data mappings that are stored and managed therein, may be protected by strong underlying physical and logical security. Additionally or alternatively, a payment token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for local approximation of a first (e.g., teacher, global, large, and/or the like) predictive model, including, but not limited to, generating generated data items using a generative model (e.g., a deep generative model, a variational auto-encoder (VAE), and/or the like) based on a data item of interest (e.g., selected and/or the like), and using the generated data items to train a second (e.g., student, local, small, and/or the like) predictive model to approximate the first predictive model. Such embodiments provide techniques and systems that allow the second predictive model, as trained based on the generated data items, to mimic the behavior of (e.g., accurately approximate the output of, be locally faithful to, and/or the like) the first predictive model around the data item of interest, and, thus, the behavior of the first predictive model may be more easily interpreted by a human based on the second predictive model. Additionally or alternatively, such embodiments provide techniques and systems that employ knowledge distillation (e.g., transfer knowledge from the (large, cumbersome) first predictive model to (small, easily understandable) second predictive model based on training the second predictive model using the output of the generative model) that may be more accurate and/or effective since the generated data items may be ensured to have semantic meaning and may be more efficient since the generated data items may be generated in a (reduced-) dimensional space of the generative model (e.g., rather than the high-dimensional space of the input). Additionally or alternatively, such embodiments provide techniques and systems that enable interpretation of the predictive models (e.g., interpretation of the first predictive model based on interpretation of the second predictive model) that is agnostic to the types of models (e.g., may be applied to any type of first predictive model and/or any type of second predictive model). Additionally or alternatively, non-limiting embodiments of the disclosed subject matter provide techniques and systems that allow visual interpretation of the predictive models (e.g., interpretation of the first predictive model based on visual interpretation of the second predictive model), e.g., by displaying multiple views (e.g., simultaneously, successively, and/or the like) with multiple different graphics, visualizations, statistics, visual analytics, and/or the like that depict, summarize, and/or the like multiple different portions of information that enable a human to understand the predictive models and/or behaviors thereof. Additionally or alternatively, non-limiting embodiments of the disclosed subject matter provide techniques and systems that include configurable graphical elements, e.g., to adjust settings, hyperparameters, functioning, inputs, outputs, and/or the like of the generative model, the second predictive model, and/or the like, and such adjustments may affect the training and/or outputs of the second predictive model (e.g., after training and/or retraining), thereby providing additional insights into the first predictive model.

For the purpose of illustration, in the following description, while the presently disclosed subject matter is described with respect to methods, systems, and computer program products for local approximation of a predictive model, e.g., for images, one skilled in the art will recognize that the disclosed subject matter is not limited to the illustrative embodiments. For example, the methods, systems, and computer program products described herein may be used with a wide variety of settings, such as in any suitable setting for predictive model(s), e.g., fraud detection, medical diagnosis, autonomous driving, classification, and/or the like.

Referring now to FIG. 1, FIG. 1 is a diagram of a non-limiting embodiment of an environment 100 in which methods, systems, and/or products, as described herein, may be implemented. As shown in FIG. 1, environment 100 may include user device 102, visualization system 104, modeling system 106, data source(s) 108, and/or network 112.

User device 102 may include one or more devices capable of receiving information from and/or communicating information to visualization system 104, modeling system 106, and/or data source(s) 108 (e.g., via network 112 and/or the like, as described herein). Additionally or alternatively, each user device 102 may include a device capable of receiving information from and/or communicating information to other user devices 102 (e.g., via network 112 and/or the like, as described herein). In some non-limiting embodiments, user device 102 may include a client device and/or the like. In some non-limiting embodiments, user device 102 may include at least one computing device, e.g., one or more computers, portable computers, laptop computers, tablet computers, mobile devices, cellular phones, wearable devices (e.g., watches, glasses, lenses, clothing, and/or the like), personal digital assistants (PDAs), Internet of Things (IoT) devices, and/or the like. In some non-limiting embodiments, user device 102 may or may not be capable of communicating (e.g., transmitting, receiving, and/or the like) information via a short-range wireless communication connection (e.g., an NFC communication connection, an RFID communication connection, a Bluetooth® communication connection, a Zigbee® communication connection, and/or the like). In some non-limiting embodiments, each user device 102 may include and/or be a part of at least one of visualization system 104, modeling system 106, and/or the like.

Visualization system 104 may include one or more devices capable of receiving information from and/or communicating information to user device 102, modeling system 106, and/or data source(s) 108 (e.g., via network 112 and/or the like, as described herein). For example, visualization system 104 may include at least one computing device, such as a server (e.g., a transaction processing server and/or the like), a group of servers, and/or other like devices. Additionally or alternatively, visualization system 104 may include at least one computing device, e.g., one or more computers, portable computers, laptop computers, tablet computers, mobile devices, cellular phones, wearable devices (e.g., watches, glasses, lenses, clothing, and/or the like), PDAs, IoT devices, and/or the like. In some non-limiting embodiments, visualization system 104 may be associated with a transaction service provider as described herein. In some non-limiting embodiments, visualization system 104 may be in communication with a data storage device, which may be local or remote to visualization system 104. In some non-limiting embodiments, visualization system 104 may be capable of receiving information from, storing information in, communicating information to, or searching information stored in such a data storage device. In some non-limiting embodiments, visualization system 104 may include and/or be a part of user device 102. Additionally or alternatively, visualization system 104 may include and/or be a part of modeling system 106.

Modeling system 106 may include one or more devices capable of receiving information from and/or communicating information to user device 102, visualization system 104, and/or data source(s) 108 (e.g., via network 112 and/or the like, as described herein). For example, modeling system 106 may include at least one computing device, such as a server (e.g., a transaction processing server and/or the like), a group of servers, and/or other like devices. Additionally or alternatively, modeling system 106 may include at least one computing device, e.g., one or more computers, portable computers, laptop computers, tablet computers, mobile devices, cellular phones, wearable devices (e.g., watches, glasses, lenses, clothing, and/or the like), PDAs, IoT devices, and/or the like. In some non-limiting embodiments, modeling system 106 may be associated with a transaction service provider as described herein. In some non-limiting embodiments, modeling system 106 may be in communication with a data storage device, which may be local or remote to modeling system 106. In some non-limiting embodiments, modeling system 106 may be capable of receiving information from, storing information in, communicating information to, or searching information stored in such a data storage device. In some non-limiting embodiments, modeling system 106 may include and/or be a part of user device 102. Additionally or alternatively, modeling system 106 may include and/or be a part of visualization system 104.

Data source(s) 108 may include one or more devices capable of receiving information from and/or communicating information to user device 102, visualization system 104, modeling system 106, and/or the like (e.g., via network 112 and/or the like, as described herein). For example, data source(s) 108 may include a computing device, a server, a group of servers, and/or the like. Additionally or alternatively, data source(s) 108 may include may include at least one computing device, e.g., one or more computers, portable computers, laptop computers, tablet computers, mobile devices, cellular phones, wearable devices (e.g., watches, glasses, lenses, clothing, and/or the like), PDAs, IoT devices, and/or the like. In some non-limiting embodiments, data source(s) 108 may be associated with a transaction service provider as described herein. In some non-limiting embodiments, data source(s) 108 may store a plurality of data items and/or the like, as described herein. In some non-limiting embodiments, data source(s) 108 may include and/or be a part of user device 102. Additionally or alternatively, data source(s) 108 may include and/or be a part of at least one of visualization system 104 and/or modeling system 106.

In some non-limiting embodiments, any combination of user device 102, visualization system 104, modeling system 106, and/or data source(s) 108 may be implemented (e.g., completely, partially, and/or the like) on a single device (e.g., a computing device, such as a server, a computer, a portable computer, a laptop computer, a tablet computer, a mobile device, a cellular phone, a wearable device, a PDA, an IoT device, and/or the like). In some non-limiting embodiments, user device 102, visualization system 104, modeling system 106, and data source(s) 108 may all be implemented (e.g., completely, partially, and/or the like) on a single device.

Network 112 may include one or more wired and/or wireless networks. For example, such networks may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
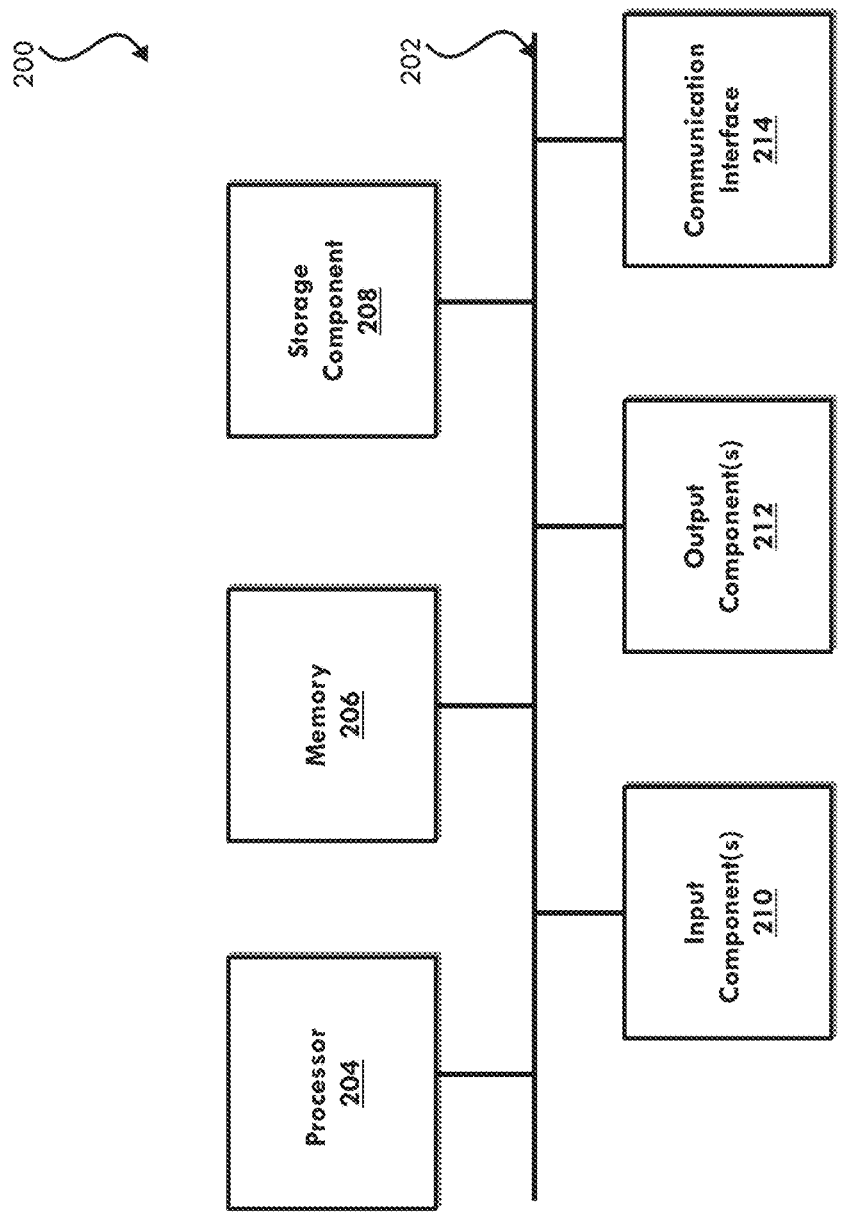
FIG. 2 is a diagram of a non-limiting embodiment of components of one or more devices of FIG. 1.

Referring now to FIG. 2, FIG. 2 is a diagram of example components of a device 200. Device 200 may correspond to user device 102, one or more devices of visualization system 104, one or more devices of modeling system 106, and/or one or more devices of data source(s) 108. In some non-limiting embodiments, user device 102, visualization system 104, modeling system 106, and/or data source(s) 108 may include at least one device 200 and/or at least one component of device 200. As shown in FIG. 2, device 200 may include bus 202, processor 204, memory 206, storage component 208, input component(s) 210, output component(s) 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component(s) 210 may include a component that permits device 200 to receive information, such as via user input (e.g., a touch screen display, a keyboard, a keypad, a mouse, a button, a switch, a microphone, a camera, and/or the like). Additionally or alternatively, input component(s) 210 may include a sensor for sensing information (e.g., a global positioning system (GPS) component, an accelerometer, a gyroscope, an actuator, and/or the like). Output component(s) 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
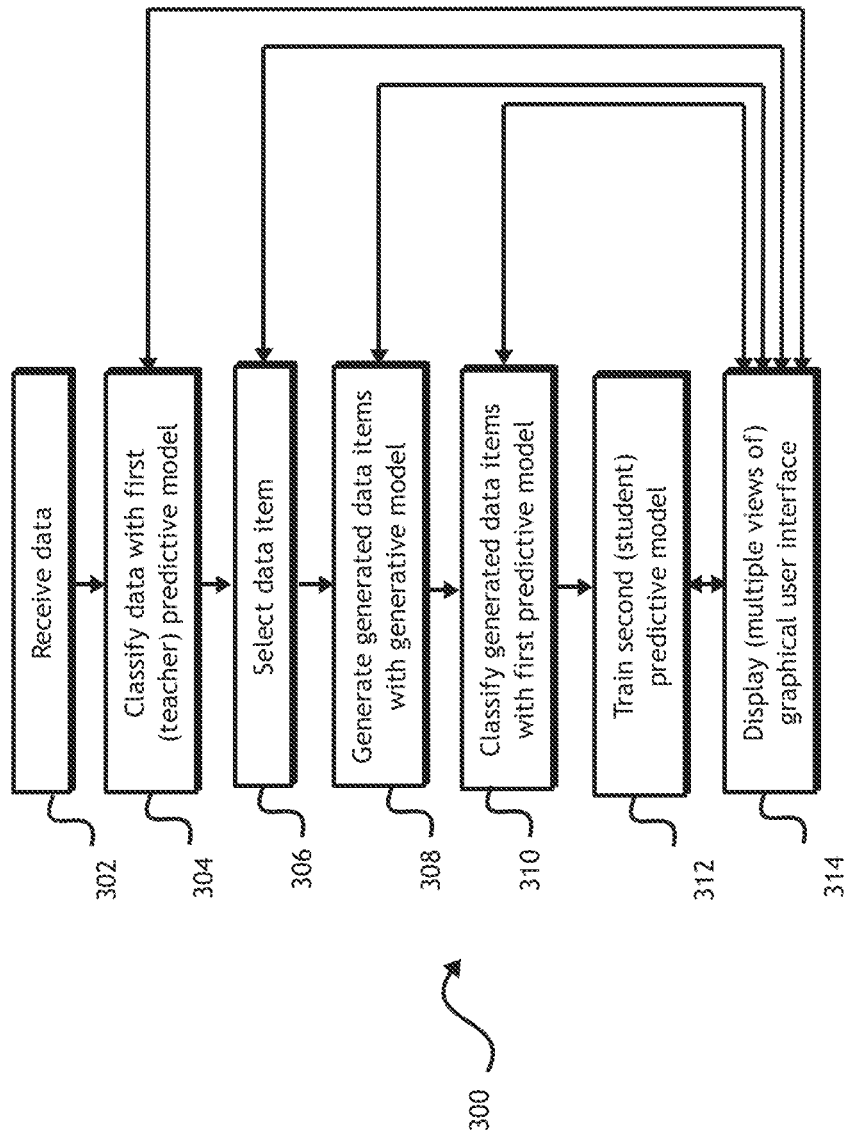
FIG. 3 is a flowchart of a non-limiting embodiment of a process for local approximation of a predictive model, according to the principles of the presently disclosed subject matter.

Referring now to FIG. 3, FIG. 3 is a flowchart of a non-limiting embodiment of a process 300 for local approximation of a predictive model. In some non-limiting embodiments, one or more of the steps of process 300 may be performed (e.g., completely, partially, and/or the like) by modeling system 106. In some non-limiting embodiments, one or more of the steps of process 300 may be performed (e.g., completely, partially, and/or the like) by another system, another device, another group of systems, or another group of devices, separate from or including modeling system 106, such as user device 102, visualization system 104, data source(s) 108, and/or the like.

As shown in FIG. 3, at step 302, process 300 may include receiving data. For example, modeling system 106 may receive data associated with a plurality of unclassified data items (e.g., from data source(s) 108 and/or the like).

In some non-limiting embodiments, the unclassified data items can be any suitable data items. For example, each unclassified data item may include an image (e.g., a matrix, array, and/or the like of pixel values and/or the like). For example, each unclassified data item may include transaction data (e.g., payment transaction data). In some non-limiting embodiments, transaction data may include a vector having a plurality of features. Additionally or alternatively, each feature may be associated with at least one of a value (e.g., a numerical value), an identifier (e.g., account identifier associated with a consumer account, merchant identifier associated with a merchant, issuer identifier (e.g., bank identification number (BIN)) associated with an issuer, acquirer identifier associated with an acquirer, and/or the like), a category and/or categorical value (e.g., merchant category code, transaction type and/or channel, card present, card not present, and/or the like), a Boolean value (e.g., true (e.g., 1) or false (e.g., 0)), and/or the like.

In some non-limiting embodiments, a plurality of true labels (e.g., predefined labels, human-created labels, and/or the like) may be associated with the plurality of unclassified data items. For example, each true label may be associated with an actual classification of a respective unclassified data item.

In some non-limiting embodiments, a first (e.g., teacher) predictive model may be trained (e.g., by modeling system 106 and/or the like) at least a portion of the unclassified data. For example, the unclassified data may include training data and/or testing data. Additionally or alternatively, at least a portion of the unclassified data (e.g., at least a portion of the training data) may be used to train the first predictive model.

In some non-limiting embodiments, the first predictive model may include at least one of a neural network, a deep neural network (DNN), a convolutional neural network (CNN), any combination thereof, and/or the like. Additionally or alternatively, the first predictive model may be trained (e.g., by modeling system 106 and/or the like) by using the first predictive model to generate first predictions (e.g., a predicted classification and/or probability of at least one classification for each data item of the (portion of) unclassified data), determining at least one error value based on the first predictions and the true labels, and training the first predictive model based on the error value (e.g., updating the weights of the first predictive model to reduce the error value and/or the like).

As shown in FIG. 3, at step 304, process 300 may include classifying the data. For example, modeling system 106 may classify the data with a first (e.g., teacher) predictive model to generate classified data. In some non-limiting embodiments, classified data may include the data items and/or predictions associated therewith (e.g., a predicted classification and/or probability of at least one classification for each data item determined using the first predictive model), as described herein.

In some non-limiting embodiments, classifying the unclassified data may include classifying (e.g., with modeling system 106 and/or the like) the unclassified data with the first predictive model (e.g., as trained) to generate the classified data. For example, the first predictive model may include at least one of a neural network, a deep neural network (DNN), a convolutional neural network (CNN), any combination thereof, and/or the like. Additionally or alternatively, classifying the unclassified data may include generating (e.g., by modeling system 106 and/or the like) predictions based on the unclassified data with the first predictive model, as described herein.

In some non-limiting embodiments, a graphical user interface may be generated. For example, visualization system 104 and/or the like may generate a graphical user interface, which may be presented on (e.g., displayed by and/or the like) user device 102. In some non-limiting embodiments, the graphical user interface may include (e.g., visualization system 104 and/or the like may generate the graphical user interface to include) a first view displaying a clustering of the data items of the classified data. For example, the classified data may be clustered (e.g., by modeling system 106 and/or the like) based on the predictions (e.g., predicted classifications and/or probabilities of at least one classification for each data item determined using the first predictive model). For example, all data items predicted to be in the same classification may be clustered, as described herein.

In some non-limiting embodiments, the graphical user interface may include (e.g., visualization system 104 and/or the like may generate the graphical user interface to include) a second view displaying a confusion matrix. For example, visualization system 104 may generate a confusion matrix, which may include rows associated with a true label (e.g., actual classification) of data items and columns associated with predictions (e.g., predicted classifications and/or probabilities as predicted by modeling system 106 with the first (e.g., teacher) predictive model).

As shown in FIG. 3, at step 306, process 300 may include selecting a data item. For example, modeling system 106 may select a first data item from the classified data.

In some non-limiting embodiments, modeling system 106 may automatically select a selected (e.g., first) data item based on a respective (e.g., first) prediction associated therewith not matching a true label for selected data item. Additionally or alternatively, modeling system 106 may receive a selection of a selected (e.g., first) data item, as described herein.

In some non-limiting embodiments, a graphical user interface may be generated. For example, visualization system 104 and/or the like may generate a graphical user interface, which may be presented on (e.g., displayed by and/or the like) user device 102. Additionally or alternatively, selecting the first data item may include receiving (e.g., by modeling system 106 (e.g., directly, via visualization system 104, via user device 102, and/or the like)) a selection of the selected (e.g., first) data item from the user via the graphical user interface (e.g., a first view of the graphical user interface). For example, a user may select (e.g., via user input received at user device 102 associated with graphical user interface displayed thereon (e.g., as generated by visualization system 104)). In some non-limiting embodiments, the user input may include clicking on at least one data item, circling and/or lassoing at least one data item, and/or the like.

In some non-limiting embodiments, the graphical user interface may include (e.g., visualization system 104 and/or the like may generate the graphical user interface to include) a third view displaying at least one image associated with the selected data item(s). For example, visualization system 104 may receive a selection of at least one data item (e.g., a plurality of data items) from the first view (e.g., via user input received from user device 102 associated with graphical user interface displayed thereon (e.g., as generated by visualization system 104)). Additionally or alternatively, visualization system 104 may generate the third view based on images (e.g., received and/or retrieved from data source(s) 108) associated with each selected data item.

In some non-limiting embodiments, selecting the first data item may include modeling system 106 receiving (e.g., via user input received from user device 102 associated with graphical user interface displayed thereon (e.g., as generated by visualization system 104)) a selection of a first image associated with the first data item from the third view, as described herein.

In some non-limiting embodiments, the graphical user interface may include (e.g., visualization system 104 and/or the like may generate the graphical user interface to include) a fourth view displaying probabilities associated with a plurality of possible classifications and/or a bar graph including bars associated with respective probabilities. For example, visualization system 104 may receive a selection of an image (e.g., first image) associated with a data item (e.g., first data item) from the third view, as described herein. Additionally or alternatively, visualization system 104 may generate the fourth view based on the probabilities (e.g., based on (first) predictions from the modeling system 106 with the first (e.g., teacher) predictive model) associated with the possible classifications, as described herein.

In some non-limiting embodiments, the graphical user interface may include (e.g., visualization system 104 and/or the like may generate the graphical user interface to include) a fifth view displaying dimensions of the generative model. For example, the fifth view may display dimensions of the generative model based on the first data item. Additionally or alternatively, visualization system 104 may generate a respective graphical element (e.g., respective slider bar and/or the like) associated with each dimension (e.g., based on the first data item) as described herein. In some non-limiting embodiments, the graphical element may indicate a perturbation range for each dimension, as described herein. For example, if the graphical element(s) include a respective slider bar for each dimension, a shaded band around a center point for each slider bar may define the perturbation range, as described herein.

As shown in FIG. 3, at step 308, process 300 may include generating generated data items. For example, modeling system 106 may generate a plurality of generated data items associated with the first data item with a generative model.

In some non-limiting embodiments, the generative model may be trained (e.g., by modeling system 106) with at least a portion of the unclassified data before generating the plurality of generated data items, as described herein.

In some non-limiting embodiments, the generative model may include at least one of a deep generative model, variational auto-encoder (VAE), a convolutional neural network, a fully connected neural network, a generative adversarial network (GAN), a progressive GAN, any combination thereof, and/or the like, as described herein.

In some non-limiting embodiments, the graphical user interface may include (e.g., visualization system 104 and/or the like may generate the graphical user interface to include) a sixth view displaying a plurality of second images associated with the plurality of generated data items. For example, modeling system 106 may use the generative model to generate the generated data items by perturbing the selected (e.g., first) data item (e.g., associated with selected (e.g., first) image) based on the dimensions of the generative model (e.g., based on the perturbation range for each dimension from the fifth view), as described herein. In some non-limiting embodiments, visualization system 104 and/or modeling system 106 may receive a selection of a graphical element (e.g., button and/or the like), e.g., via user input from user device 102, and the generation of the generated data items may be based on selection of that button. For example, that button may be associated with (e.g., generated by visualization system 104 in) the fifth view. In some non-limiting embodiments, visualization system 104 may generate the sixth view to display the second images associated with the generated data items, as described herein.

As shown in FIG. 3, at step 310, process 300 may include classifying the generated data items. For example, modeling system 106 may classify the plurality of generated data items with the first (e.g., teacher) predictive model to generate classified generated data, as described herein. In some non-limiting embodiments, classified generated data may include the generated data items and/or predictions associated therewith (e.g., a predicted classification and/or probability of at least one classification for each generated data item determined using the first predictive model), as described herein.

As shown in FIG. 3, at step 312, process 300 may include training another predictive model. For example, modeling system 106 may train a second (e.g., student) predictive model with the classified generated data.

In some non-limiting embodiments, the second (e.g., student) predictive model may include at least one of a linear regression, a linear model, a decision tree, a rules-based model, a neural network, any combination thereof, and/or the like. For example, a neural network of the second (e.g., student) predictive model may have less layers than the first (e.g., teacher) predictive model, as described herein. Additionally or alternatively, a neural network of the second (e.g., student) predictive model may include at least one of an input layer, a logits layer, an output/softmax layer, any combination thereof, and/or the like.

In some non-limiting embodiments, the graphical user interface may include (e.g., visualization system 104 and/or the like may generate the graphical user interface to include) a seventh view displaying second probabilities associated with the plurality of possible classifications (e.g., from modeling system 106 based on the second (e.g., student) predictive model and the plurality of generated data items) and/or a bar graph including bars associated with respective probabilities, as described herein. For example, visualization system 104 may generate the seventh view based on probabilities (e.g., based on (second) predictions from the modeling system 106 with the second (e.g., student) predictive model) associated with the possible classifications, as described herein. In some non-limiting embodiments, the seventh view may include (e.g., visualization system 104 may generate in seventh view) a first column of images and a second column of images, and each such column may have a row corresponding to a respective one of the possible classifications. For example, the first column may include a visualization of a normalization of the weight matrix for the respective possible classification (e.g., based on the second (e.g., student) predictive model from modeling system 106). Additionally or alternatively, the second column may include images showing the weighted features (e.g., pixels) for the selected (e.g., first) image for each respective possible classification (e.g., multiplying the weight matrices with the features (e.g., pixels) of the image of interest (e.g. selected image)). In some non-limiting embodiments, images of the second column may be normalized together to highlight how different features (e.g., pixels) contribute to each of the (e.g., 10) possible classifications (e.g., values from small to large may be mapped to shades from dark (e.g., black) to light (e.g., white)).

As shown in FIG. 3, at step 314, process 300 may include displaying a graphical user interface. For example, user device 102, visualization system 104, modeling system 106, and/or the like may display a graphical user interface including at least one view, as described herein.

In some non-limiting embodiments, visualization system 104 may generate a graphical user interface including at least one of the first view, the second view, the third view, the fourth view, the fifth view, the sixth view, the seventh view, and/or the like, as described herein. Additionally or alternatively, visualization system 104 may communicate the graphical user interface (e.g., graphical user interface data associated therewith) to user device 102.

In some non-limiting embodiments, user device 102 may present (e.g., display and/or the like) a graphical user interface including at least one of the first view, the second view, the third view, the fourth view, the fifth view, the sixth view, the seventh view, and/or the like, as described herein. Additionally or alternatively, the user device may display the graphical user interface based on graphical user interface data received from visualization system 104.

Figure 4A:
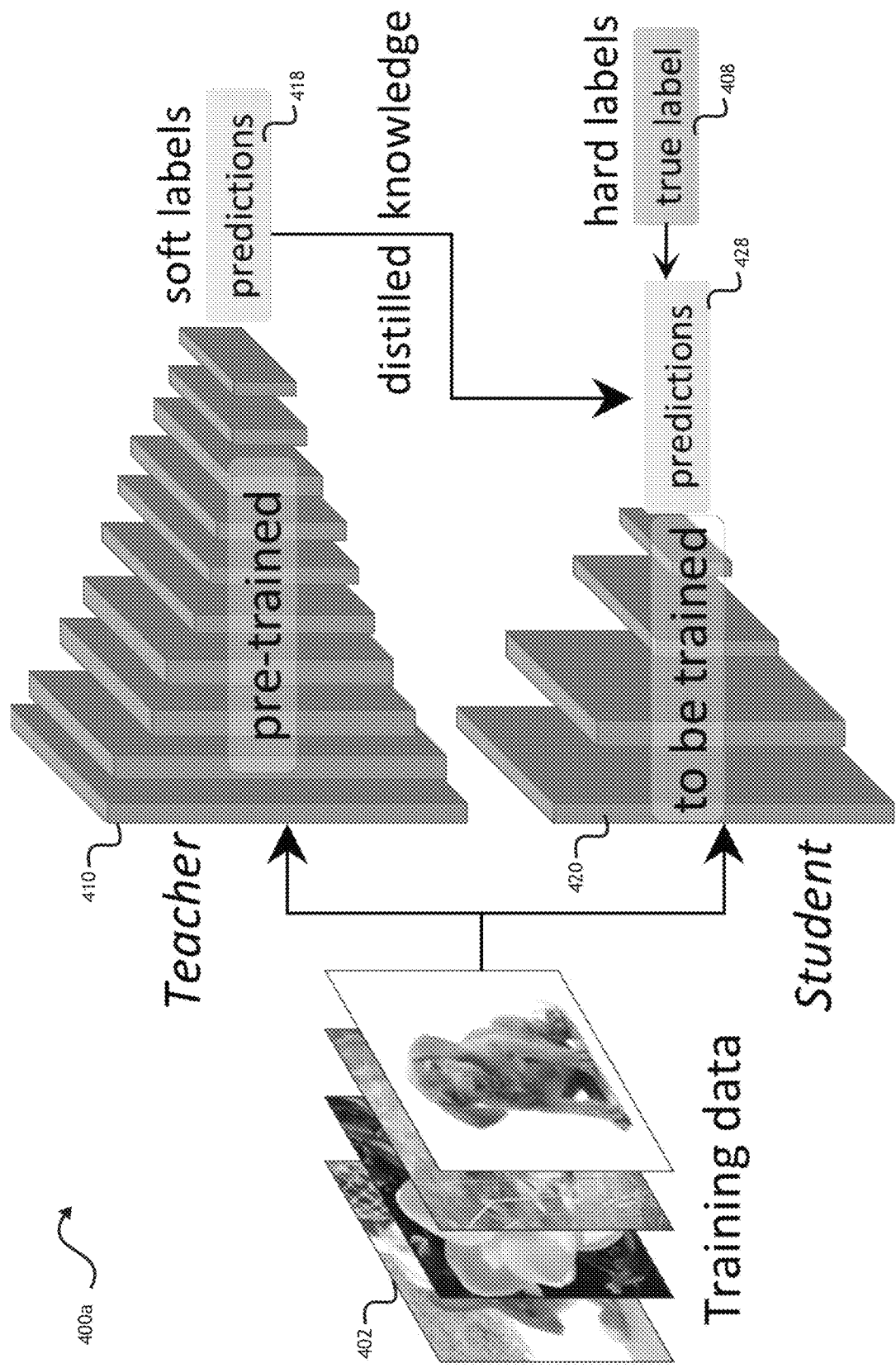
FIGS. 4A-4B are diagrams of a non-limiting embodiment of an implementation of a non-limiting embodiment of a first (e.g., teacher) predictive model and a second (e.g., student) predictive model, which may be used in the process shown in FIG. 3, according to the principles of the presently disclosed subject matter.

Referring to FIG. 4A, FIG. 4A is a diagram of an exemplary implementation 400a of a non-limiting embodiment of a first (e.g., teacher) predictive model and a second (e.g., student) predictive model relating to process 300 shown in FIG. 3. In some non-limiting embodiments, implementation 400a may be implemented (e.g., completely, partially, and/or the like) by modeling system 106. In some non-limiting embodiments, implementation 400a may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 4A, implementation 400a may include first (e.g., teacher) predictive model 410 and/or second (e.g., student) predictive model 420. In some non-limiting embodiments, first predictive model 410 and/or second predictive model 420 may be implemented (e.g., completely, partially, and/or the like) by modeling system 106. In some non-limiting embodiments, first predictive model 410 and/or second predictive model 420 may be implemented (e.g., completely, partially, and/or the like) by another system, another device, another group of systems, or another group of devices, separate from or including modeling system 106, such as user device 102, visualization system 104, data source(s) 108, and/or the like.

In some non-limiting embodiments, data 402 (e.g., training data) may be received (e.g., by modeling system 106 from data source(s) 108 and/or the like). Additionally or alternatively, first (e.g., teacher) predictive model 410 may be used (e.g., by modeling system 106 and/or the like) to classify data 402 to generate first predictions 418 associated with classifications for the data items of data 402, as described herein. In some non-limiting embodiments, classified data may include data 402 and/or predictions 418 associated therewith, as described herein.

In some non-limiting embodiments, second (e.g., student) predictive model 420 may be trained (e.g., by modeling system 106 and/or the like) based on at least a portion of data 402 and/or first predictions 418 (e.g., at least a portion of classified data including data 402 and/or predictions 418 associated therewith), as described herein. Additionally or alternatively, second predictive model 420 may be used (e.g., by modeling system 106 and/or the like) to generate second predictions 428. In some non-limiting embodiments, second predictions 428 may be intended to approximate first predictions 418, as described herein. In some non-limiting embodiments, training second predictive model 420 may include determining an error based on the first predictions 418 and the second predictions 428 and/or adjusting second predictive model 420 to reduce the error, as described herein.

In some non-limiting embodiments, data 402 may be associated with true labels 408 (e.g., predefined labels, human-created labels, and/or the like). In some non-limiting embodiments, at least one of first predictions 418 and/or second predictions 428 may be intended to approximate true labels 408, as described herein. In some non-limiting embodiments, training first predictive model 410 may include determining an error based on first predictions 418 and true labels 408 and/or adjusting first predictive model 410 to reduce the error, as described herein. In some non-limiting embodiments, training second predictive model 420 may include determining an error based on second predictions 428 and true labels 408 and/or adjusting second predictive model 420 to reduce the error, as described herein.

In some non-limiting embodiments, knowledge distillation may be used to compress cumbersome models (e.g, first predictive model 410) into light-weight models (e.g., second predictive model 420) for various purposes (e.g., simplifying the deployment of a model and/or the like). For example, a small second (e.g., student) predictive model 420 may be trained using knowledge distilled from a cumbersome first (e.g., teacher) predictive model 410 (which may be pre-trained, trained before training the second model, and/or the like). In some non-limiting embodiments, the second predictive model 420 may be trained so that the logits (e.g., second predictions 428) of the second predictive model 420 match the logits (e.g., first predictions 418) of the first predictive model 410, as described herein. In some non-limiting embodiments, the first (e.g., teacher) predictive model 410 may include a pre-trained deep neural network (DNN), which may take data (e.g., images) as input and/or may output predictions (e.g., probabilities and/or the like) associated with classification(s) of the data. Additionally or alternatively, the second (e.g., student) predictive model 420 may also include a neural network (e.g., DNN and/or the like), and/or the second predictive model 420 may contain fewer (e.g., much fewer) layers than the first predictive model 410. In some non-limiting embodiments, the second predictive model 420 may be trained using the same inputs (e.g., images) as the first predictive model 410 and/or a portion (e.g., subset) thereof. In some non-limiting embodiments, the training loss of second (e.g., student) predictive model 420 may contains two parts, e.g., minimizing the difference between the predicted labels (second predictions 428) and true labels 408 (e.g., hard labels) and minimizing the difference between the predicted labels (second predictions 428) and predictions (e.g., first predictions 418) from the first (e.g., teacher) predictive model 410 (e.g., soft labels). For example, the soft labels (e.g., first predictions 418) may be associated with relative probabilities of different classes, and/or such soft labels (e.g., first predictions 418) provide rich information about how the first (e.g., teacher) predictive model 410 interprets the input data (e.g., images). For example, an image of a truck may have some probability to be misclassified as a car, but such an image may have a very small probability to be misclassified as a dog.

For the purpose of illustration, an image dataset may be denoted mathematically as {X; Y} (e.g., where X is the set of images and/or Y is the set of labels associated with such images). Additionally or alternatively, by feeding an image $x \in X$ into the first (e.g., teacher) predictive model 410 and second (e.g., student) predictive model 420, two sets of logits may be generated: $Z_t$ and $Z_s$, respectively. In some non-limiting embodiments, the prediction (e.g., probability distribution) from the first (e.g., teacher) predictive model 410 and second (e.g., student) predictive model 420 may be denoted as $P_t$=softmax($Z_t$/T) and $P_s$=softmax($Z_s$/T), respectively, where T may be the distillation temperature (e.g., controlling the entropy in $P_t$ and $P_s$). (For example, T may be set to 1 by default.) In some embodiments, the softmax function may be defined as:

$$\text{softmax} = \frac{e^{y_i/T}}{\sum_i e^{y_i/T}}.$$

Additionally or alternatively, the training loss for the second (e.g., student) predictive model 420 may be given by the following equation:

$$l_s = \alpha L_{hard}(P_s, y) + \beta L_{soft}(P_s, P_t), \quad (1)$$

where $\alpha$, $\beta$ are two coefficients, y is the true label (e.g., hard label) for x (e.g., a one-hot vector), and $L_{hard}$, $L_{soft}$ are measured by cross-entropy. In some non-limiting embodiments, increasing the value of T may increase the entropy in $P_s$, which may enhance the second (e.g., student) predictive model 420 to learn the relative probabilities of different classes from the (pre-trained) first (e.g., teacher) predictive model 410. Additionally or alternatively, if T is too large, the probability of irrelevant classes may be over-emphasized. In some non-limiting embodiments, the value of T may be selected (e.g., adjusted and/or the like) as suitable for the selected data items.

In some non-limiting embodiments, knowledge distillation may be used to distill and/or transfer knowledge between models (e.g., first (e.g, teacher) predictive model 410 and second (e.g., student) predictive model 420) for the purpose of interpretation. Additionally or alternatively, the second (e.g., student) predictive model 420 may locally approximate (but not necessarily fully mimic) behaviors of the first (e.g., teacher) predictive model 410, and, therefore, the second (e.g., student) predictive model 420 may be much simpler and more explainable/interpretable.

Figure 4B:
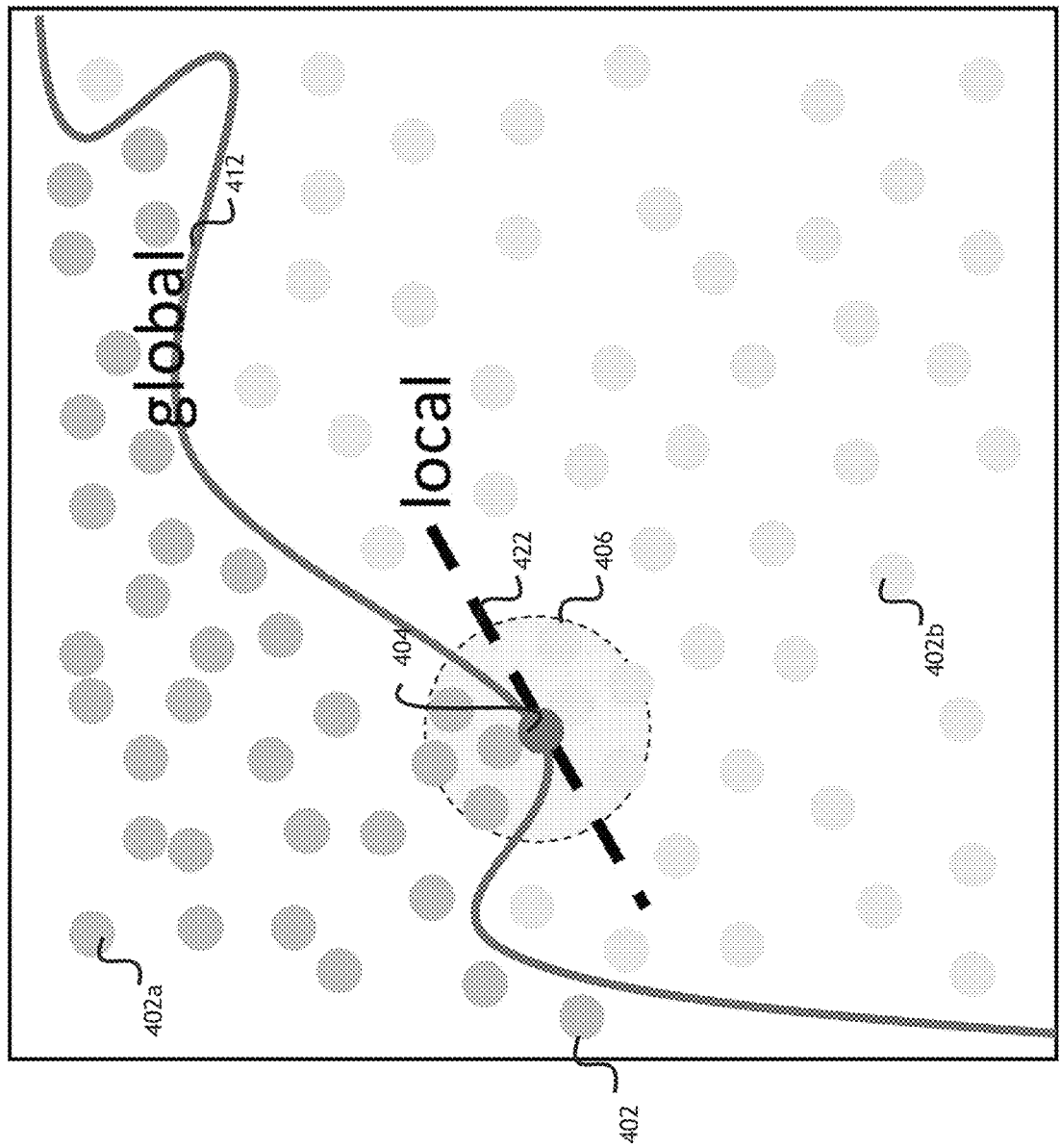

Referring to FIG. 4B, FIG. 4B is a diagram of an exemplary graph 400b relating to implementation 400a shown in FIG. 4A. In some non-limiting embodiments, graph 400b may include data 402 (e.g., data associated with a first classification 402a, data associated with a second classification 402b, and/or the like), selected data item 404, local area 406, first (e.g., global) decision boundary 412, and/or second (e.g., local) decision boundary 422.

In some non-limiting embodiments, first decision boundary 412 may be associated with a decision boundary learned by first predictive model 410 (e.g., based on training by modeling system 106 based on data 402, true labels 408, predictions 418, and/or the like). Additionally or alternatively, second decision boundary 422 may be associated with a decision boundary learned by second predictive model 420 (e.g., based on training by modeling system 106 based on at least a portion of data 402, true labels 408, predictions 418, predictions 428, and/or the like). In some non-limiting embodiments, second decision boundary 422 may approximate first decision boundary 412 in local area 406 around selected data item 404.

In some non-limiting embodiments, the idea of localization may include approximating the behavior of a classifier (e.g., first predictive model 410) at a point of interest (e.g., selected data item 404) using a simple interpretable model (e.g., second predictive model 420). For the purpose of illustration, as shown in FIG. 4B, the data 402 from two different classes (e.g., data associated with a first classification 402a and data associated with a second classification 402b) may have different shading. In some non-limiting embodiments, first decision boundary 412 may include classifier's (e.g., first predictive model's 410) decision boundary. In some non-limiting embodiments, interpreting first decision boundary 412 may be difficult. Additionally or alternatively, the classifier's (e.g., first predictive model's) local behavior around the sample of interest (e.g., selected data item 404) may be explained with a simple model (e.g., second predictive model 420, which may have a second decision boundary 422 (e.g., a line)). Additionally or alternatively, the simple model (e.g., second predictive model 420) may be trained using the samples in the shaded region (e.g., local area 406). In some non-limiting embodiments, local approximation (e.g., using second predictive model 420) may be used to interpret and diagnose a complicated model (e.g., first predictive model 410), and such local approximation may be improved with a generative model (e.g., deep generative model and/or the like) to enhance the efficiency and accuracy, as described herein.

Figure 5:
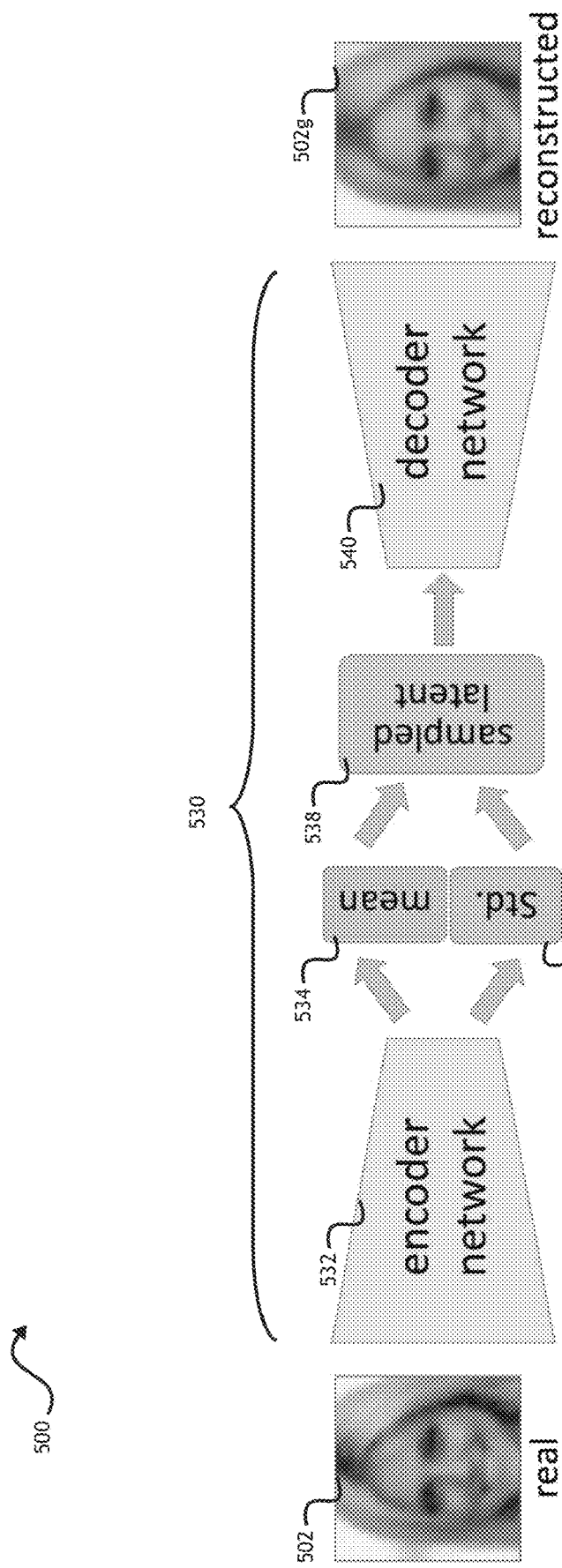
FIG. 5 is a diagram of a non-limiting embodiment of an implementation of a non-limiting embodiment of a generative model, which may be used in the process shown in FIG. 3, according to the principles of the presently disclosed subject matter.

Referring to FIG. 5, FIG. 5 is a diagram of an exemplary implementation 500 of a non-limiting embodiment of a generative model 530 relating to process 300 shown in FIG. 3. In some non-limiting embodiments, implementation 500 may be implemented (e.g., completely, partially, and/or the like) by modeling system 106. In some non-limiting embodiments, implementation 500 may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 5, implementation 500 may include generative model 530 (e.g., including encoder network 532 and/or decoder network 540). In some non-limiting embodiments, generative model 530 (e.g., encoder network 532 and/or decoder network 540) may be implemented (e.g., completely, partially, and/or the like) by modeling system 106. In some non-limiting embodiments, generative model 530 (e.g., encoder network 532 and/or decoder network 540) may be implemented (e.g., completely, partially, and/or the like) by another system, another device, another group of systems, or another group of devices, separate from or including modeling system 106, such as user device 102, visualization system 104, data source(s) 108, and/or the like.

In some non-limiting embodiments, data 502 (e.g., real data, input data, a selected data item, and/or the like) may be received (e.g., by modeling system 106 from data source(s) 108 and/or the like). Additionally or alternatively, generative model 530 (e.g., encoder network 532 and/or decoder network 540) may be used (e.g., by modeling system 106 and/or the like) to generate at least one generated data item 502g (e.g., reconstructed data item(s), perturbed data item(s), and/or the like) associated with at least one data item (e.g., a selected data item and/or the like) of data 502, as described herein.

In some embodiments, encoder network 532 may be used (e.g., by modeling system 106 and/or the like) to generate mean vector 534 and/or standard deviation vector 536 based on input data 502 (e.g., received from data source(s) 108 and/or the like). Additionally or alternatively, sampled latent vector 538 may be determined (e.g., by modeling system 106 and/or the like) based on the input data 502 (e.g., based on mean vector 534 and/or standard deviation vector 536 generated based on input data 502). In some non-limiting embodiments, decoder network 540 may be used (e.g., by modeling system 106 and/or the like) to generate generated data items 502g (e.g., reconstructed data item(s), perturbed data item(s), and/or the like) based on the sampled latent vector 538.

In some non-limiting embodiments, generative model 530 may include a variational auto-encoder (VAE). For example, a VAE may include at least one unsupervised neural network model, e.g., which may learn a latent representation (e.g., sampled latent vector 538) of the training data and/or reconstruct the data from the learned latent representation. In some embodiments, a VAE may include two sub-networks (e.g., encoder network 532 and decoder network 540). In some non-limiting embodiments, encoder network 532 may compress the input $x \in X$ into a latent vector z, e.g., $z = \text{encoder}(x) \sim q(z|x)$. Additionally or alternatively, decoder network 540 may reconstruct an image x' from z, e.g., $x' = \text{decoder}(z) \sim p|x)$.

In some non-limiting embodiments, a VAE may be trained by (1) minimizing the difference between x and x'; and/or (2) limiting the distribution of z to be a unit Gaussian distribution, e.g., $p(z) = N(0, 1)$. For example, the training loss (I) of a VAE may be expressed by the following equation:

$$I(\theta,\phi) = -E_{z \sim q\phi(z|x)}[\log p_\phi(x|z)] + KL(q\theta(z|x)\|p(z)), \quad (2)$$

where u and f may be the trainable parameters. In some non-limiting embodiments, a VAE may (1) capture complicated data features from the input space and/or compress such features into a smaller latent space, and/or (2) generate unseen samples with meaningful semantics in an on-demand fashion. Additionally or alternatively, such a VAE may allow for efficiently generating local samples to probe a model's (e.g., first predictive model's) behavior.

Figure 6:
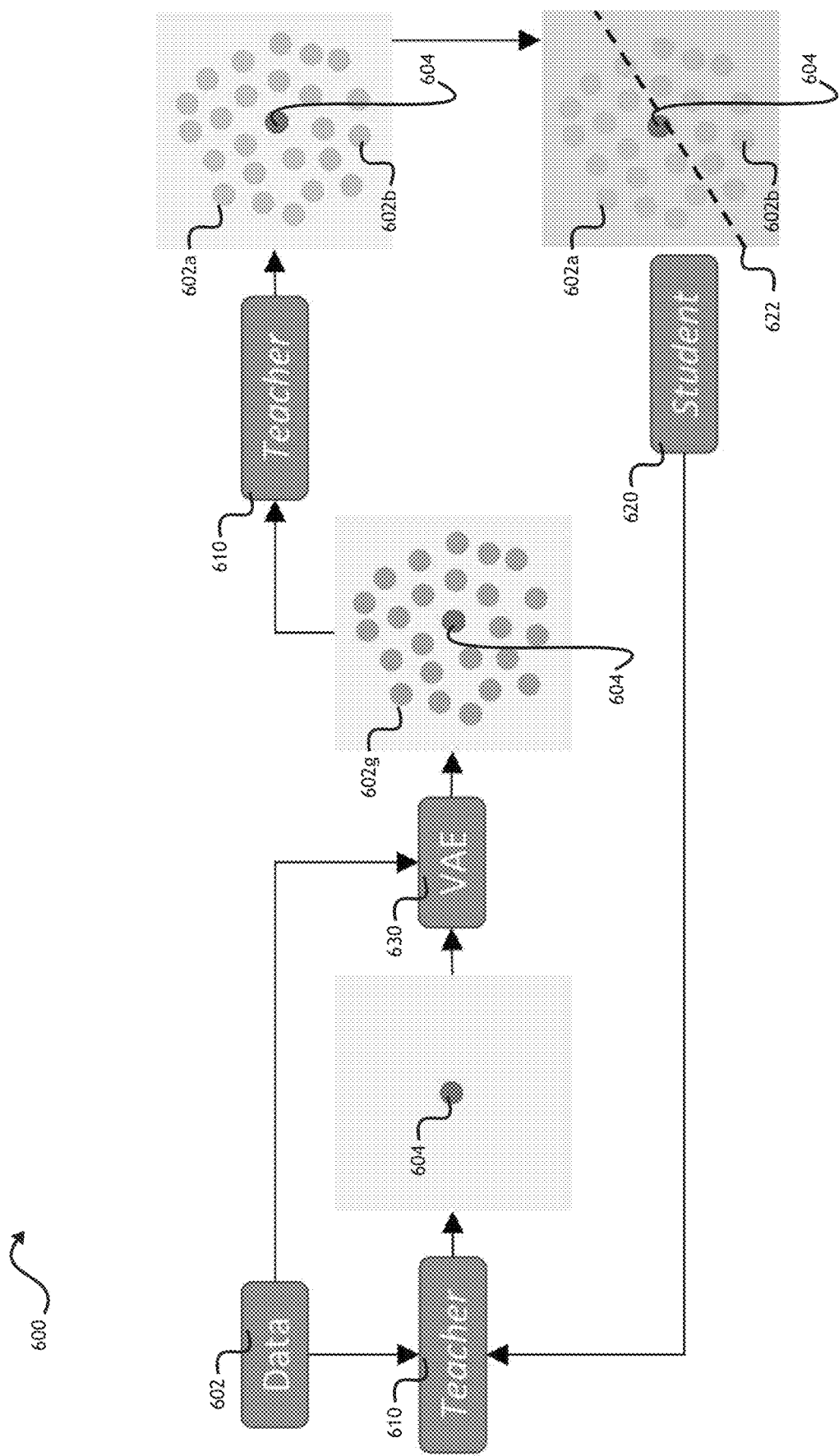
FIG. 6 is a diagram of a non-limiting embodiment of an implementation of a non-limiting embodiment of the process shown in FIG. 3, according to the principles of the presently disclosed subject matter.

Referring to FIG. 6, FIG. 6 is a diagram of an exemplary implementation 600 of a non-limiting embodiment of an implementation 600 relating to process 300 shown in FIG. 3. In some non-limiting embodiments, implementation 600 may be implemented (e.g., completely, partially, and/or the like) by modeling system 106. In some non-limiting embodiments, implementation 600 may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 6, implementation 600 may include data 602, first (e.g., teacher) predictive model 610, second (e.g., student) predictive model 620, and/or generative model 630. In some non-limiting embodiments, first predictive model 610, second predictive model 620, and/or generative model 630 may be implemented (e.g., completely, partially, and/or the like) by modeling system 106. In some non-limiting embodiments, first predictive model 610, second predictive model 620, and/or generative model 630 may be implemented (e.g., completely, partially, and/or the like) by another system, another device, another group of systems, or another group of devices, separate from or including modeling system 106, such as user device 102, visualization system 104, data source(s) 108, and/or the like. In some non-limiting embodiments, first predictive model 610 may be the same as or similar to first predictive model 410. In some non-limiting embodiments, second predictive model 620 may be the same as or similar to second predictive model 420. In some non-limiting embodiments, generative model 630 may be the same as or similar to generative model 530.

In some non-limiting embodiments, data 602 may be received (e.g., by modeling system 106 from data source(s) 108 and/or the like). Additionally or alternatively, first (e.g., teacher) predictive model 610 may be used (e.g., by modeling system 106 and/or the like) to classify data 602 to generate classified data (e.g., first predictions associated with classifications for the data items of data 602 and/or the like) as described herein.

In some non-limiting embodiments, a data item may be selected, e.g., selected data item 604 from data 602, as described herein. For example, modeling system 106 may automatically select selected data item 604 based on first prediction associated with selected data item 604 not matching a true label for selected data item 604. Additionally or alternatively, modeling system 106 may receive a selection of selected data item 604 (e.g., via user input received at user device 102 and/or the like), as described herein.

In some non-limiting embodiments, generative model 630 may be used (e.g., by modeling system 106 and/or the like) to generate at least one generated data item 602g (e.g., a plurality of generated data items 602g) based on selected data item 604 (e.g., of data 602), as described herein.

In some non-limiting embodiments, first (e.g., teacher) predictive model 610 may be used (e.g., by modeling system 106 and/or the like) to classify generated data items 602g to generate classified generated data items (e.g., first predictions associated with classifications for the generated data items 602g and/or the like) as described herein. For the purpose of illustration, first predictive model 610 may be used (e.g., by modeling system 106 and/or the like) to generate first predictions associated with classifying generated data items 602g as either generated data items associated with a first class 602a or generated data items associated with a first class 602b.

In some non-limiting embodiments, second (e.g., student) predictive model 620 may be trained (e.g., by modeling system 106 and/or the like) based on at least a portion of (e.g., all of and/or the like) generated data items 602g and/or first predictions from the first predictive model 610 associated therewith (e.g., for the purpose of illustration, first predictions associated with classifying generated data items 602g as either generated data items associated with a first class 602a or generated data items associated with a second class 602b), as described herein. Additionally or alternatively, second predictive model 620 (e.g., as trained) may be used (e.g., by modeling system 106 and/or the like) to generate local decision boundary 622, as described herein.

In some non-limiting embodiments, knowledge distillation (e.g., from first predictive model 610 to second predictive model 620) and/or generative model 630 (e.g., a VAE) may be implemented in implementation 600. For example, for a given input dataset (e.g., data 620) and classification task, a complex model (e.g., first predictive model 610) may be trained and/or interpreted. Additionally or alternatively, generative model 630 (e.g., a VAE) model may be trained (e.g., pre-trained and/or the like) to capture the feature distribution in the input dataset (e.g., data 620). In some non-limiting embodiments, given a data instance of interest (e.g., selected data item 604, which may be identified based on performance of first (e.g., teacher) predictive model 610 (e.g., a false-positive image)), generative model 630 (e.g., a pre-trained VAE) may be used to generate semantically meaningful neighbors (e.g., generated data items 602g) around the instance (e.g., selected data item 604). Additionally or alternatively, such neighbors (e.g., generated data items 602g) may then be fed to first (e.g., teacher) predictive model 610 to probe the behavior thereof and/or distill the knowledge thereof (e.g., determining logits, as described herein). Additionally or alternatively, second (e.g., student) predictive model 620 (e.g., a linear model and/or the like) may be trained using the neighbors (e.g., generated data items 602g) and the logits thereof from first (e.g., teacher) predictive model 610 (e.g., soft labels) to mimic the behavior of first (e.g., teacher) predictive model 610. Additionally or alternatively, by visualizing second (e.g., student) predictive model 620 (e.g., using a graphical user interface, as described herein), the behavior first (e.g., teacher) predictive model 610 may be interpreted near the data instance (e.g., selected data item 604).

In some non-limiting embodiments, an exemplary algorithm associated with implementation 400 may be expressed in pseudocode as follows:

```
Algorithm 1 (pseudocode)

Initialize Teacher: the classifier to be interpreted
Initialize VAE encoder, VAE decoder: pre-trained VAE model
Initialize x: data instance of interest (an image)
Initialize num_neighbors: the number of neighbors needed
Initialize T: temperature value to train the Student
Initialize Ranges: the value ranges of all latent dimensions
Initialize Sampling Percent: sampling within this percentage
 1:    lat_x = VAE_encoder(x)  // derive the latent vector for x
 2:    band =Ranges x Sampling Percent   // the sampling band
 3:    interval = band/num_neighbors
 4:    neighbors = [ ]   // training data for the Student
 5:    neighbors_logits = [ ]   // labels for the training data
 6:    for i=0; i< num_neighbors; i++do
 7:        lat_nbr = lat_x - band/2 + i * interval //sampled latent vector
 8:        neighbor = VAE_decoder(lat_nbr)
 9:        logit = Teacher(neighbor)
10:        neighbors.append(neighbor)
11:        neighbors_logits.append(logit)
12:    end for
13:    Student = Linear(neighbors, neighbors_logits, T)_train( )
14:    Visualize(Student.weights, Student.weights * x)
```

For the purpose of illustration, as shown in Algorithm 1, latent vector, lat_x, may be derived from an image of interest, x (e.g., selected data item 604), e.g., using the encoder of model 630 (e.g., pre-trained VAE) (e.g., line 1). In some non-limiting embodiments, to generate neighbors (e.g., generated data items 602g), the latent space may be sampled (e.g., line 7) and generative model 630 (e.g., VAE decoder) may reconstruct neighbors from the sampled latent vectors (e.g., line 8), e.g., instead of sampling the input space (e.g., perturbing image x in the high-dimensional input space). In some non-limiting embodiments, the sampling may be centered at the latent vector of the image of interest (e.g., selected data item 604) and/or within a user-specified percentage (e.g., Sampling Percent) of the entire latent space (e.g., Ranges). For example, such a neighbor (e.g., generated data item 602g) generation process is further described below, and additional description may be found in supplementary material: Junpeng Wang et al., *DeepVID: Deep Visual Interpretation and Diagnosis for Image Classifiers via Knowledge Distillation*, IEEE Computer Society Digital Library, pp. 2168-2180 (June 2019), http://doi.ieee-computersociety.org/10.1109/TVCG.2019.2903943, the disclosure of which is hereby incorporated by reference in its entirety. In some non-limiting embodiments, based on generated neighbors (e.g., generated data items 602g) and/or soft labels associated therewith from first (e.g., teacher) generative model 610 (e.g., line 9), second (e.g., student) model 620 (e.g., linear model and/or the like) may be trained temperature T (e.g., line 13). Additionally or alternatively, the trained second (e.g., student) predictive model 620 (e.g., coefficients thereof and/or the like) may be visualized (e.g., line 14), e.g., in a graphical user interface, as described herein, to interpret the behavior of first (e.g., teacher) predictive model 610 near x (e.g., selected data item 604).

Figure 7:
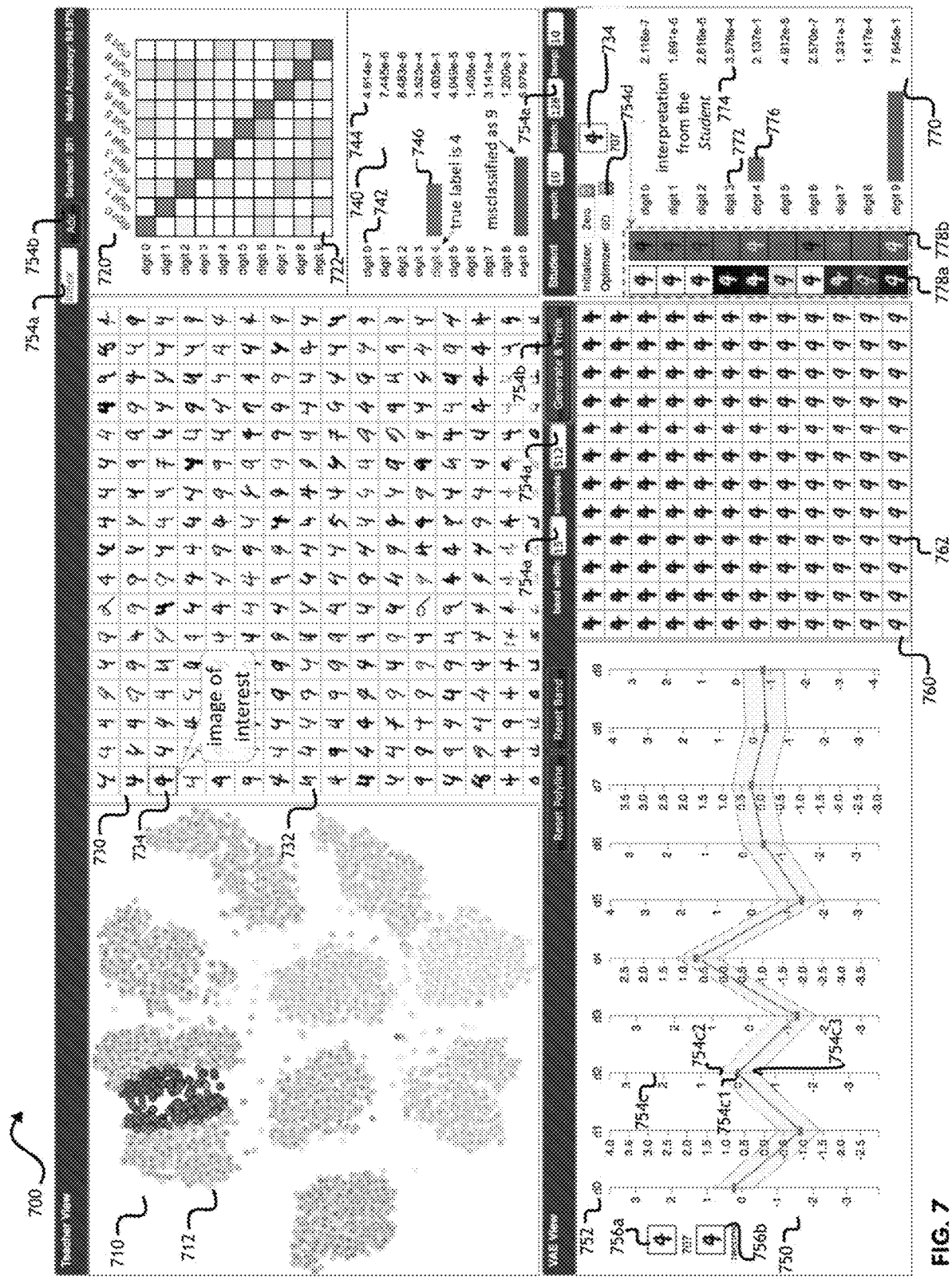
FIG. 7 is a screenshot of a non-limiting embodiment of an implementation of a non-limiting embodiment of a graphical user interface, which may be used in the process shown in FIG. 3, according to the principles of the presently disclosed subject matter.

Referring to FIG. 7, FIG. 7 is a screenshot of a non-limiting embodiment of a graphical user interface 700 relating to process 300 shown in FIG. 3. In some non-limiting embodiments, graphical user interface 700 may be generated and/or displayed (e.g., completely, partially, and/or the like) by visualization system 104. In some non-limiting embodiments, graphical user interface 700 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, graphical user interface 700 may include a first view 710 displaying a clustering of the data items 712 of classified data (e.g., classified by modeling system 106 with a first (e.g., teacher) predictive model), as described herein. For example, visualization system 104 may generate the first view 710 based on the clustering of the data items 712 of classified data.

In some non-limiting embodiments, first view 710 may include (e.g., visualization system 104 may generate) a projection of all data items 712 (e.g., images) into two-dimensional space and/or present (e.g., display and/or the like) the projection as a scatterplot, e.g., so that a user may observe the clustering of the data items 712. Additionally or alternatively, a user may select at least one data item 712 from first view 710 (e.g., via input to user device 102 associated with graphical user interface 700 displayed thereon (e.g., as generated by visualization system 104)), as described herein. In some non-limiting embodiments, each point (e.g., dot, circle, and/or the like) may represent a data item. Additionally or alternatively, each point may be colored and/or shaded based on a respective true label associated with the respective data item. In some non-limiting embodiments, the projection into two-dimensional space and/or the positioning of each point may be based on t-SNE (e.g., L. V. D. Maaten and G. Hinton, *Visualizing Data Using t-sne*, 9 J. Mach. Learn. Res., pp. 2579-2605 (2008), the disclosure of which is incorporated by reference herein in its entirety). For example, the activations of a last hidden layer (e.g., logits layer and/or the like) of the first (e.g., teacher) predictive model may be used as the input for t-SNE. In some non-limiting embodiments, the projection may provide an overview of all data items 712, and/or similar data items 712 may be clustered together. In some non-limiting embodiments, users may select data items 712 via lasso selection, as described herein.

In some non-limiting embodiments, graphical user interface 700 may include a second view 720 displaying a confusion matrix 722. For example, visualization system 104 may generate a confusion matrix, which may include rows associated with a true label (e.g., actual classification) of data items and columns associated with predictions (e.g., first predicted classifications as predicted by modeling system 106 with first (e.g., teacher) predictive model).

In some non-limiting embodiments, confusion matrix 722 (e.g., based on the first (e.g., teacher) predictive model) may be derived from test data (e.g., data items 712 may include test data). Additionally or alternatively, a value at the ith row and jth column of confusion matrix 722 may indicate the number of data instances of true class i (e.g., based on true labels) that are predicted (e.g., by first (e.g., teacher) predictive model) to be in class j. Additionally or alternatively, cells of confusion matrix 722 along the diagonal may be the correctly predicted instances (e.g., data items 712), and/or other cells may be wrongly classified instances (e.g., false predictions). In some non-limiting embodiments, the color and/or shading (e.g., from light (e.g., white) to dark (e.g., black, red, and/or the like) may represent the cell values (e.g., from small to large with a logarithmic scale). In some non-limiting embodiments, clicking on any cell may select the data items 712 associated with that cell (which may be displayed in third view 730, as described herein).

In some non-limiting embodiments, graphical user interface 700 may include a third view 730 displaying at least one image 732 associated with the at least one data item. For example, visualization system 104 may receive a selection of at least one data item 712 (e.g., a plurality of data items 712) from the first view 710 and/or second view 720 (e.g., via user input received from user device 102). Additionally or alternatively, visualization system 104 may generate third view 730 based on images 732 (e.g., received and/or retrieved from data source(s) 108) associated with each selected data item 712. In some non-limiting embodiments, visualization system 104 may receive a selection of an image 734 (e.g., first image from among the images 732) associated with a data item 712 (e.g., first data item) from the third view 730 (e.g., via user input received from user device 102).

In some non-limiting embodiments, third view 730 may show the selected data items 712 (e.g., first images 732 associated with selected data items 712). Additionally or alternatively, selected data items 712 may have been selected through either first view 710 (e.g., via lasso selection(s)) and/or second view 720 (e.g., via clicking cell(s) in confusion matrix 722). In some non-limiting embodiments, to effectively use the limited screen space, images 732 with resolutions larger than 32×32 pixels may be scaled down to 32×32 pixels. Additionally or alternatively, third view 730 may be scrollable (e.g., if all images 732 cannot be presented in the limited screen space). In some non-limiting embodiments, hovering over any image in third view 730 may highlight the corresponding point in first view 710 (e.g., to help users observe connections between views). In some non-limiting embodiments, clicking on any image 732 will make such image the selected image 734 (which may cause display and/or update of the fourth view, as described herein). In some non-limiting embodiments, third view 730 may allow users to observe a quick overview of the images 732.

In some non-limiting embodiments, graphical user interface 700 may include a fourth view 740 displaying probabilities 744 associated with a plurality of possible classifications 742 and/or a bar graph including bars 746 associated with respective probabilities 744. For example, visualization system 104 may receive a selection of an image 734 (e.g., first image) associated with a data item 712 (e.g., first data item) from the third view 730 (e.g., via user input received from user device 102). Additionally or alternatively, visualization system 104 may generate fourth view 740 based on probabilities 744 (e.g., based on (first) predictions from the modeling system 106 with the first (e.g., teacher) predictive model) associated with the possible classifications 742, as described herein.

In some non-limiting embodiments, one of the possible classifications 742 associated with the true label may be highlighted (e.g., by text color, text shading, background color, background shading, and/or the like).

In some non-limiting embodiments, graphical user interface 700 may include a plurality of graphical elements (e.g., text boxes 754a, buttons 754b, slider bars 754c, dropdown menus 754d, and/or the like) to receive user input (e.g., directly or via user device 102). For example visualization system 104 may generate such graphical elements in graphical user interface 700.

In some non-limiting embodiments, a first window may include at least one of (e.g., all of, any combination of, and/or the like) first view 710, second view 720, third view 730, and/or fourth view 740.

In some non-limiting embodiments, graphical user interface 700 may include fifth view 750 displaying dimensions 752 of a generative model based on the first data item. For example, visualization system 104 may generate a respective slider bar 754c associated with each dimension 752, and each slider bar 754c may initially have a center point 754c1 associated with a value for such dimension associated with the selected data item 712 (e.g., first data item associated with a selected (e.g., first) image 734). Additionally or alternatively, the slider bar 754c associated with each dimension 752 may have a shaded band around each center point 754c1 defined by upper point 754c2 and lower point 754c3, and the shaded band may be associated with a perturbation range (e.g., from upper point 754c2 to lower point 754c3) for the respective dimension that will be used by the generative model to generate the generated data items. In some non-limiting embodiments, fifth view 750 may include (e.g., visualization system 104 may generate within fifth view 750) a copy of the selected image 756a (e.g., which may be the same as selected first image 734 from the third view). Additionally or alternatively, fifth view 750 may include (e.g., visualization system 104 may generate within fifth view 750) a reconstruction 756b of the copy of the selected image 756a (e.g., reconstruction 756b may be generated by modeling system 106 with the generative model based on the positions of the center points 754c1 on each slider bar). In some non-limiting embodiments, visualization system 104 may receive (e.g., via user input from user device 102) input to adjust (e.g., drag and/or the like) the center point 754c1 of at least one slider bar 754c associated with at least one dimension, and the reconstruction 756b may be updated (e.g., because modeling system 106 generates, with the generative model, an updated reconstruction 756b based on the adjusted position of the center point(s) 754c1). In some non-limiting embodiments, the generative model (and correspondingly fifth view 750) may have any suitable number of dimensions 752 (e.g., predefined number of dimensions 752, selected number of dimensions 752, and/or the like). For the purpose of illustration, dimensions 752 may include 10 dimensions (e.g., dimension 0 (d0), dimension 1 (d1), dimension 2 (d2), dimension 3 (d3), dimension 4 (d4), dimension 5 (d5), dimension 6 (d6), dimension 7 (d7), dimension 8 (d8), and dimension 9 (d9)).

In some non-limiting embodiments, fifth view 750 may empower users to explore the feature space (e.g., the latent space from a generative model (e.g., VAE)) of the data (e.g., data items 712 and/or generated data items). Additionally or alternatively, fifth view 750 (and/or sixth view 760) may present an overview of the generated neighbors to reveal feature trend(s) therein.

In some non-limiting embodiments, fifth view 750 (e.g., for the selected image 734) may represent a multi-dimensional vector (e.g., 10 dimensions (d0-d9) as shown in FIG. 7). In some non-limiting embodiments, slider bars 754c (e.g., center points 754c1 and/or shaded bands associated with slider bars 754c1) may form a parallel coordinates plot (POP), which may effectively visualize the multi-dimensional latent space and/or allow users to interactively explore different dimensions thereof (e.g., by dragging a center point 754c1 of at least one slider bar 754c, as described herein). Additionally or alternatively, each axis (e.g., slider bar 754c) of the PCP may show the available range of the corresponding latent dimension 752, and center point 754c1 on the axis (e.g., slider bar 754c) may represent the value of a current latent vector for that respective dimension 742. In some non-limiting embodiments, a polyline may connect center point 754c1 across all axes (e.g., slider bars 754c) and/or may represents the latent vector of the currently selected image 734. In some non-limiting embodiments, a user may drag connect center point 754c1 along each axis (e.g., slider bar 754c) to see how the corresponding latent dimension 752 affects the visual appearance of reconstructed image 756b, in comparison with the original image 756a. In some non-limiting embodiments, the shaded band in the PCP (e.g., in fifth view 75) may show the available perturbation range (e.g., from upper point 754c2 to lower point 754c3) of the latent dimensions 752.

In some non-limiting embodiments, a selected number (n) of neighbors (e.g., generated second images 762) of the selected image 734 may be generated, e.g., by: (1) perturbing the latent vector (e.g., adjusting values of latent dimensions 752 values in fifth view 750) in the perturbation range (e.g., shaded band in fifth view 750) to generate n latent vectors (e.g., each with 10 dimensions, corresponding to latent dimensions 752 in fifth view 750); and/or (2) reconstructing from those latent vectors (e.g., using a generative model, such as a decoder of a VAE) to generate n neighbors. Additionally or alternatively, the number (n) of neighbors may be input via a graphical element (e.g., text box 754a), as described herein. Additionally or alternatively, the shaded band may begenerated with a user-specified percentage value (which may be input via a graphical element (e.g., text box 754a), as described herein). As shown in FIG. 7, the percentage value may be 15 percent (e.g., by default, based on user input, and/or the like), and the number of neighbors may be 512 (e.g., by default, based on user input, and/or the like). In some non-limiting embodiments, for each latent axis (e.g., slider bar 754c), a 15 percent range centered at the latent value (e.g., center point 754c1) of that axis may be generated. Additionally or alternatively, connecting the ranges from all axes (e.g., slider bars 754c) may form the perturbation band (e.g., shaded band). In some non-limiting embodiments, n polylines may be generated evenly within this band (e.g., generated by modeling system 106 based on uniformly sampling multi-dimensional (e.g., 10-dimensional) vectors within the band (see, e.g., line 7 of Algorithm 1)). Additionally or alternatively, any suitable sampling method may be used (e.g., exhausting all possible combinations of the values from the 10 axes and/or the like). In some non-limiting embodiments, a user may manually brush each axis (e.g., slider bar 754c) to specify the perturbation band (e.g., shaded band), which may control the generation of neighbors.

In some non-limiting embodiments, graphical user interface 700 may include sixth view 760 displaying a plurality of second images 762 associated with the plurality of generated data items. For example, modeling system 106 may use the generative model to generate the generated data items by perturbing the selected (e.g., first) data item 712 (e.g., associated with selected (e.g., first) image 734) based on the dimensions 752 of the generative model (e.g., based on the perturbation range for each dimension 752 from the fifth view 750), as described herein. In some non-limiting embodiments, visualization system 104 and/or modeling system 106 may receive a selection of a button 754b (e.g., via user input from user device 102), and the generation of the generated data items may be based on selection of that button 754b. For example, that button 754b may be associated with (e.g., generated by visualization system 104 in) fifth view 750. In some non-limiting embodiments, visualization system 104 may generate sixth view 760 to display the second images 762 associated with the generated data items, as described herein.

In some non-limiting embodiments, sixth view 760 may include m (m n) evenly sampled images (e.g., generated second images 762), e.g., out of the total n generated neighbors. For example, due to limited screen size, as shown in FIG. 7, m=144. In some non-limiting embodiments, those images (e.g., generated second images 762) may be sorted from top-left to bottom-right following the increasing order of the corresponding latent vectors (e.g., the lat_br in line 7 of Algorithm 1). In some non-limiting embodiments, a user may identify the feature distribution of such images (e.g., generated second images 762), e.g., based on observing one or more visual trends of those images.

In some non-limiting embodiments, a second window may include at least one of (e.g., both of, any combination of, and/or the like) fifth view 750 and/or sixth view 760.

In some non-limiting embodiments, graphical user interface 700 may include seventh view 770 displaying second probabilities 774 associated with the plurality of possible classifications 772 (e.g., from modeling system 106 based on the second (e.g., student) predictive model and the plurality of generated data items) and/or a bar graph including bars 776 associated with respective probabilities 744. For example, visualization system 104 may generate seventh view 770 based on probabilities 774 (e.g., based on (second) predictions from the modeling system 106 with the second (e.g., student) predictive model) associated with the possible classifications 772, as described herein. In some non-limiting embodiments, seventh view 770 may include (e.g., visualization system 104 may generate in seventh view 770) a first column of images 778a and a second column of images 778b, and each such column may have a row corresponding to a respective one of the possible classifications 772. For example, first column 778a may include a visualization of a normalization of the weight matrix for the respective possible classification 772 (e.g., based on second (e.g., student) predictive model from modeling system 106). Additionally or alternatively, second column 778b may include images showing the weighted features (e.g., pixels) for the selected (e.g., first) image 734 for each respective possible classification 772 (e.g., multiplying the weight matrices with the features (e.g., pixels) of the image of interest (e.g. selected image 734)). In some non-limiting embodiments, images of the second column 778b may be normalized together to highlight how different features (e.g., pixels) contribute to each of the (e.g., 10) possible classifications 772 (e.g., values from small to large may be mapped to shades from dark (e.g., black) to light (e.g., white)).

In some non-limiting embodiments, seventh view 770 may help to train the second (e.g., student) predictive model, e.g., with customized hyper-parameters (e.g., which may be selected via a graphical element such as text box(es) 754a, drop down menu(s) 754d, and/or the like, as described herein). Additionally or alternatively, seventh view 770 may visualize the trained second (e.g., student) predictive model and/or its predictions (e.g., probabilities 774 and/or the like), as described herein. In some non-limiting embodiments, seventh view 770 may include the selected image 734. Additionally or alternatively, seventh view 770 may include at least some hyper-parameter values (e.g., in text box(es) 754a, drop down menu(s) 754d, and/or the like, as described herein). For the purpose of illustration, as shown in FIG. 7, the number of epochs ("epoch") may be set via a textbox 754a (e.g., epochs=10), the batch size ("batch") may be set via a textbox 754a (e.g., batch size=128); the temperature ("temp") may be set via a textbox 754a (e.g., temperature=10); the weights of second (e.g., student) predictive model may be initialized as zeros (e.g., as set in drop down menu 754d labeled "Initializer"); and/or the optimizer may be Gradient-Decent (GD) (e.g., as set in drop down menu 754d labeled "Optimizer").

In some non-limiting embodiments, the second (e.g., student) predictive model may be a linear model, which may take an image (e.g., a set of pixel values and/or the like) as input and may output at least one probability value. For the purpose of illustration, in some non-limiting embodiments, an exemplary second (e.g., student) predictive model can be expressed mathematically as f=softmax($\Sigma_i w_i a_i$+b), where $a_i$ may be the feature dimension(s) (e.g., pixels), $w_i$ may be the weights (e.g., coefficients), b may be the bias, and f may be the produced probability. To interpret the second (e.g., student) predictive model (e.g., interpret t), the following exemplary types of information may be visualized: (1) the learned weight for each feature/pixel, e.g., vii (e.g., as shown in column 778a); and/or (2) the weighted feature, e.g., $w_i a_i$ (e.g., as shown in column 778b). For example, for MNIST data, the input and output dimensions of the second (e.g., student) predictive model may be 784 features (e.g., pixels) and 10 predictions (e.g., probabilities 774), respectively. Additionally or alternatively, the weights of the second (e.g., student) predictive model may be in the shape of 784×10, which may be considered to be equivalent to ten 28×28 weight matrices. Additionally or alternatively, each such weight matrix may work like a template that can be multiplied with the 28×28 pixel input image (e.g., pixel-wise) to weight different pixels (e.g., as shown in column 778b).

In some non-limiting embodiments, seventh view 770 may use images to visualize the trained weights of second (e.g., student) predictive model (e.g., as shown in column 778a) and/or the weighted features based thereon (e.g., as shown in column 778b). For example, weight matrices may be normalized individually and visualized as a first column of images 778a. Additionally or alternatively, the second column of images 778b may show the weighted features (e.g., multiplying individual matrices with the image of interest (e.g., selected image 734)). In some non-limiting embodiments, images in column 778b may be normalized together to highlight how different pixels contribute to the (10) classifications 772 (e.g., values from small to large may be mapped to shades from black to white). For the purpose of illustration, as shown in FIG. 7, the selected image 734 may have a highest probability to be classified as digit 9 and a second highest probability to be classified as digit (e.g., due to the extracted white pixels in the second column of images 778b). In some non-limiting embodiments, hovering over any image in seventh view 770 may pop up an enlarged version of that image (e.g., to present more details and/or more clearly show the details of such image).

In some non-limiting embodiments, seventh view 770 may also include the predicted probabilities 774 of the second (e.g., student) predictive model. For example, probabilities 774 may approximate probabilities from the first (e.g., teacher) predictive model (e.g., be as close thereto as possible based on training). For example, the bar chart in seventh view 770 may approximate the bar chart in fourth view 740 (e.g., be as close thereto as possible based on training). In some non-limiting embodiments, e.g., when the prediction of the second (e.g., student) predictive model is not similar to the prediction of the first (e.g., teacher) predictive model, the explanations and/or insights from the second (e.g., student) predictive model may not be trustworthy. Additionally or alternatively, a user may try to adjust the hyper-parameters (e.g., using one or more graphical elements of (e.g., associated with fifth view 750, seventh view 770, and/or the like, as described herein). For example, a user may modify the temperature value, the sampling bandwidth, and/or the like and retrain the second (e.g., student) predictive model to more accurately mimic (e.g., approximate) the behavior of the first (e.g., teacher) predictive model. In some non-limiting embodiments, modeling system 106 and/or visualization system 104 may output (e.g., print, display, and/or the like) the training loss of the second (e.g., student) predictive model (e.g., in the backend), which may be measured by cross-entropy and/or the like and/or may indicate how well the predictions of the second (e.g., student) predictive model on the generated neighbors agrees with the predictions of the first (e.g., teacher) predictive model on the generated neighbors (e.g., to monitor the training progress).

In some non-limiting embodiments, a third window may include seventh view 770.

In some non-limiting embodiments, graphical user interface 700 may reflect the following traits: (a) visual understanding of the behavior of the first (e.g., teacher) predictive model (e.g., graphical user interface 700 provides a visual understanding of the (test) data and/or enables users to explore the prediction results from the first (e.g., teacher) predictive model, allows for visualization and/or exploration the feature space of (test) data, shows the overall performance of the first (e.g., teacher) predictive model over the (test) data and the probability scores for at least one specified data instance, and helps users to easily identify the failure cases (e.g., false-positives, hard samples, uncertain samples, and/or the like)); (b) flexible exploration of the high-dimensional space of the generated neighbors (e.g., ensuring quality of the generated neighbors to train a high-quality second (e.g., student) predictive model 620), enabling users to understand the semantics encoded in the latent space of the generative model (e.g., VAE, which, for MNIST handwriting digits, may encode within some latent concepts such as boldness, italic style of the digits, and/or the like), enabling users to interactively adjust the generated neighbors such that they are sufficiently close to the instance of interest, and enabling users to generate training samples between two instances of interest across class boundaries, such as generating samples that smoothly morph from a first selected data item to a second selected data item); and (c) interactive training and interpretation of the second (e.g., student) predictive model (e.g., tuning and understanding the performance of the second (e.g., student) predictive model iteratively, enabling users to understand the performance of the second (e.g., student) predictive model and/or compare the performance of the second (e.g., student) predictive model with the performance of the first (e.g., teacher) predictive model, enabling users to interpret the parameters learned by the second (e.g., student) predictive model, and enabling users to interactively adjust training hyper-parameters, such as the distillation temperature, optimizer, epoch number, and/or the like).

Figure 8:
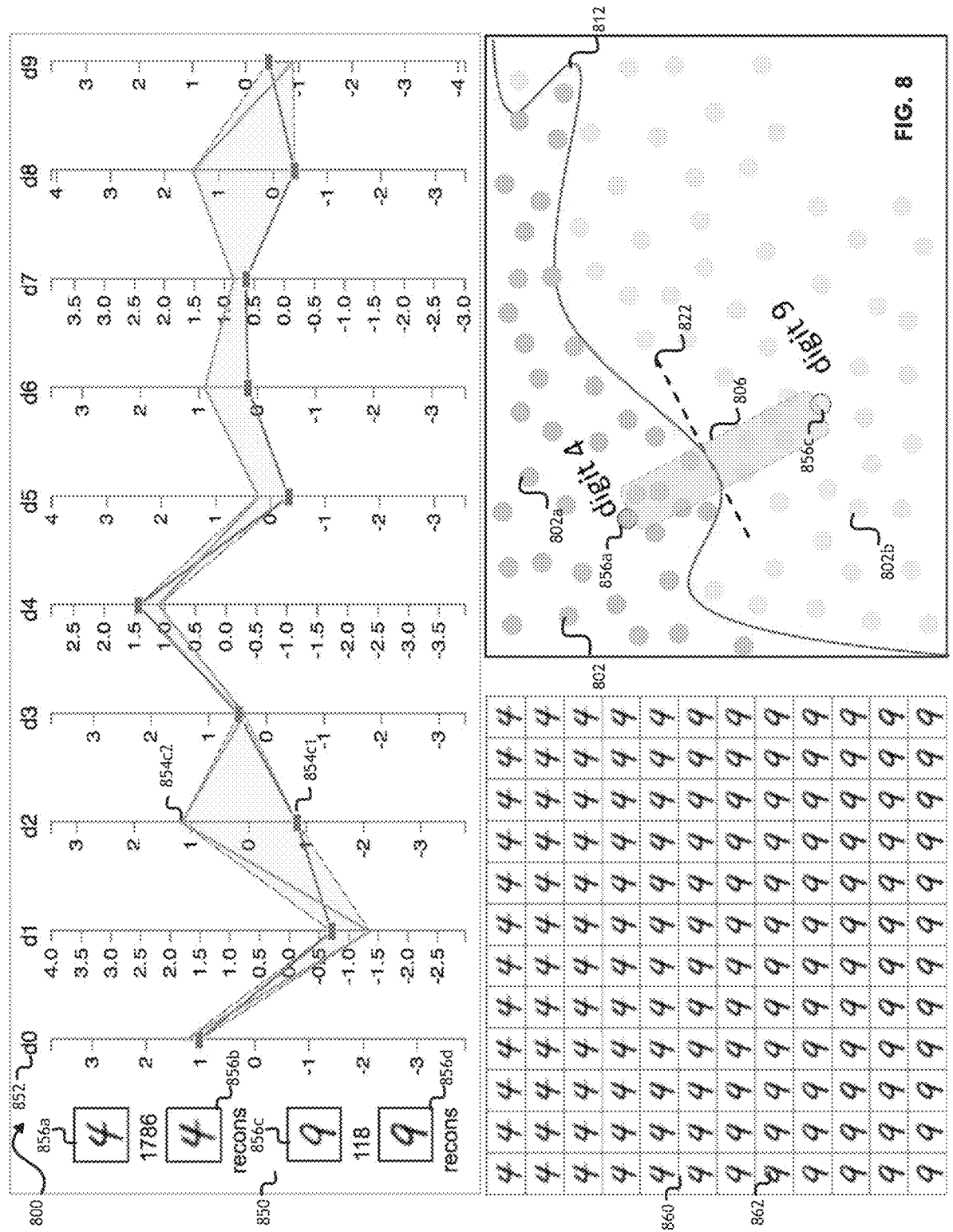
FIG. 8 is a screenshot of a non-limiting embodiment of an implementation of a non-limiting embodiment of exemplary views of a graphical user interface, which may be used in the process shown in FIG. 3, according to the principles of the presently disclosed subject matter.

Referring to FIG. 8, FIG. 8 is a screenshot of a non-limiting embodiment of exemplary views from a graphical user interface 800 relating to process 300 shown in FIG. 3. In some non-limiting embodiments, graphical user interface 800 may be generated and/or displayed (e.g., completely, partially, and/or the like) by visualization system 104. In some non-limiting embodiments, graphical user interface 800 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, visualization system 104 may receive (e.g., via user input from user device 102) selections of two data items/images (e.g., from a third view such as third view 730 described above and/or the like), as described herein. For example, visualization system 104 may receive (e.g., via user input from user device 102) a selection of a first image 856a and second image 856b.

Additionally or alternatively, graphical user interface 800 may include fifth view 850 displaying dimensions 852 of a generative model based on the two (e.g., first and second) data items (e.g., images). For example, fifth view 850 may include (e.g., visualization system 104 may generate within fifth view 850) a copy of a first selected image 856a and/or a copy of a second selected image 856c.

In some non-limiting embodiments, visualization system 104 may generate a respective slider bar 854c associated with each dimension 852, and each slider bar 854c may initially have a first point 854c1 associated with a value for such dimension associated with the first selected image 856a (e.g., first data item associated with the first selected image 856a). Additionally or alternatively, the slider bar 854c associated with each dimension 852 may have a second point 854c2 associated with a value for such dimension associated with the second selected image 856b (e.g., second data item associated with the second selected image 856a). Additionally or alternatively, a shaded band may be defined by first point 854c1 and second point 854c2, and the shaded band may be associated with a perturbation range (e.g., from first point 854c1 to second point 854c2) for the respective dimension 852 that will be used by the generative model to generate the generated data items.

In some non-limiting embodiments, fifth view 850 may include (e.g., visualization system 104 may generate within fifth view 850) a first reconstruction 856b of the copy of the first selected image 856a (e.g., reconstruction 856b may be generated by modeling system 106 with the generative model based on the positions of the first points 854c1 on each slider bar). In some non-limiting embodiments, fifth view 850 may include (e.g., visualization system 104 may generate within fifth view 850) a second reconstruction 856d of the copy of the second selected image 856c (e.g., reconstruction 856d may be generated by modeling system 106 with the generative model based on the positions of the second points 854c2 on each slider bar).

In some non-limiting embodiments, visualization system 104 may receive (e.g., via user input from user device 102) input to adjust (e.g., drag and/or the like) the first point 854c1 and/or the second point 854c2 of at least one slider bar 854c associated with at least one dimension 852, and the first reconstruction 856b and/or second reconstruction 856d may be updated (e.g., because modeling system 106 generates, with the generative model, an updated first reconstruction 856b and/or updated second reconstruction 856d based on the adjusted position of the first point(s) 854c1 and/or the second point(s) 854c2).

In some non-limiting embodiments, visualization system 104 may allow for morphing between two images (e.g., first selected image 856a and/or second selected image 856c). For example, a user may select two images of interest to investigate how the first (e.g., teacher) predictive model differentiates such images. Additionally or alternatively, visualization system 104 may generate image samples between the two selected images (e.g., first selected image 856a and/or second selected image 856c). For the purpose of illustration, as shown in FIG. 8, first selected image 856a (e.g., a digit 4 with index value 1786) and second selected image 856c (e.g., a digit 9 with index value 118) may be selected, and the latent vector of these selected images may be presented as polylines (e.g., with different colors, shading, and/or the like in the POP). Additionally or alternatively, a perturbation band (e.g., shaded band) may be generated by connecting the covered ranges (e.g., between first point 854c1 and second point 854c2 for each slider bar 854c) across all axes (e.g., slider bars 854c), and/or perturbed latent vectors may be generated by performing a linear interpolation between the two latent vectors.

In some non-limiting embodiments, graphical user interface 800 may include sixth view 860 displaying a plurality of second images 862 associated with the plurality of generated data items. For example, modeling system 106 may use the generative model to generate the generated data items by perturbing the selected data items (e.g., first image 856a and/or second image 856b) based on the dimensions 852 of the generative model (e.g., based on the perturbation range for each dimension 852 from the fifth view 850), as described herein.

In some non-limiting embodiments, sixth view 860 may show generated neighbors (e.g., generated images 862, such as 144 such generated images 862), which may represent how first selected image 856a is smoothly morphing to second selected image 856c. For example, since the two images belong to different classes, the generated samples (e.g., generated images 862) may include images that cross a certain point of the boundary between those two classes (e.g., local area 806, described below). In some non-limiting embodiments, the second (e.g., student) predictive model may be trained on these samples (e.g., generated images 862) and/or may be able to explain how the two images are differentiated by the first (e.g., teacher) predictive model.

For the purpose of illustration, as shown in FIG. 8, a second (e.g., student) predictive model may be trained (e.g., by modeling system 106 and/or the like) based on at least a portion of (e.g., all of and/or the like) generated data items (e.g., generated second images 862) and/or first predictions from the first (e.g., teacher) predictive model associated therewith (e.g., for the purpose of illustration, first predictions associated with classifying generated data items 862 as either generated data items associated with a first class (e.g., class for digit 4) or generated data items associated with a second class (e.g., class for digit 9)), as described herein. Additionally or alternatively, the second predictive model (e.g., as trained) may be used (e.g., by modeling system 106 and/or the like) to generate local decision boundary 822, as described herein. For example, local decision boundary 822 may approximate global decision boundary 812 for data items of data 802 (e.g., data items associated with a first class 802a (e.g., class for digit 4) or data items associated with a second class 802b (e.g., class for digit 9)) in the local area 806.

Figure 9:
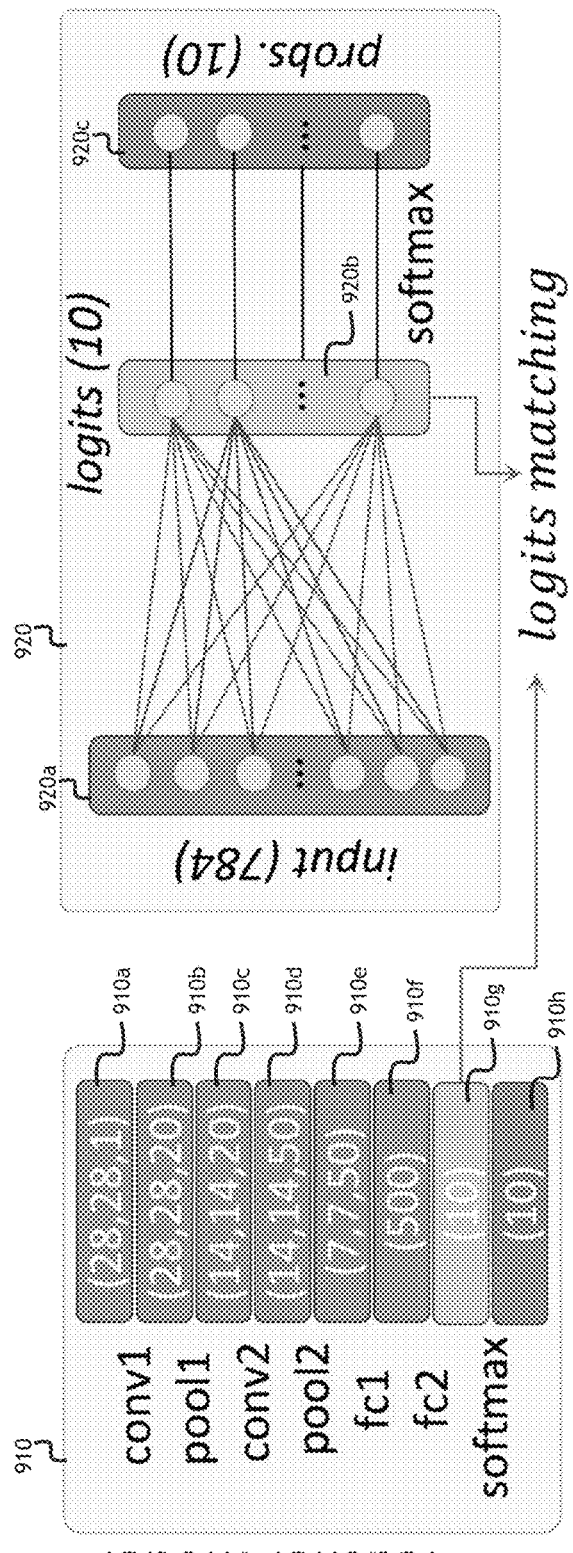
FIG. 9 is a diagram of a non-limiting embodiment of an implementation of a non-limiting embodiment of a first (e.g., teacher) predictive model and a second (e.g., student) predictive model, which may be used in the process shown in FIG. 3, according to the principles of the presently disclosed subject matter.

Referring to FIG. 9, FIG. 9 is a diagram of an exemplary implementation 900 of a non-limiting embodiment of a first (e.g., teacher) predictive model 910 and a second (e.g., student) predictive model 920 relating to process 300 shown in FIG. 3. In some non-limiting embodiments, implementation 900 may be implemented (e.g., completely, partially, and/or the like) by modeling system 106. In some non-limiting embodiments, implementation 900 may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 9, implementation 900 may include first (e.g., teacher) predictive model 910 and/or second (e.g., student) predictive model 920. In some non-limiting embodiments, first predictive model 910 and/or second predictive model 920 may be implemented (e.g., completely, partially, and/or the like) by modeling system 106. In some non-limiting embodiments, first predictive model 910 and/or second predictive model 920 may be implemented (e.g., completely, partially, and/or the like) by another system, another device, another group of systems, or another group of devices, separate from or including modeling system 106, such as user device 102, visualization system 104, data source(s) 108, and/or the like. In some non-limiting embodiments, first predictive model 910 may be the same as or similar to first predictive model 410 and/or first predictive model 610. In some non-limiting embodiments, second predictive model 920 may be the same as or similar to second predictive model 420 and/or second predictive model 620.

In some non-limiting embodiments, first predictive model 910 may include a convolutional neural network. For example, first predictive model 910 may include input layer 910a (e.g., for a black-and-white image that is 28×28 pixels as input, input layer 910a may have dimensions of 28×28×1 (e.g., "(28,28,1)")). Additionally or alternatively, first predictive model 910 may include at least one convolutional layer and/or at least one pooling layer. For example, first predictive model 910 may include a first convolutional layer 910b, a first pooling layer 910c, second convolutional layer 910d, and/or a second pooling layer 910e (e.g., with dimensions for each such layer as shown in FIG. 9). Additionally or alternatively, first predictive model 910 may include at least one fully connected layer. For example, first predictive model 910 may include a first fully connected layer 910f and/or a second fully connected layer 910g (e.g., with dimensions for each such layer as shown in FIG. 9). In some non-limiting embodiments, the last fully connected layer may be referred to as a logits layer, which may include raw prediction values as real numbers (e.g., before normalization in a subsequent (e.g., output) layer) for each possible classification. Additionally or alternatively, first predictive model 910 may include output layer 910h (e.g., with dimensions as shown in FIG. 9). In some non-limiting embodiments, output layer 910h may include a softmax layer. Additionally or alternatively, output layer 910h may normalize the prediction values from the logits layer (e.g., determine probability values based on the raw prediction values and/or the like).

In some non-limiting embodiments, second predictive model 920 may include fully connected neural network. For example, second predictive model 920 may include input layer 920a (e.g., for a black-and-white image that is 28×28 pixels as input, input layer 920a may have dimensions of 784 (e.g., the product of multiplying 28 by 28)). Additionally or alternatively, second predictive model 920 may include a fully connected layer 920b (e.g., with dimensions as shown in FIG. 9). In some non-limiting embodiments, fully connected layer 920b may be referred to as a logits layer, which may include raw prediction values as real numbers (e.g., before normalization in a subsequent (e.g., output) layer) for each possible classification. Additionally or alternatively, second predictive model 920 may include output layer 920c (e.g., with dimensions as shown in FIG. 9). In some non-limiting embodiments, output layer 920c may include a softmax layer. Additionally or alternatively, output layer 920h may normalize the prediction values from the logits layer (e.g., determine probability values based on the raw prediction values and/or the like).

In some non-limiting embodiments, second predictive model 920 may be trained so that the logits layer (e.g., fully connected layer 920b) of second predictive model 920 approximates the logits layer (e.g., second fully connected layer 910g) of first predictive model 910, as described herein.

Figure 10:
FIG. 10 is a diagram of a non-limiting embodiment of an implementation of a non-limiting embodiment of exemplary data items and classifications thereof, which may be used in the process shown in FIG. 3, according to the principles of the presently disclosed subject matter.

Referring to FIG. 10, FIG. 10 shows exemplary data items and classifications thereof, relating to process 300 shown in FIG. 3. As shown in FIG. 10, exemplary images for each possible classification for each of three datasets are depicted.

For the purpose of illustration, a top row of FIG. 10 may depict exemplary images and possible classification for the Modified National Institute of Standards and Technology (MNIST) dataset (Yann LeCun et al., *The MNIST Database of Handwritten Digits*, Yann LeCun's Home Page, http://yann.lecun.com/exdb/mnist/ accessed Aug. 15, 2017), the disclosure of which is hereby incorporated by reference in its entirety). For example, the MNIST dataset may contains 60,000-65,000 images (e.g., 50,000-55,000 training images and/or 10,000 testing images) of handwritten digits in 10 classes (digits 0-9). Additionally or alternatively, each image may include a gray scale image with the resolution of 28×28 pixels.

For the purpose of illustration, a middle row of FIG. 10 may depict exemplary images and possible classification for the QuickDraw dataset (*Quick, Draw!*, Google, https://quickdraw.withgoogle.com/ (accessed Aug. 8, 2017), the disclosure of which is hereby incorporated by reference in its entirety). For example, QuickDraw may include 10 image classes extracted from an online drawing game. Additionally or alternatively, each class may have 11,000 image instances. As a result, there may be 110,000 gray scale images in total (e.g., 100,000 for training, 10.000 for testing), and each image may be have a size of 28×28 pixels.

For the purpose of illustration, a bottom row of FIG. 10 may depict exemplary images and possible classification for the CelebA dataset (Z. Liu et al., *Deep Learning Face Attributes in the Wild*, Proc. Int. Conf. Comput. Vis., pp. 3730-3738 (2015), the disclosure of which is hereby incorporated by reference in its entirety). For example, the CelebA dataset may contains 202,599 human face images (e.g., 192,599 for training, 10,000 for testing), and each image may have a resolution of 178×218 pixels, which may be in color (e.g., red-green-blue (RGB)). Additionally or alternatively, each image may have true labels (e.g., annotations) for multiple (e.g., 40) binary attributes per image. In some non-limiting embodiments, the RGB images may be cropped to 148×148 pixels and/or rescaled to 64×64 pixels. In some non-limiting embodiments, combinations of three attributes (e.g., "Male," "Blond Hair," "Glass" (e.g., glasses)) may be used to define eight (e.g., $2^3$) classes. For example, class 0 may include images that have false values for all of the three binary attributes (e.g., not "Male," not "Blond Hair," not "Glass"). Additionally or alternatively, the other classes may include other combinations of the binary attributes (e.g., class 1: not "Male," not "Blond Hair," "Glass;" class 2: not "Male," "Blond Hair," not "Glass;" class 3: not "Male," "Blond Hair," "Glass;" class 4: "Male," not "Blond Hair," not "Glass;" class 5: "Male," not "Blond Hair," "Glass;" class 6: "Male," "Blond Hair," not "Glass;" class 7: "Male," "Blond Hair," "Glass").

Figure 11A:
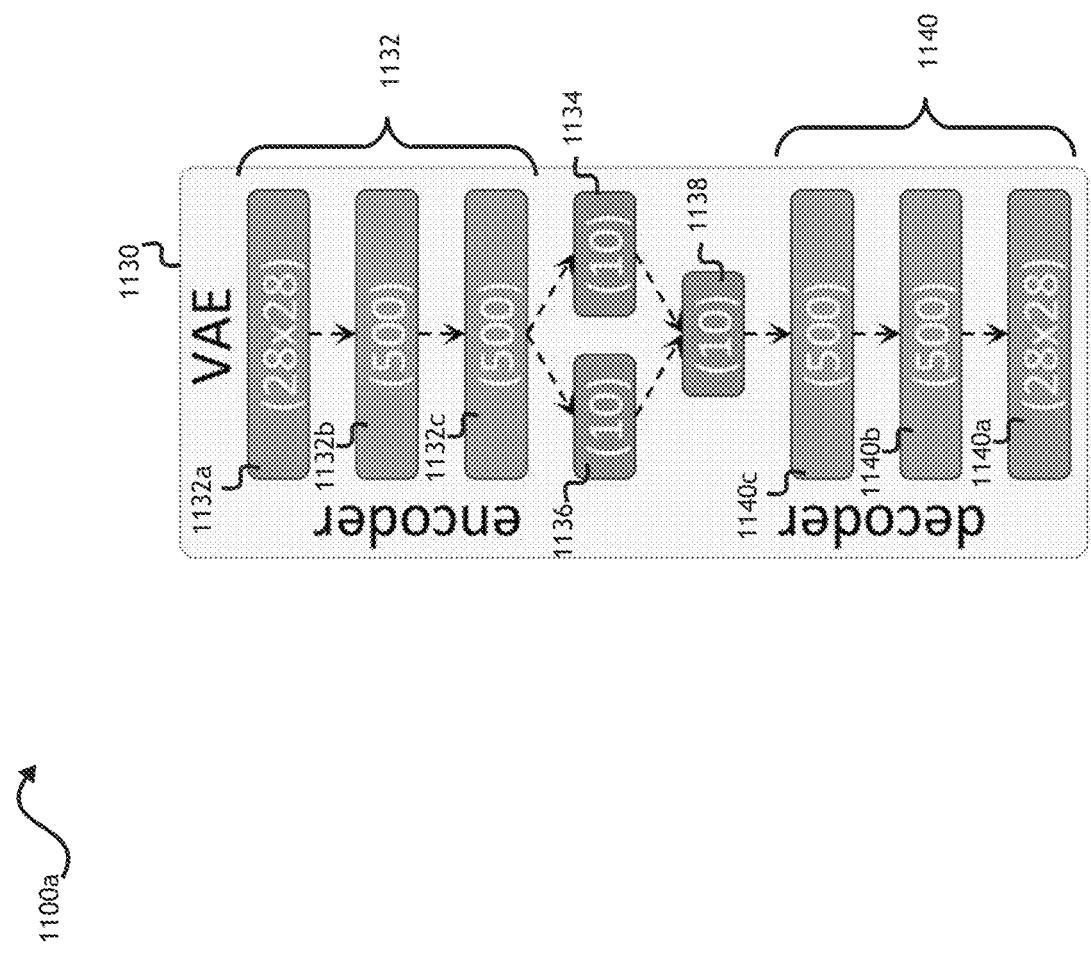
FIG. 11A is a diagram of a non-limiting embodiment of an implementation of a non-limiting embodiment of a generative model, which may be used in the process shown in FIG. 3, according to the principles of the presently disclosed subject matter.

Referring to FIG. 11A, FIG. 11A is a diagram of an exemplary implementation 1100a of a non-limiting embodiment of a generative model 1130 relating to process 300 shown in FIG. 3. In some non-limiting embodiments, implementation 1100a may be implemented (e.g., completely, partially, and/or the like) by modeling system 106. In some non-limiting embodiments, implementation 1100a may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 11A, implementation 1100a may include generative model 1130. In some non-limiting embodiments, generative model 1130 may be implemented (e.g., completely, partially, and/or the like) by modeling system 106. In some non-limiting embodiments, generative model 1130 may be implemented (e.g., completely, partially, and/or the like) by another system, another device, another group of systems, or another group of devices, separate from or including modeling system 106, such as user device 102, visualization system 104, data source(s) 108, and/or the like. In some non-limiting embodiments, generative model 1130 may be the same as or similar to generative model 530 and/or second predictive model 630.

In some non-limiting embodiments, generative model 1130 may include an encoder network 1132, a decoder network 1140, and/or a latent space (e.g., latent vector 1138). In some embodiments, encoder network 1132 may be used (e.g., by modeling system 106 and/or the like) to generate mean vector 1134 and/or standard deviation vector 1136 based on input data (e.g., received from data source(s) 108 and/or the like). Additionally or alternatively, sampled latent vector 1138 may be determined (e.g., by modeling system 106 and/or the like) based on the input data (e.g., based on mean vector 1134 and/or standard deviation vector 1136 generated based on input data). In some non-limiting embodiments, decoder network 1140 may be used (e.g., by modeling system 106 and/or the like) to generate generated data items (e.g., reconstructed data item(s), perturbed data item(s), and/or the like) based on the sampled latent vector 1138.

In some non-limiting embodiments, encoder network 1132 may include a fully connected neural network. For example, encoder network 1132 may include input layer 1132a (e.g., for a black-and-white image that is 28×28 pixels as input, input layer 1132a may have dimensions of 28×28). Additionally or alternatively, encoder network 1132 may include at least one fully connected layer. For example, encoder network 1132 may include first fully connected layer 1132b and/or second fully connected layer 1132c (e.g., with dimensions for each such layer as shown in FIG. 11A).

In some non-limiting embodiments, mean vector 1134 and/or standard deviation vector 1136 may be generated (e.g., by modeling system 106 and/or the like) based on the last fully connected layer (e.g., second fully connected layer 1132c) of the encoder network 1132. Additionally or alternatively, sampled latent vector 1138 may be determined (e.g., by modeling system 106 and/or the like) based on the input data (e.g., based on mean vector 1134 and/or standard deviation vector 1136 generated based on input data). In some non-limiting embodiments, sampled latent vector 1138 may be connected to (e.g., input into and/or the like) decoder network 1140.

In some non-limiting embodiments, decoder network 1140 may include a fully connected neural network. For example, decoder network 1140 may include at least one fully connected layer. For example, decoder network 1140 may include first fully connected layer 1140c and/or second fully connected layer 1140b (e.g., with dimensions for each such layer as shown in FIG. 11A). In some non-limiting embodiments, sampled latent vector 1138 may be connected to (e.g., input into and/or the like) first fully connected layer 1140c. In some non-limiting embodiments, decoder network 1140 may include output layer 1140a (e.g., for a black-and-white image that is 28×28 pixels as output, output layer 1140a may have dimensions of 28×28 pixels).

In some non-limiting embodiments, a user may use the disclosed subject matter to interpret any suitable classifier (e.g, first (e.g., teacher) predictive model may be any suitable classifier). For example, exemplary CNN classifiers may include LeNet (Y. LeCun et al., Gradient-Based Learning Applied to Document Recognition, 86 Proc. IEEE, pp. 2278-2324 (November 1998), the disclosure of which is hereby incorporated by reference in its entirety) and/or VGG16 (K. Simonyan & A. Zisserman, *Very Deep Convolutional Networks for Large-Scale Image Recognition*, arXiv:1409.1556 (2014), the disclosure of which is hereby incorporated by reference in its entirety). Additionally or alternatively, the presently disclosed subject matter may be used to interpret the behavior of such classifiers on any suitable dataset (e.g., the datasets described herein). In some non-limiting embodiments, Table 1 may show exemplary performance (e.g., accuracy) for exemplary first (e.g., teacher) predictive models, hyper-parameters (e.g., epochs of teacher predictive model, latent dimensions, epochs for generative model, and/or the like), and generative models.

TABLE 1

| Dataset | Teacher | Epochs (T) | Accuracy | Generative Model | Latent | Epochs (G) |
|---|---|---|---|---|---|---|
| MNIST | LeNet | 20 | 98.57% | regular VAE | 10D | 150 |
| QuickDraw | LeNet | 20 | 89.73% | regular VAE | 10D | 150 |
| CelebA | VGG16 | 100 | 93.74% | DFC-VAE | 100D | 50 |

As shown in Table 1, the MNIST and QuickDraw datasets may be used to train respective LeNets and to achieve accuracy of 98.57% and 89.73%, respectively. The VGG16 model may be more complicated (e.g., deeper) than the LeNet. Additionally or alternatively, VGG16 may be trained based on the CelebA dataset and achieve accuracy 93.74% after 100 training epochs. For MNIST and QuickDraw, the feature space is may be relatively small. For example, a VAE with two fully connected layers and a ten-dimensional (10 D) latent space may be able to capture the feature space.

Figure 11B:
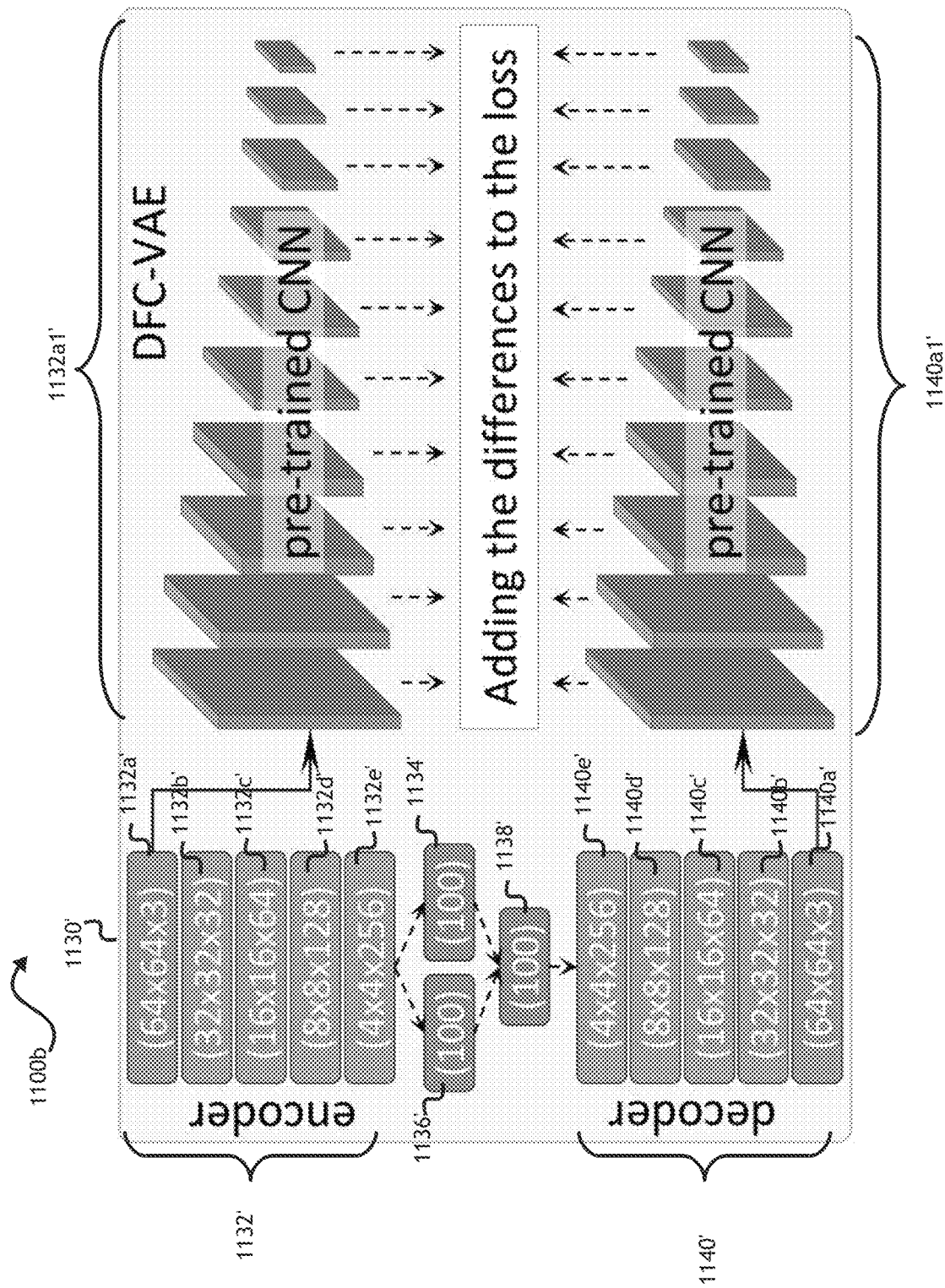
FIG. 11B is a diagram of a non-limiting embodiment of an implementation of a non-limiting embodiment of a generative model, which may be used in the process shown in FIG. 3, according to the principles of the presently disclosed subject matter.

Referring to FIG. 11B, FIG. 11B is a diagram of an exemplary implementation 1100*b* of a non-limiting embodiment of a generative model 1130' relating to process 300 shown in FIG. 3. In some non-limiting embodiments, implementation 1100*b* may be implemented (e.g., completely, partially, and/or the like) by modeling system 106. In some non-limiting embodiments, implementation 1100*b* may be implemented (e.g., completely, partially, and/or the like) by another system, another device, another group of systems, or another group of devices, separate from or including modeling system 106, such as user device 102, visualization system 104, data source(s) 108, and/or the like. As shown in FIG. 11A, implementation 1100*b* may include generative model 1130'. In some non-limiting embodiments, generative model 1130' may be implemented (e.g., completely, partially, and/or the like) by modeling system 106. In some non-limiting embodiments, generative model 1130' may be implemented (e.g., completely, partially, and/or the like) by another system, another device, another group of systems, or another group of devices, separate from or including modeling system 106, such as user device 102, visualization system 104, data source(s) 108, and/or the like. In some non-limiting embodiments, generative model 1130' may be the same as or similar to generative model 530 and/or second predictive model 630.

In some non-limiting embodiments, generative model 1130' may include an encoder network 1132', a decoder network 1140', and/or a latent space (e.g., latent vector 1138'). In some embodiments, encoder network 1132' may be used (e.g., by modeling system 106 and/or the like) to generate mean vector 1134' and/or standard deviation vector 1136' based on input data (e.g., received from data source(s) 108 and/or the like). Additionally or alternatively, sampled latent vector 1138' may be determined (e.g., by modeling system 106 and/or the like) based on the input data (e.g., based on mean vector 1134' and/or standard deviation vector 1136' generated based on input data). In some non-limiting embodiments, decoder network 1140' may be used (e.g., by modeling system 106 and/or the like) to generate generated data items (e.g., reconstructed data item(s), perturbed data item(s), and/or the like) based on the sampled latent vector 1138'.

In some non-limiting embodiments, encoder network 1132' may include a fully connected neural network and/or convolutional neural network. For example, encoder network 1132' may include input layer 1132*a*' (e.g., for an RGB image that is 64×64 pixels as input, input layer 1132*a*' may have dimensions of 64×64×3). Additionally or alternatively, encoder network 1132' may include at least one convolutional neural network. For example, encoder network 1132' may include convolutional neural network 1132*a*1'. Additionally or alternatively, encoder network 1132' may include at least one fully connected layer. For example, encoder network 1132' may include first fully connected layer 1132*b*', second fully connected layer 1132*c*', third fully connected layer 1132*d*', and/or fourth fully connected layer 1132*e*' (e.g., with dimensions for each such layer as shown in FIG. 11B).

In some non-limiting embodiments, mean vector 1134' and/or standard deviation vector 1136' may be generated (e.g., by modeling system 106 and/or the like) based on the last fully connected layer (e.g., fourth fully connected layer 1132*e*') of the encoder network 1132'. Additionally or alternatively, sampled latent vector 1138' may be determined (e.g., by modeling system 106 and/or the like) based on the input data (e.g., based on mean vector 1134' and/or standard deviation vector 1136' generated based on input data). In some non-limiting embodiments, sampled latent vector 1138' may be connected to (e.g., input into and/or the like) decoder network 1140'.

In some non-limiting embodiments, decoder network 1140' may include a fully connected neural network and/or convolutional neural network. For example, decoder network 1140' may include at least one fully connected layer. For example, decoder network 1140' may include first fully connected layer 1140*e*', second fully connected layer 1140*d*', third fully connected layer 1140*c*', and/or fourth fully connected layer 1140*b*' (e.g., with dimensions for each such layer as shown in FIG. 11A). In some non-limiting embodiments, sampled latent vector 1138' may be connected to (e.g., input into and/or the like) first fully connected layer 1140*c*'. In some non-limiting embodiments, decoder network 1140' may include at least one convolutional neural network. For example, decoder network 1140' may include convolutional neural network 1140*a*1'. Additionally or alternatively, decoder network 1140' may include output layer 1140*a*' (e.g., for an RGB image that is 64×64 pixels as output, output layer 1140*a*' may have dimensions of 64×64×3).

In some non-limiting embodiments, the CelebA dataset may have a feature space that is relatively larger (e.g., compared to MNIST or QuuickDraw), e.g., much larger (e.g., 64×64×3 dimensions). Additionally or alternatively, a four-convolutional-layers DFC-VAE (e.g., as described in X. Hou et al., *Deep Feature Consistent Variational Autoen-*

*coder*, Proc. IEEE Winter Conf. Appl. Comput. Vis., pp. 1133-1141 (2017) and/or available at Dtc-vae, Github, https://github.com/yzwxx/vaecelebA (accessed Aug. 20, 2018), the disclosures of which are hereby incorporated by reference in their entireties) may be used to capture the complicated feature space. For example, DFC-VAE may be a variant of the a regular VAE that may exhibit improved reconstruction performance by feeding both the input and reconstructed images into a pre-trained CNN model and/or minimizing the difference between activations from all the intermediate layers. In some non-limiting embodiments, for the CelebA dataset, 100-dimensional (100D) latent vectors may be used to preserve more information for better reconstructions.

Figure 12:
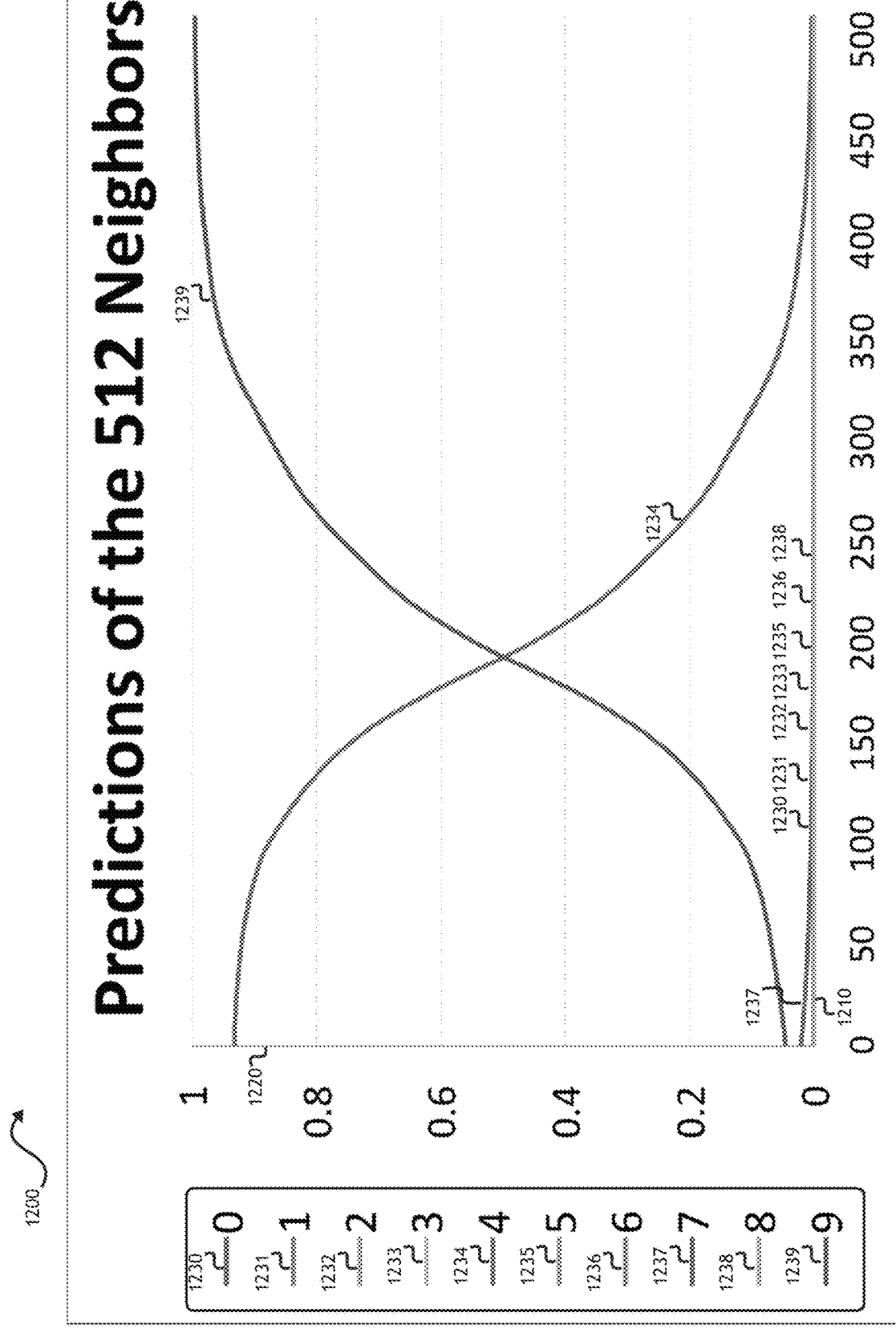
FIG. 12 is a graph of a non-limiting embodiment of an implementation of a non-limiting embodiment of exemplary predictions of classifications, which may be used in the process shown in FIG. 3, according to the principles of the presently disclosed subject matter.

Referring to FIG. 12, FIG. 12 is an exemplary graph 1200 relating to a non-limiting embodiment of process 300 shown in FIG. 3. For example, graph 1200 may show the predictions (e.g., relative probability) for each possible classification as determined by the first (e.g., teacher) predictive model (e.g., by modeling system 106 and/or the like) based on exemplary generated data items, as described herein. For the purpose of illustration, a first curve 1230 may represent the relative probability of class 0, a second curve 1231 may represent the relative probability of class 1, a third curve 1232 may represent the relative probability of class 2, a fourth curve 1233 may represent the relative probability of class 3, a fifth curve 1234 may represent the relative probability of class 4, a sixth curve 1235 may represent the relative probability of class 5, a seventh curve 1236 may represent the relative probability of class 6, an eighth curve 1237 may represent the relative probability of class 7, a ninth curve 1238 may represent the relative probability of class 8, and a tenth curve 1239 may represent the relative probability of class 9.

In some non-limiting embodiments, the horizontal axis 1210 of graph 1200 may represent each of the generated data items (e.g., 512 generated second images). Additionally or alternatively, the vertical axis 1220 of graph 1200 may represent the probability that each respective generated data item (e.g., generated second image) is in the respective classification.

Figure 13:
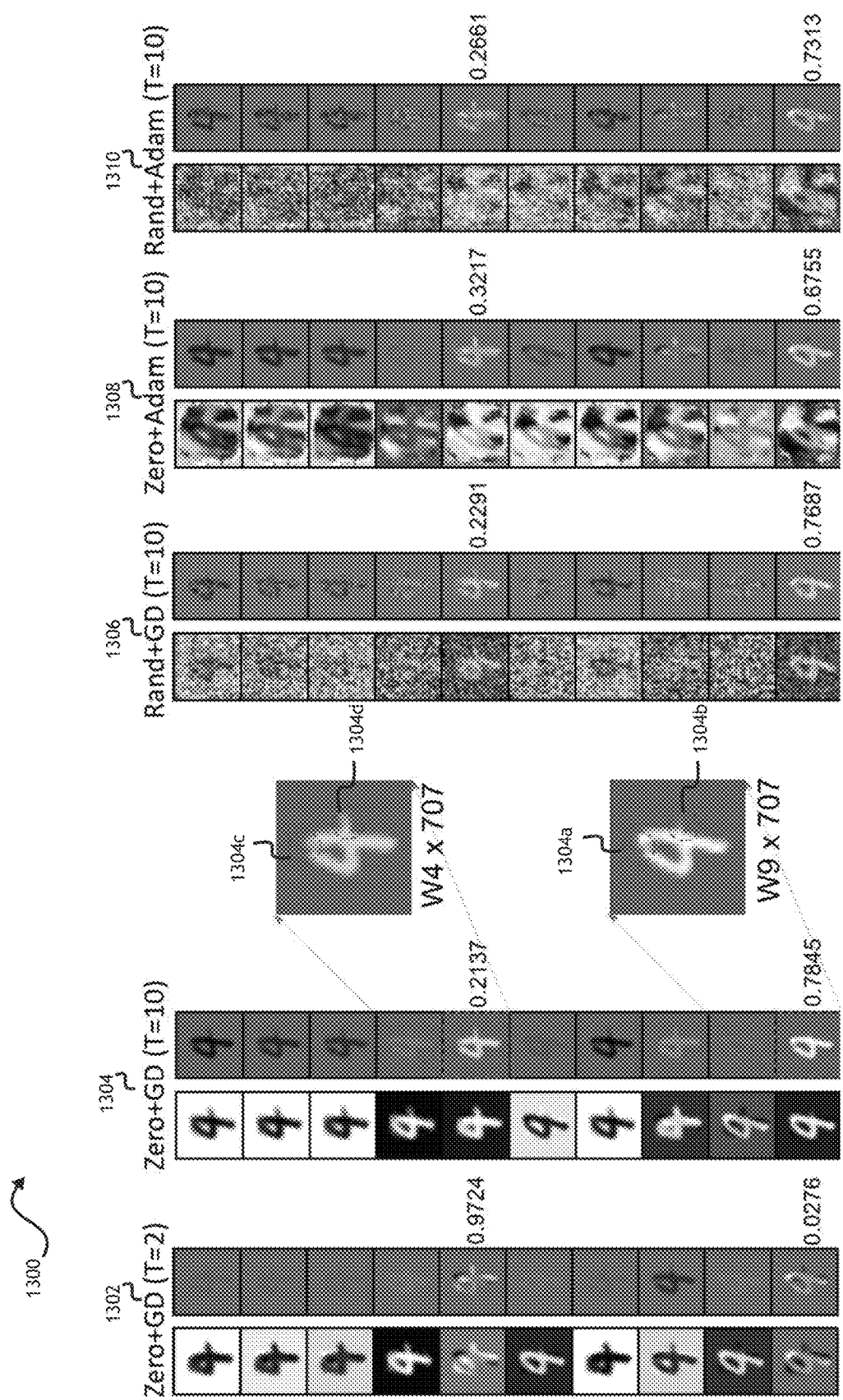
FIG. 13 includes screenshots of a non-limiting embodiment of an implementation of a non-limiting embodiment of exemplary views of a graphical user interface for various exemplary settings and exemplary data items, which may be used in the process shown in FIG. 3, according to the principles of the presently disclosed subject matter.

Referring to FIG. 13, FIG. 13 includes exemplary screenshots of portions of a view (e.g., seventh view) of a graphical user interface for various exemplary settings and exemplary data items relating to process 300 shown in FIG. 3. For example, each screenshot (e.g., first screenshot 1302, second screenshot 1304, third screenshot 1306, fourth screenshot 1308, and fifth screenshot 1310) may include a first (e.g., left) column of images and a second (e.g., right) column of images, and each such column may have a row corresponding to a respective one of the possible classifications (e.g., class 0 through class 9), as described herein. In some embodiments, the first (e.g., left) column may include a visualization of a normalization of the weight matrix for the respective possible classification, as described herein. Additionally or alternatively, the second (e.g., right) column may include images showing the weighted features (e.g., pixels) for the selected image for each respective possible classification, as described herein.

Figure 14:
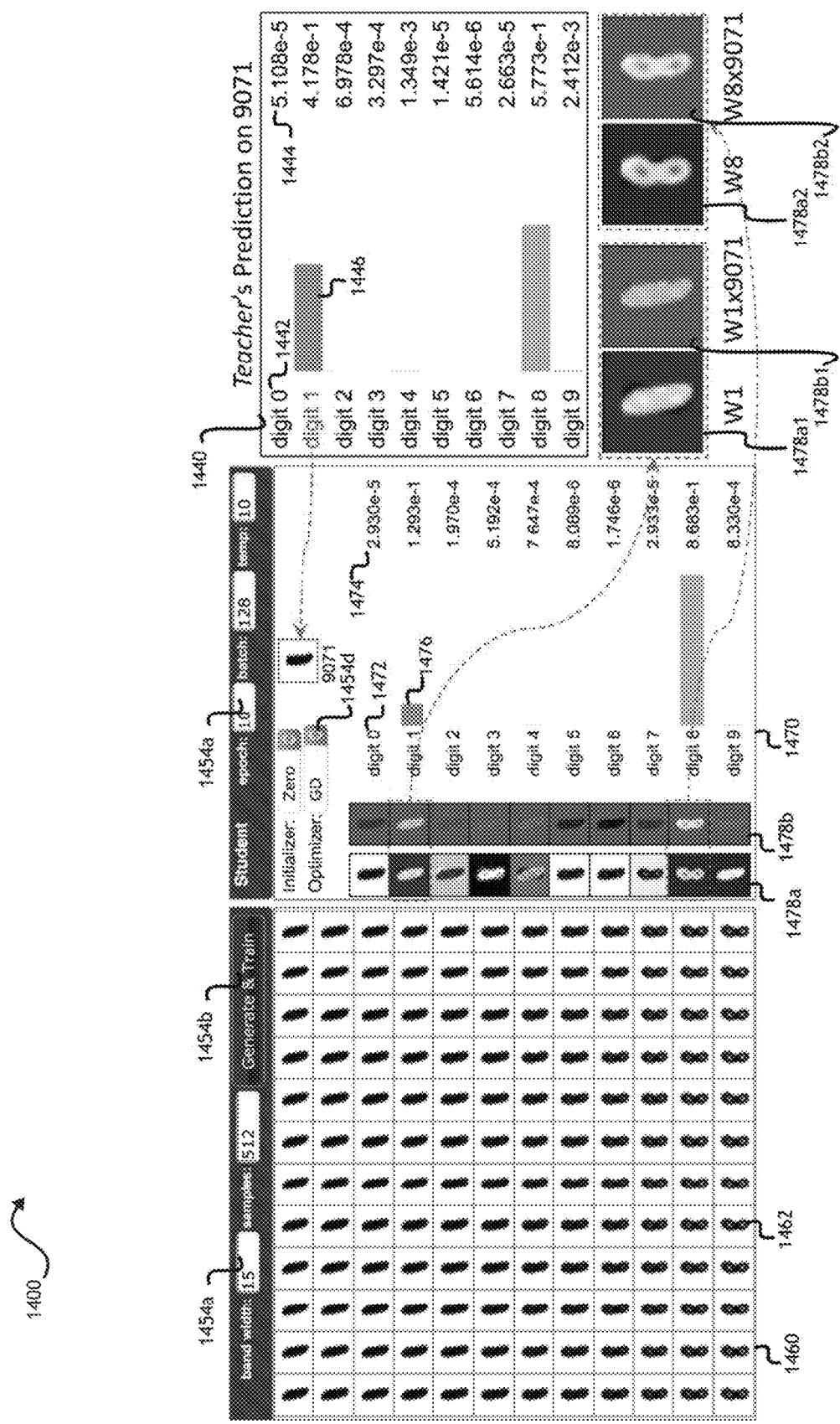
FIG. 14 is a screenshot of a non-limiting embodiment of an implementation of a non-limiting embodiment of exemplary views of a graphical user interface, which may be used in the process shown in FIG. 3, according to the principles of the presently disclosed subject matter.

Referring to FIG. 14, FIG. 14 is a screenshot of a non-limiting embodiment of exemplary views from a graphical user interface 1400 relating to process 300 shown in FIG. 3. In some non-limiting embodiments, graphical user interface 1400 may be generated and/or displayed (e.g., completely, partially, and/or the like) by visualization system 104. In some non-limiting embodiments, graphical user interface 1400 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, graphical user interface 1400 may include a fourth view 1440 displaying probabilities 1444 associated with a plurality of possible classifications 1442 and/or a bar graph including bars 1446 associated with respective probabilities 1444. For example, visualization system 104 may receive a selection of an image (e.g., first image) associated with a data item (e.g., first data item), as described herein. Additionally or alternatively, visualization system 104 may generate fourth view 1440 based on probabilities 1444 (e.g., based on (first) predictions from the modeling system 106 with the first (e.g., teacher) predictive model) associated with the possible classifications 1442, as described herein.

In some non-limiting embodiments, graphical user interface 1400 may include a plurality of graphical elements (e.g., text boxes 1454a, buttons 1454b, dropdown menus 1454d, and/or the like) to receive user input (e.g., directly or via user device 102). For example, visualization system 104 may generate such graphical elements in graphical user interface 1400.

In some non-limiting embodiments, graphical user interface 1400 may include sixth view 1460 displaying a plurality of second images 1462 associated with the plurality of generated data items. For example, modeling system 106 may use the generative model to generate the generated data items by perturbing the selected (e.g., first) data item (e.g., associated with a selected (e.g., first) image) based on the dimensions of a generative model, as described herein. In some non-limiting embodiments, visualization system 104 and/or modeling system 106 may receive a selection of a button 1454b (e.g., via user input from user device 102), and the generation of the generated data items may be based on selection of that button 1454b. In some non-limiting embodiments, visualization system 104 may generate sixth view 1460 to display the second images 1462 associated with the generated data items, as described herein.

In some non-limiting embodiments, graphical user interface 1400 may include seventh view 1470 displaying second probabilities 1474 associated with the plurality of possible classifications 1472 (e.g., from modeling system 106 based on the second (e.g., student) predictive model and the plurality of generated data items) and/or a bar graph including bars 1476 associated with respective probabilities 1444. For example, visualization system 104 may generate seventh view 1470 based on probabilities 1474 (e.g., based on (second) predictions from the modeling system 106 with the second (e.g., student) predictive model) associated with the possible classifications 1472, as described herein. In some non-limiting embodiments, seventh view 1470 may include (e.g., visualization system 104 may generate in seventh view 1470) a first column of images 1478a and a second column of images 1478b, and each such column may have a row corresponding to a respective one of the possible classifications 1472. For example, first column 1478a may include a visualization of a normalization of the weight matrix for the respective possible classification 1472 (e.g., based on second (e.g., student) predictive model from modeling system 106). Additionally or alternatively, second column 1478b may include images showing the weighted features (e.g., pixels) for the selected (e.g., first) image for each respective possible classification 1472 (e.g., multiplying the weight matrices with the features (e.g., pixels) of the image of interest (e.g. selected (first) image). In some non-limiting embodiments, images of the second column 1478b may be normalized together to highlight how different features (e.g., pixels) contribute to each of the (e.g., 10) possible classifications 1472 (e.g., values from small to large may be mapped to shades from dark (e.g., black) to light (e.g., white)). In some non-limiting embodiments, at least one selected image (e.g., image 1478a1 and/or image 1478a2) from first column 1478a may be enlarged to show detail thereof (e.g., based on user input from user device 102 transmitted to/received by visualization system 104). In some non-limiting embodiments, at least one selected image (e.g., image 1478b1 and/or image 1478b2) from second column 1478b may be enlarged to show detail thereof (e.g., based on user input from user device 102 transmitted to/received by visualization system 104).

Figure 15A:
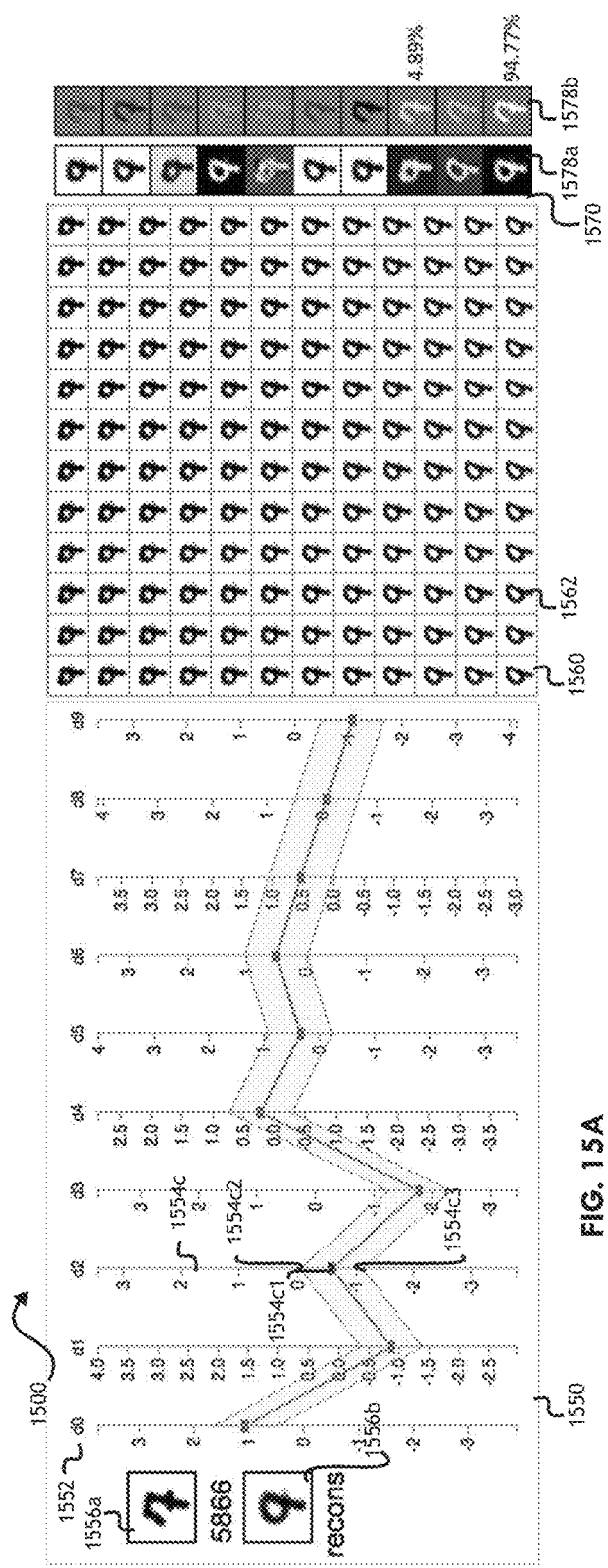
FIGS. 15A-15B are screenshots of a non-limiting embodiment of an implementation of a non-limiting embodiment of exemplary views of a graphical user interface for various exemplary settings and exemplary data items, which may be used in the process shown in FIG. 3, according to the principles of the presently disclosed subject matter.
Figure 15B:
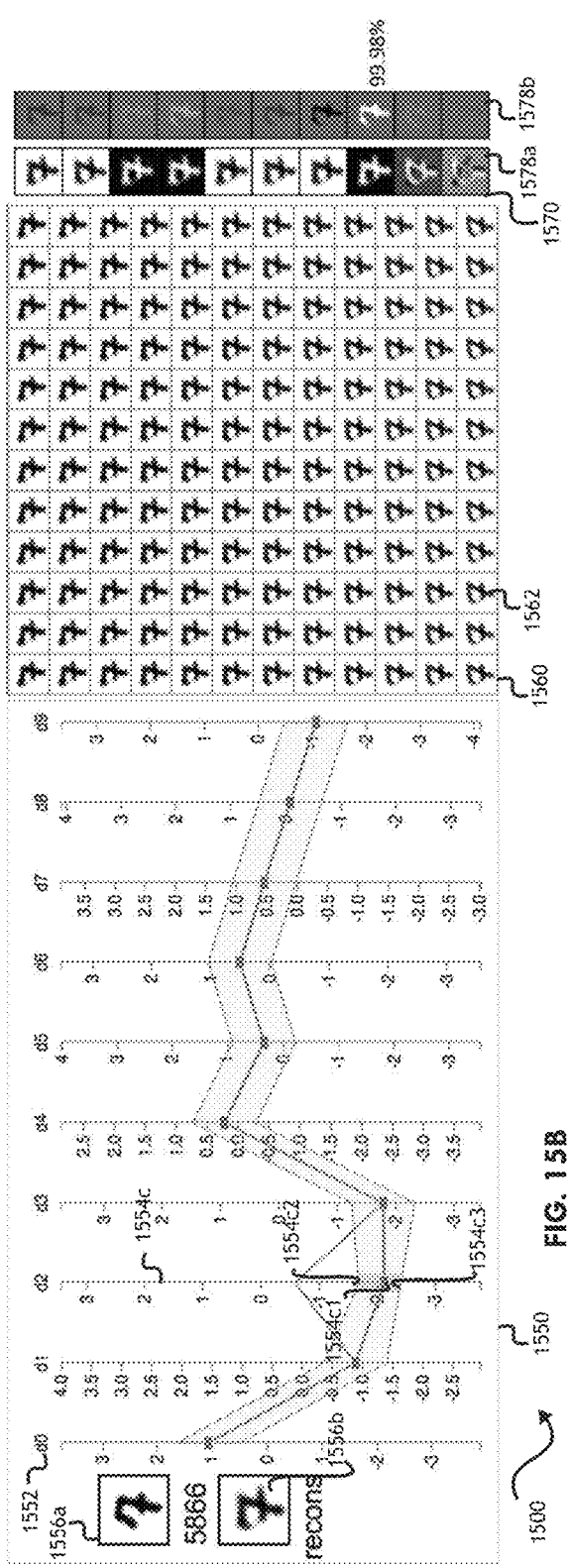

Referring to FIGS. 15A and 15B, FIGS. 15A and 15B are screenshots of a non-limiting embodiment of exemplary views from a graphical user interface 1500 relating to process 300 shown in FIG. 3. In some non-limiting embodiments, graphical user interface 1500 may be generated and/or displayed (e.g., completely, partially, and/or the like) by visualization system 104. In some non-limiting embodiments, graphical user interface 1500 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, graphical user interface 1400 may include a plurality of graphical elements (e.g., slider bars 1554c and/or the like) to receive user input (e.g., directly or via user device 102). For example, visualization system 104 may generate such graphical elements in graphical user interface 1500.

In some non-limiting embodiments, graphical user interface 1500 may include fifth view 1550 displaying dimensions 1552 of a generative model based on the first data item. For example, visualization system 104 may generate a respective slider bar 1554c associated with each dimension 1552, and each slider bar 1554c may initially have a center point 1554c1 associated with a value for such dimension associated with the selected data item (e.g., first data item associated with a selected (e.g., first) image), as described herein. Additionally or alternatively, the slider bar 1554c associated with each dimension 1552 may have a shaded band around each center point 1554c1 defined by upper point 1554c2 and lower point 1554c3, and the shaded band may be associated with a perturbation range (e.g., from upper point 1554c2 to lower point 1554c3) for the respective dimension that will be used by the generative model to generate the generated data items. In some non-limiting embodiments, fifth view 750 may include (e.g., visualization system 104 may generate within fifth view 750) a copy of the selected image 1556a (e.g., which may be the same as selected first image). Additionally or alternatively, fifth view 1550 may include (e.g., visualization system 104 may generate within fifth view 750) a reconstruction 1556b of the copy of the selected image 1556a (e.g., reconstruction 1556b may be generated by modeling system 106 with the generative model based on the positions of the center points 1554c1 on each slider bar). In some non-limiting embodiments, visualization system 104 may receive (e.g., via user input from user device 102) input to adjust (e.g., drag and/or the like) the center point 1554c1 of at least one slider bar 1554c associated with at least one dimension, and the reconstruction 1556b may be updated (e.g., because modeling system 106 generates, with the generative model, an updated reconstruction 1556b based on the adjusted position of the center point(s) 1554c1). For the purpose of illustration, FIG. 15A shows a center point 1554c1 of dimension d3 in an initial position and a reconstruction 1556b based on the initial positions of the center points 1554c1 for all dimensions 1552, and FIG. 15B shows a center point 1554c1 of dimension d3 in an different position (e.g., based on user input, as described herein) and a reconstruction 1556b based on the (current) positions of the center points 1554c1 for all dimensions 1552 (including the different position of center point 1554c1 of dimension d3).

In some non-limiting embodiments, graphical user interface 1500 may include sixth view 1560 displaying a plurality of second images 1562 associated with the plurality of generated data items. For example, modeling system 106 may use the generative model to generate the generated data items by perturbing the selected (e.g., first) data item (e.g., associated with a selected (e.g., first) image) based on the dimensions of a generative model, as described herein. In some non-limiting embodiments, visualization system 104 may generate sixth view 1560 to display the second images 1562 associated with the generated data items, as described herein.

In some non-limiting embodiments, graphical user interface 1500 may include seventh view 1570 displaying a first column of images 1578a and a second column of images 1578b, and each such column may have a row corresponding to a respective one of possible classifications. For example, first column 1578a may include a visualization of a normalization of the weight matrix for the respective possible classification (e.g., based on second (e.g., student) predictive model from modeling system 106). Additionally or alternatively, second column 1578b may include images showing the weighted features (e.g., pixels) for the selected (e.g., first) image for each respective possible classification (e.g., multiplying the weight matrices with the features (e.g., pixels) of the image of interest (e.g. selected (first) image). In some non-limiting embodiments, images of the second column 1578b may be normalized together to highlight how different features (e.g., pixels) contribute to each of the (e.g., 10) possible classifications (e.g., values from small to large may be mapped to shades from dark (e.g., black) to light (e.g., white)).

Figure 16:
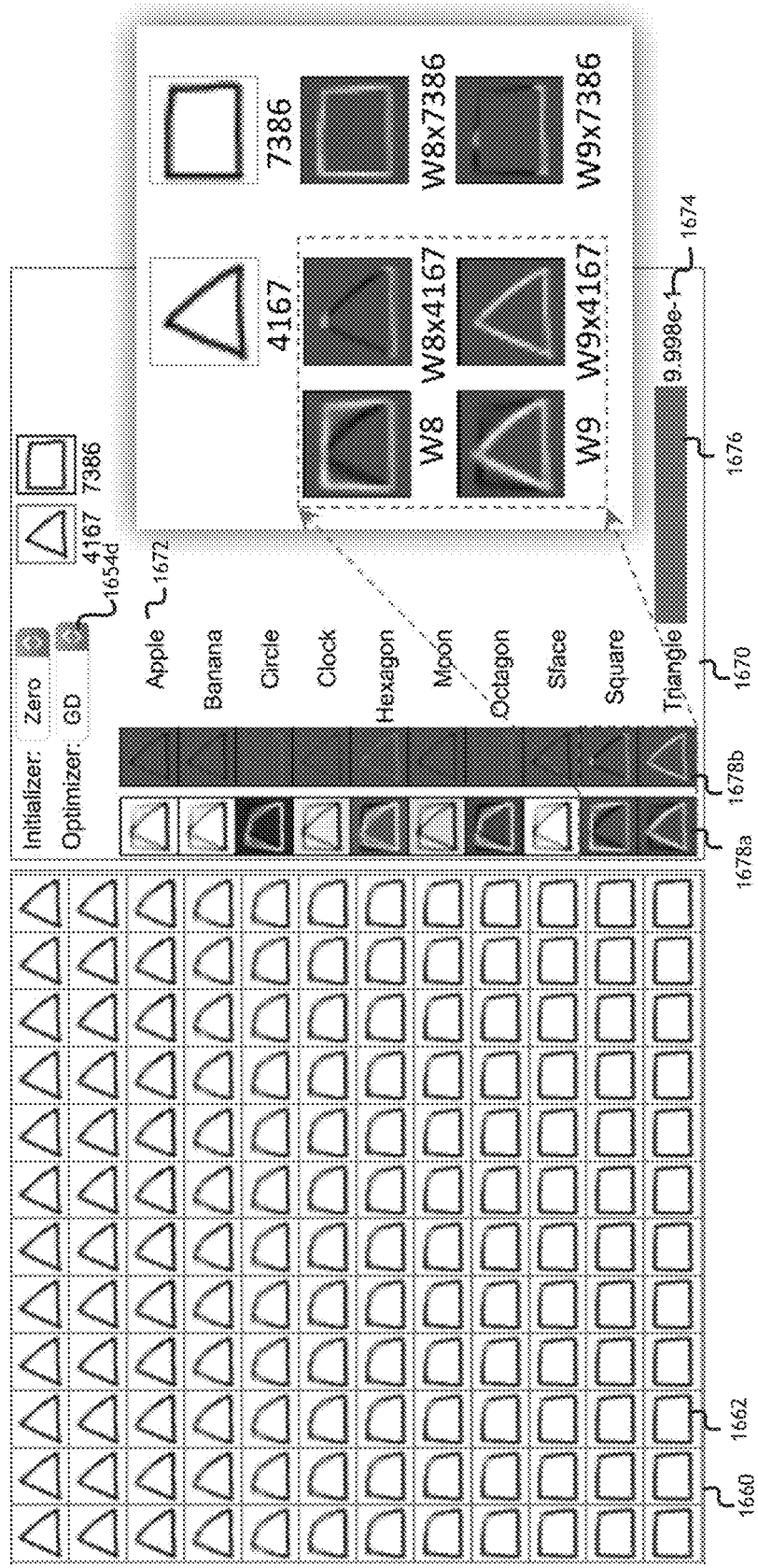
FIG. 16 includes screenshots of a non-limiting embodiment of an implementation of a non-limiting embodiment of exemplary views of a graphical user interface for exemplary data items, which may be used in the process shown in FIG. 3, according to the principles of the presently disclosed subject matter.

Referring to FIG. 16, FIG. 16 is a screenshot of a non-limiting embodiment of exemplary views from a graphical user interface 1600 relating to process 300 shown in FIG. 3. In some non-limiting embodiments, graphical user interface 1600 may be generated and/or displayed (e.g., completely, partially, and/or the like) by visualization system 104. In some non-limiting embodiments, graphical user interface 1600 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, visualization system 104 may receive (e.g., via user input from user device 102) selections of two data items/images, as described herein. For example, visualization system 104 may receive (e.g., via user input from user device 102) a selection of a first image and a second image.

In some non-limiting embodiments, graphical user interface 1600 may include sixth view 1660 displaying a plurality of second images 1662 associated with the plurality of generated data items. For example, modeling system 106 may use the generative model to generate the generated data items by perturbing the selected data items (e.g., first image and/or second image) based on the dimensions of a generative model (e.g., based on the perturbation range for each dimension), as described herein. In some non-limiting embodiments, visualization system 104 may generate sixth view 1660 to display the second images 1662 associated with the generated data items, as described herein.

In some non-limiting embodiments, graphical user interface 1600 may include seventh view 1670 displaying second probabilities 1674 associated with the plurality of possible classifications 1672 (e.g., from modeling system 106 based on the second (e.g., student) predictive model and the plurality of generated data items) and/or a bar graph including bars 1676 associated with respective probabilities 1644. For example, visualization system 104 may generate seventh view 1670 based on probabilities 1674 (e.g., based on (second) predictions from the modeling system 106 with the second (e.g., student) predictive model) associated with the possible classifications 1672, as described herein. In some non-limiting embodiments, seventh view 1670 may include (e.g., visualization system 104 may generate in seventh view 1670) a first column of images 1678a and a second column of images 1678b, and each such column may have a row corresponding to a respective one of the possible classifications 1672. For example, first column 1678a may include a visualization of a normalization of the weight matrix for the respective possible classification 1672 (e.g., based on second (e.g., student) predictive model from modeling system 106). Additionally or alternatively, second column 1678b may include images showing the weighted features (e.g., pixels) for the selected (e.g., first) image for each respective possible classification 1672 (e.g., multiplying the weight matrices with the features (e.g., pixels) of the image of interest (e.g. selected (first) image). In some non-limiting embodiments, images of the second column 1678b may be normalized together to highlight how different features (e.g., pixels) contribute to each of the (e.g., 10) possible classifications 1672 (e.g., values from small to large may be mapped to shades from dark (e.g., black) to light (e.g., white)). In some non-limiting embodiments, at least one selected image from first column 1478a may be enlarged to show detail thereof (e.g., based on user input from user device 102 transmitted to/received by visualization system 104). In some non-limiting embodiments, at least one selected image from second column 1478b may be enlarged to show detail thereof (e.g., based on user input from user device 102 transmitted to/received by visualization system 104).

In some non-limiting embodiments, graphical user interface 1600 may include a plurality of graphical elements (e.g., dropdown menus 1654d and/or the like) to receive user input (e.g., directly or via user device 102). For example, visualization system 104 may generate such graphical elements in graphical user interface 1600.

Figure 17:
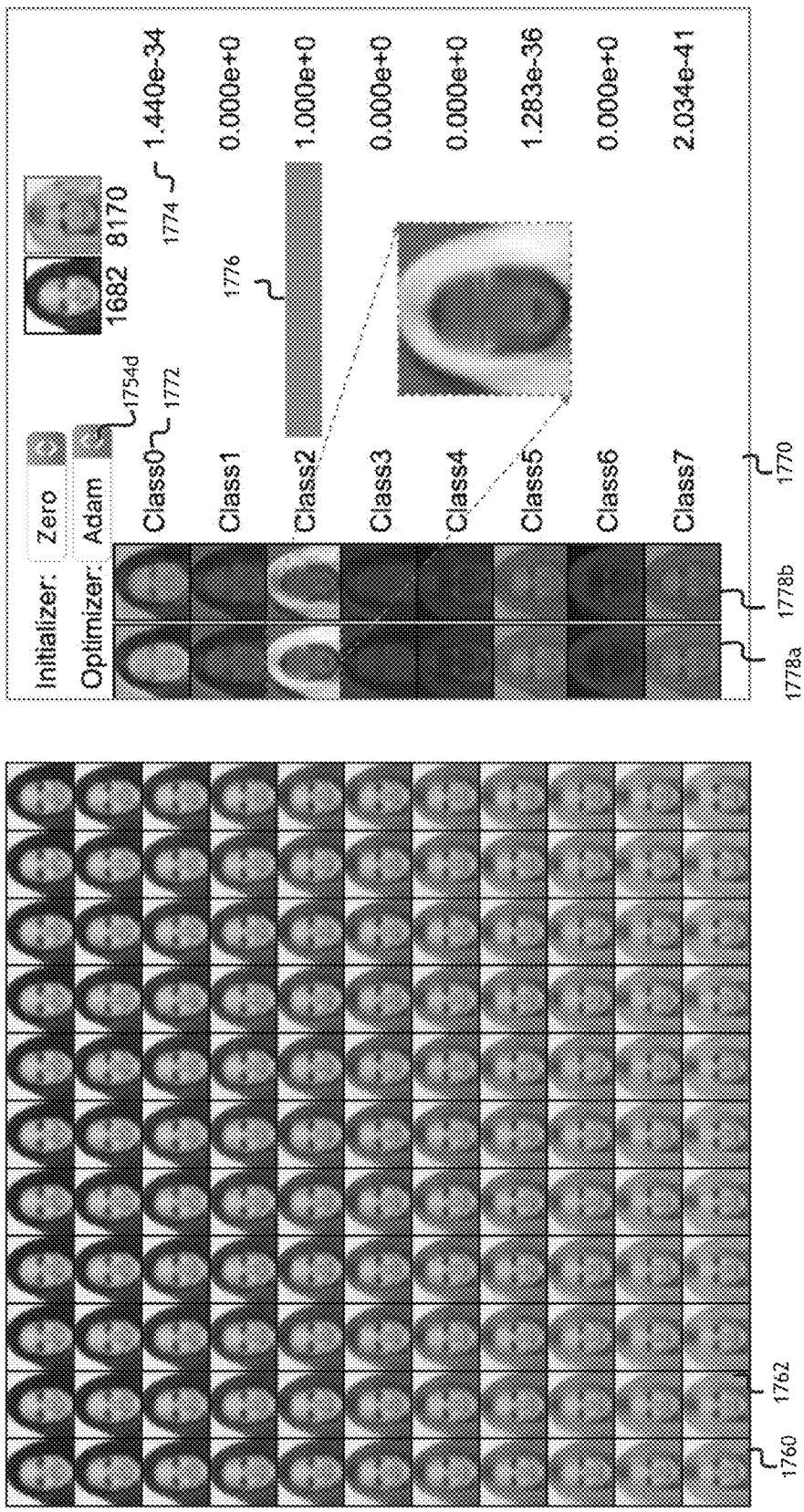
FIG. 17 includes screenshots of a non-limiting embodiment of an implementation of a non-limiting embodiment of exemplary views of a graphical user interface for exemplary data items, which may be used in the process shown in FIG. 3, according to the principles of the presently disclosed subject matter.

Referring to FIG. 17, FIG. 17 is a screenshot of a non-limiting embodiment of exemplary views from a graphical user interface 1700 relating to process 300 shown in FIG. 3. In some non-limiting embodiments, graphical user interface 1700 may be generated and/or displayed (e.g., completely, partially, and/or the like) by visualization system 104. In some non-limiting embodiments, graphical user interface 1700 may be generated and/or displayed (e.g., completely, partially, and/or the like) by another system, another device, another group of systems, or another group of devices, separate from or including visualization system 104, such as user device 102, modeling system 106, data source(s) 108, and/or the like.

In some non-limiting embodiments, visualization system 104 may receive (e.g., via user input from user device 102) selections of two data items/images, as described herein. For example, visualization system 104 may receive (e.g., via user input from user device 102) a selection of a first image and a second image.

In some non-limiting embodiments, graphical user interface 1700 may include sixth view 1760 displaying a plurality of second images 1762 associated with the plurality of generated data items. For example, modeling system 106 may use the generative model to generate the generated data items by perturbing the selected data items (e.g., first image and/or second image) based on the dimensions of a generative model (e.g., based on the perturbation range for each dimension), as described herein. In some non-limiting embodiments, visualization system 104 may generate sixth view 1760 to display the second images 1762 associated with the generated data items, as described herein.

In some non-limiting embodiments, graphical user interface 1700 may include seventh view 1770 displaying second probabilities 1774 associated with the plurality of possible classifications 1772 (e.g., from modeling system 106 based on the second (e.g., student) predictive model and the plurality of generated data items) and/or a bar graph including bars 1776 associated with respective probabilities 1744. For example, visualization system 104 may generate seventh view 1770 based on probabilities 1774 (e.g., based on (second) predictions from the modeling system 106 with the second (e.g., student) predictive model) associated with the possible classifications 1772, as described herein. In some non-limiting embodiments, seventh view 1770 may include (e.g., visualization system 104 may generate in seventh view 1770) a first column of images 1778a and a second column of images 1778b, and each such column may have a row corresponding to a respective one of the possible classifications 1772. For example, first column 1778a may include a visualization of a normalization of the weight matrix for the respective possible classification 1772 (e.g., based on second (e.g., student) predictive model from modeling system 106), e.g., the weight matrix may be visualized like a mask/filter (e.g., that will allow features matching the respective classification to pass through and/or that will block features not matching the respective classification). Additionally or alternatively, second column 1778b may include images showing the weighted features (e.g., pixels) for the selected (e.g., first) image for each respective possible classification 1772 (e.g., multiplying the weight matrices with the features (e.g., pixels) of the image of interest (e.g. selected (first) image). In some non-limiting embodiments, images of the second column 1778b may be normalized together to highlight how different features (e.g., pixels) contribute to each of the (e.g., 10) possible classifications 1772 (e.g., feature contributing to the respective classification may be brightened (e.g., pass a filter) and/or features not contributing to the respective classification may be dimmed (e.g., be filtered out)). In some non-limiting embodiments, at least one selected image from first column 1778a may be enlarged to show detail thereof (e.g., based on user input from user device 102 transmitted to/received by visualization system 104).

In some non-limiting embodiments, graphical user interface 1700 may include a plurality of graphical elements (e.g., dropdown menus 1754d and/or the like) to receive user input (e.g., directly or via user device 102). For example, visualization system 104 may generate such graphical elements in graphical user interface 1700.

Figure 18A:
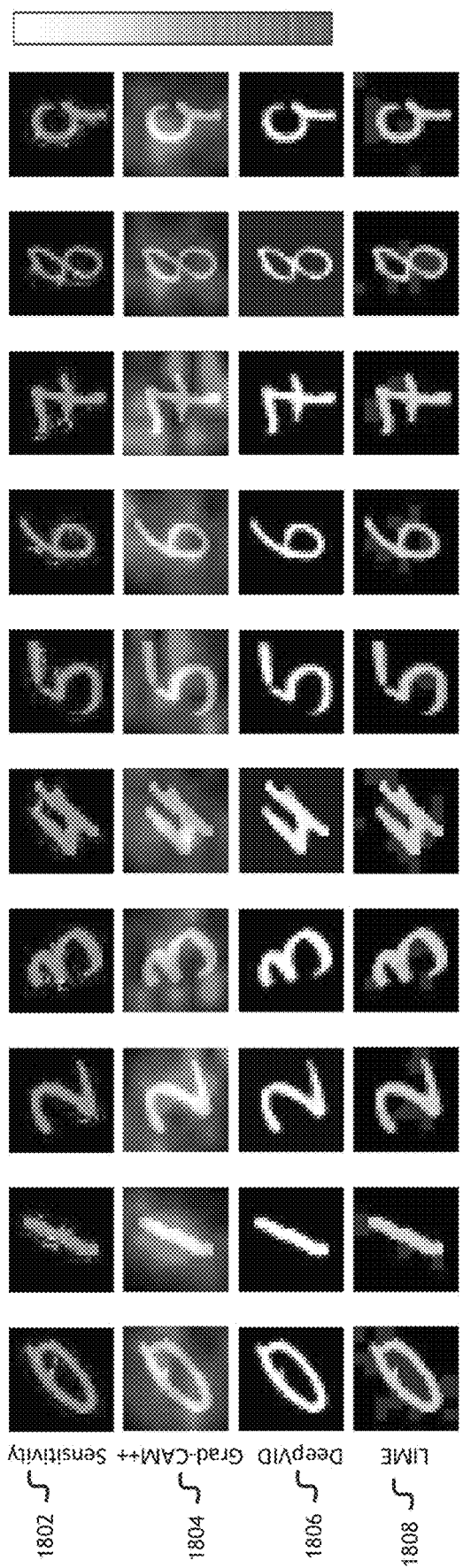
FIG. 18A includes pixel maps for exemplary data items, according to the principles of the presently disclosed subject matter.

Referring to FIG. 18A, FIG. 18A includes exemplary pixel maps for exemplary data items relating to a non-limiting embodiment of process 300 shown in FIG. 3. For example, the pixel maps may show how different features (e.g., pixels) of each exemplary data item (e.g., image) contribute to each of the (e.g., 10) possible classifications (e.g., values from small to large may be mapped to shades from dark (e.g., black) to light (e.g., white)). For the purpose of illustration, a first row 1802 may represent the pixel maps for ten exemplary data items (e.g., images) for class 0 through class 9 (e.g., from left to right) based on sensitivity analysis (e.g., as described in G. Montavon et al., *Methods for Interpreting and Understanding Deep Neural Networks*, Digit. Signal Process. (2017), the disclosure of which is hereby incorporated by reference in its entirety). For the purpose of illustration, a second row 1804 may represent the pixel maps for the same ten exemplary data items (e.g., images) for class 0 through class 9 (e.g., from left to right) based on Grad-CAM++(e.g., as described in A. Chattopadhyay et al., *Grad-cam++: Generalized Gradient-Based Visual Explanations for Deep Convolutional Networks*, arXiv: 1710.11063 (2017), the disclosure of which is hereby incorporated by reference in its entirety). For the purpose of illustration, a third row 1806 may represent the pixel maps for the same ten exemplary data items (e.g., images) for class 0 through class 9 (e.g., from left to right) based on an exemplary embodiment of the presently disclosed subject matter. For the purpose of illustration, a fourth row 1808 may represent the pixel maps for the same ten exemplary data items (e.g., images) for class 0 through class 9 (e.g., from left to right) based on LIME (e.g., as described in M. T. Ribeiro et al., *Why Should I Trust You?: Explaining the Predictions of Any Classifier*, Proc. 22nd ACM SIGKDD Int. Conf. Know!. Discovery Data Mining, pp. 1135-1144 (2016), the disclosure of which is hereby incorporated by reference in its entirety).

In some non-limiting embodiments, the interpretation generated from the presently disclosed subject matter may be compared with alternative techniques, such as sensitivity analysis, Grad-CAM++, and/or LIME. For example, when interpreting the behavior of an image classifier, a map may be generated to color and/or shade individual pixels based on their importance to the final predictions (of the corresponding class). Additionally or alternatively, by overlapping such a map with the image of interest (e.g., selected image), a user may visually observe if the map really captures the class-sensitive features. For example, 10 images may be randomly selected from the 10 classes of MNIST pixel-importance maps may be generated using each of the aforementioned techniques. In some non-limiting embodiments, those 10 randomly selected images may be the 10 exemplary images as shown in FIG. 18A.

Figure 18B:
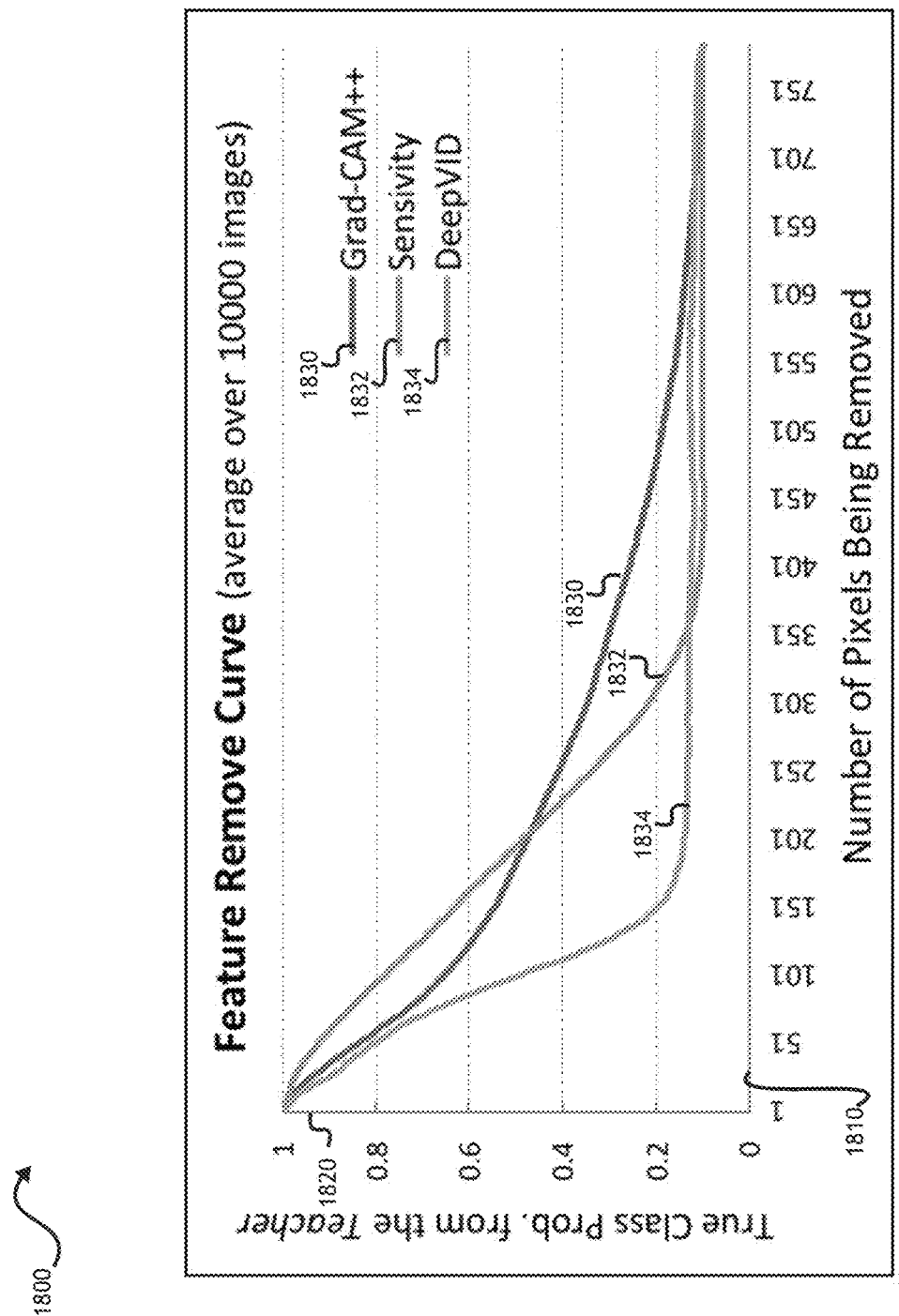
FIG. 18B is a graph of feature removal for exemplary data items, according to the principles of the presently disclosed subject matter.

Referring to FIG. 18B, FIG. 18B includes an exemplary graph 1800 of feature remove curves for exemplary data items relating to a non-limiting embodiment of process 300 shown in FIG. 3. As shown in FIG. 18B, the horizontal axis 1810 of graph 1800 may represent the number of features (e.g., pixels) being removed by each exemplary technique. Additionally or alternatively, the vertical axis 1820 of graph 1800 may represent the (first) prediction (e.g., from the first (e.g., teacher) predictive model) associated with the true classification (e.g., based on the true label).

In some non-limiting embodiments, a curve may be generated (e.g., by modeling system 106, visualization system 104, and/or the like) for each test image in the MNIST dataset, and/or all those curves (e.g., 10,000 curves) derived from each exemplary technique may be averaged (e.g., by modeling system 106, visualization system 104, and/or the Ike). For the purpose of illustration, first curve 1830 may represent the average curve for Grad-CAM++. For the purpose of illustration, second curve 1832 may represent the average curve for sensitivity analysis. For the purpose of illustration, third curve 1834 may represent the average curve for an exemplary embodiment of the presently disclosed subject matter.

In some non-limiting embodiments, a sharper drop at the beginning of such a curve may be associated with more important features (e.g., pixels) being captured and/or removed, which may indicate a more accurate interpretation. Additionally or alternatively, the curve trend in the later stages (e.g., after 200 or more features/pixels are removed) may be less important, e.g., because the data item (e.g., image) has been modified significantly. As shown in FIG. 18B, third curve 1834 associated with the exemplary embodiment of the presently disclosed subject matter may drop the fastest (e.g., before 200 pixels are removed), which may be associated with more accurate interpretation and/or may be associated with a stronger consensus between the second (e.g., student) and first (e.g., Teacher) predictive model on class-sensitive pixels.

In some non-limiting embodiments, quantitative evaluation using feature remove curves may reduce and/or eliminate the potential for cherry-picking comparisons and/or result in a more rigorous evaluation (e.g., because such curves are based on average values). Additionally or alternatively, such a comparison may be conducted by sequentially removing the most important pixel from an image based on its order in the pixel-importance maps derived from different approaches and feeding the modified image into the first (e.g., teacher) predictive model to see the predicted probability thereof.

In some non-limiting embodiments, the presently disclosed subject matter may be implemented using Python, Javascript, and/or the like. Additionally or alternatively, the Flask library may be used to enable the communication therebetween. In some non-limiting embodiments, the second (e.g., student) predictive model may be trained online (e.g., conducted on the Python side using TensorFlow). For example, the second (e.g., student) predictive model may be simple and its training latency may be manageable. For example, for MNIST and QuickDraw, the latency of generating 512 neighbors and training the second (e.g., student) predictive model for 10 epochs may be less than 0.5 seconds on a modern laptop. For CelebA, the same experiment may take around 19 seconds on average. Dynamically revealing the training progress (e.g., a progress bar) could improve users' experience, especially when generating more neighbors or working with larger datasets.

In some non-limiting embodiments, when training the second (e.g., student) predictive model, users may need to tune a few hyper-parameters, e.g., the perturbation bandwidth, the number of generated neighbors, the number of training epochs, the batch size, the distillation temperature, the type of weight initializer and model optimizer. In some non-limiting embodiments, the default settings for these hyper-parameters may be 15 percent, 512, 10, 128, 10, the random initializer, and the GD optimizer, respectively. In some non-limiting embodiments, to reduce manually adjusting these hyper-parameters, some hyper-parameter tuning approaches may be adopted (e.g., a naïve grid search algorithm could be very helpful).

In some non-limiting embodiments, the dimensionality of the latent space may be very high (e.g., it may be 100 D when working with the CelebA dataset), which may bring challenges when perturbing and exploring the latent space. To address this, in some non-limiting embodiments, a more advanced generative models (e.g., progressive GAN) may be used to derive latent dimensions with more stable and controllable semantics and group the dimensions based on their semantics. Additionally or alternatively, the PCP interface may be enhanced, e.g., to progressively learn users' preferences when exploring the latent space and/or automatically adjust the positions of the control points on different PCP axes.

In some non-limiting embodiments, apart from interpreting the behavior of image classifiers, the disclosed subject matter may be used to interpret and/or diagnose more advanced models. In some non-limiting embodiments, the disclosed subject matter may be adapted to interpret adversarial attacks. For example, generating adversarial features to probe a model's behavior may reveal how vulnerable the model is, and, thus, further improve the model from there. In some non-limiting embodiments, the disclosed subject matter may be adapted for model comparisons. For example, a user may have multiple candidate models for an application. With the disclosed subject matter, such a user may train smaller explainable models to better interpret and compare those candidates and, thus, make proper decisions for the user's application.

In some non-limiting embodiments, the disclosed subject matter may be adapted to other types of classifiers (e.g., other than neural networks). For example, the disclosed subject matter may not rely on the classifiers' internal structure (e.g., the disclose subject matter may be used based on the input and output, which may be used for knowledge distillation). In some non-limiting embodiments, non-DNN classifiers (e.g., support vector machine (SVM), random forest, and/or the like) could be used as the classifier (e.g., first (e.g., teacher) predictive model) for interpretation. In some non-limiting embodiments, the disclose subject matter may be applied to other types of data (e.g., text data such as word data, sentence data, and/or the like).

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
receiving, with at least one processor, unclassified data associated with a plurality of unclassified data items;
classifying, with at least one processor, the unclassified data based on a first predictive model to generate classified data;
selecting, with at least one processor, a first data item from the classified data;
upon selection of the first data item, displaying, with at least one processor, dimensions of a generative model based on the first data item;
generating, with at least one processor, a plurality of generated data items associated with the first data item using the generative model by perturbing the first data item based on the dimensions of the generative model;
displaying, with at least one processor, a plurality of images associated with the plurality of generated data items;
classifying, with at least one processor, the plurality of generated data items based on the first predictive model to generate classified generated data;
training, with at least one processor, a second predictive model with the classified generated data; and
displaying, with at least one processor, probabilities associated with a plurality of possible classifications based on the second predictive model and the plurality of generated data items.

2. The method of claim 1, further comprising:
training, with at least one processor, the first predictive model with at least a portion of the unclassified data before classifying the unclassified data,
wherein classifying the unclassified data comprises classifying, with at least one processor, the unclassified data based on the first predictive model as trained to generate the classified data.

3. The method of claim 1, further comprising training, with at least one processor, the generative model with at least a portion of the unclassified data before generating the plurality of generated data items.

4. The method of claim 1, wherein the first predictive model comprises a teacher model and the second predictive model comprises a student model.

5. The method of claim 1, wherein the first predictive model comprises at least one of a neural network, a deep neural network, or a convolutional neural network,
wherein the second predictive model comprises at least one of a linear regression, a decision tree, or a rules-based model, and
wherein the generative model comprises at least one of a deep generative model or a variational auto-encoder (VAE).

6. The method of claim 1, wherein selecting the first data item comprises receiving, with at least one processor, a selection of the first data item from a user via a graphical user interface.

7. The method of claim 6, wherein the graphical user interface comprises a first view displaying a clustering of the data items of the classified data.

8. The method of claim 7, wherein the graphical user interface further comprises a second view displaying a confusion matrix.

9. The method of claim 8, wherein, upon selection of at least one data item from the first view, the graphical user interface further comprises a third view displaying at least one image associated with the at least one data item.

10. The method of claim 9, wherein selecting the first data item comprises receiving, with at least one processor, a selection of a first image of the at least one image associated with the first data item from the third view,
wherein, upon receiving the selection of the first image, the graphical user interface further comprises a fourth view displaying first probabilities associated with the plurality of possible classifications based on the first predictive model and the first data item and a fifth view, and
wherein displaying the dimensions of the generative model comprises displaying, via the fifth view of the graphical user interface, the dimensions of the generative model based on the first data item.

11. The method of claim 10, wherein generating the plurality of generated data items comprises generating, with at least one processor, the plurality of generated data items upon selection of a button associated with the fifth view,
   wherein the graphical user interface further comprises a sixth view and a seventh view,
   wherein displaying the plurality of images associated with the plurality of generated data items comprises displaying, via the sixth view of the graphical user interface, the plurality of images associated with the plurality of generated data items, and
   wherein displaying the probabilities associated with the plurality of possible classifications comprises displaying, via the seventh view of the graphical user interface, the probabilities associated with the plurality of possible classifications based on the second predictive model and the plurality of generated data items.

12. A system, comprising:
   at least one processor; and
   at least one non-transitory computer-readable medium comprising instructions to direct the at least one processor to:
      receive unclassified data associated with a plurality of unclassified data items;
      classify the unclassified data based on a first predictive model to generate classified data;
      select a first data item from the classified data;
      upon selection of the first data item, display dimensions of a generative model based on the first data item;
      generate a plurality of generated data items associated with the first data item using the generative model by perturbing the first data item based on the dimensions of the generative model;
      display a plurality of images associated with the plurality of generated data items;
      classify the plurality of generated data items based on the first predictive model to generate classified generated data;
      train a second predictive model with the classified generated data; and
      display probabilities associated with a plurality of possible classifications based on the second predictive model and the plurality of generated data items.

13. The system of claim 12, wherein the instructions further direct the at least one processor to:
   train the first predictive model with at least a portion of the unclassified data before classifying the unclassified data,
   wherein classifying the unclassified data comprises classifying the unclassified data based on the first predictive model as trained to generate the classified data.

14. The system of claim 12, wherein the instructions further direct the at least one processor to train the generative model with at least a portion of the unclassified data before generating the plurality of generated data items.

15. The system of claim 12, wherein the first predictive model comprises a teacher model and the second predictive model comprises a student model.

16. The system of claim 12, wherein the first predictive model comprises at least one of a neural network, a deep neural network, or a convolutional neural network,
   wherein the second predictive model comprises at least one of a linear regression, a decision tree, or a rules-based model, and
   wherein the generative model comprises at least one of a deep generative model or a variational auto-encoder (VAE).

17. The system of claim 12, wherein selecting the first data item comprises receiving a selection of the first data item from a user via a graphical user interface.

18. The system of claim 17, wherein the graphical user interface comprises a first view displaying a clustering of the data items of the classified data,
   wherein the graphical user interface further comprises a second view displaying a confusion matrix, and
   wherein, upon selection of at least one data item from the first view, the graphical user interface further comprises a third view displaying at least one image associated with the at least one data item.

19. The system of claim 18, wherein selecting the first data item comprises receiving a selection of a first image of the at least one image associated with the first data item from the third view,
   wherein, upon receiving the selection of the first image, the graphical user interface further comprises a fourth view displaying first probabilities associated with the plurality of possible classifications based on the first predictive model and the first data item and a fifth view,
   wherein displaying the dimensions of the generative model comprises displaying, via the fifth view of the graphical user interface, the dimensions of the generative model based on the first data item,
   wherein generating the plurality of generated data items comprises generating the plurality of generated data items upon selection of a button associated with the fifth view,
   wherein the graphical user interface further comprises a sixth view and a seventh view,
   wherein displaying the plurality of images associated with the plurality of generated data items comprises displaying, via the sixth view of the graphical user interface, the plurality of images associated with the plurality of generated data items, and
   wherein displaying the probabilities associated with the plurality of possible classifications comprises displaying, via the seventh view of the graphical user interface, the probabilities associated with the plurality of possible classifications based on the second predictive model and the plurality of generated data items.

20. A computer program product for local approximation of a predictive model, the computer program product comprising at least one non-transitory computer-readable medium including one or more instructions that, when executed by at least one processor, cause the at least one processor to:
   receive unclassified data associated with a plurality of unclassified data items;
   classify the unclassified data based on a first predictive model to generate classified data;
   select a first data item from the classified data;
   upon selection of the first data item, display dimensions of a generative model based on the first data item;
   generate a plurality of generated data items associated with the first data item using the generative model by perturbing the first data item based on the dimensions of the generative model;
   display a plurality of images associated with the plurality of generated data items;
   classify the plurality of generated data items based on the first predictive model to generate classified generated data;

train a second predictive model with the classified generated data; and
display probabilities associated with a plurality of possible classifications based on the second predictive model and the plurality of generated data items.

* * * * *